United States Patent [19]

Masaki et al.

[11] Patent Number: 5,481,460
[45] Date of Patent: Jan. 2, 1996

[54] CONTROLLER FOR ELECTRIC VEHICLE

[75] Inventors: Ryoso Masaki; Shigeki Morinaga; Kazuo Tahara, all of Hitachi; Hirohisa Yamamura, Hitachiota; Kenzo Kajiwara, Hitachi; Hiroyuki Yamada, Katsuta; Nobuo Inoue, Mito; Toshio Suzuki, Katsuta, all of Japan

[73] Assignees: Hitachi, Ltd., Tokyo; Hitachi Automotive Engineering Co., Ltd., Ibaraki, both of Japan

[21] Appl. No.: 867,232

[22] PCT Filed: Oct. 2, 1991

[86] PCT No.: PCT/JP91/01326

§ 371 Date: Jun. 3, 1992

§ 102(e) Date: Jun. 3, 1992

[87] PCT Pub. No.: WO92/05974

PCT Pub. Date: Apr. 16, 1992

[30] Foreign Application Priority Data

Oct. 3, 1990 [JP] Japan ..................... 2-263919
Oct. 12, 1990 [JP] Japan ..................... 2-272269

[51] Int. Cl.⁶ ..................................... B60L 9/00
[52] U.S. Cl. ..................... 364/424.07; 318/139; 318/587
[58] Field of Search ..................... 318/139, 587, 318/811, 161, 52, 135; 364/426.01

[56] References Cited

U.S. PATENT DOCUMENTS

Re. 34,159  1/1993  Harrington et al. ............... 361/31
4,514,665   4/1985  Melocik et al. .................. 318/139
4,520,299   5/1985  Konrad .......................... 318/587
4,629,947  12/1986  Hammerslag et al. ............. 318/161
4,691,148   9/1987  Nicholls et al. ................. 318/139
4,785,225  11/1988  Horie et al. .................... 318/811
4,799,161   1/1989  Hirotsu et al. .................. 364/426.01
4,825,131   4/1989  Nozaki et al. ................... 318/52
4,825,132   4/1989  Gritter ........................... 318/811
4,900,992   2/1990  Sekizawa et al. ................. 318/135
4,915,328   4/1990  Nakamoto ....................... 246/186
5,222,568   6/1993  Higasa et al. ................... 180/65.5

FOREIGN PATENT DOCUMENTS 54-17217    2/1979  Japan .
56-153904  11/1981  Japan .
56-153906  11/1981  Japan .

*Primary Examiner*—Kevin J. Teska
*Assistant Examiner*—Stephen J. Walder, Jr.
*Attorney, Agent, or Firm*—Antonelli, Terry, Stout & Kraus

[57] ABSTRACT

The present invention relates to a controller for an electric vehicle in which right and left drive wheels are respectively driven by drive motors which are individually provided. The controller for an electric vehicle comprises motors for driving right and left wheels, means for detecting rotating speeds or rotation torques of the wheels, and a facility for taking a rotation deviation between output signals from the detection means close to zero. As a result, the vehicle is always operated in safety.

15 Claims, 38 Drawing Sheets

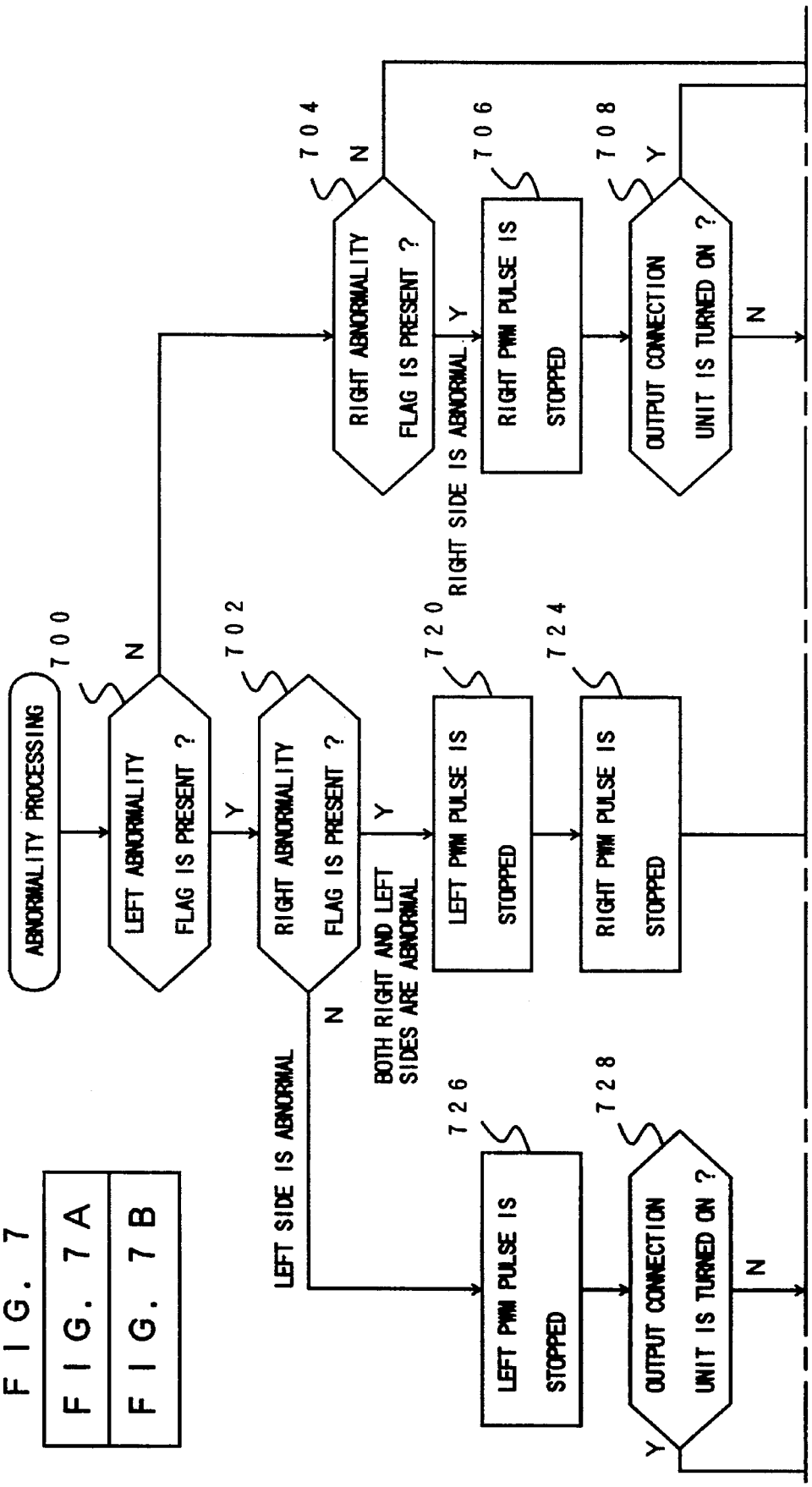

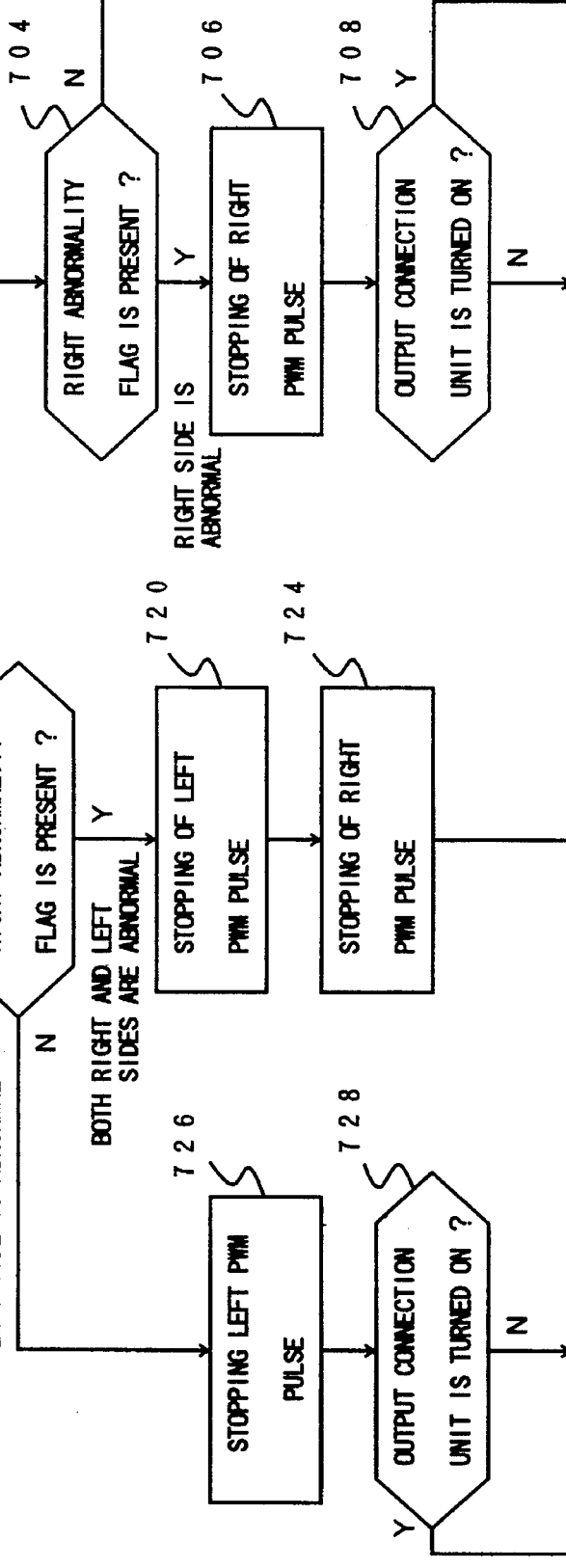

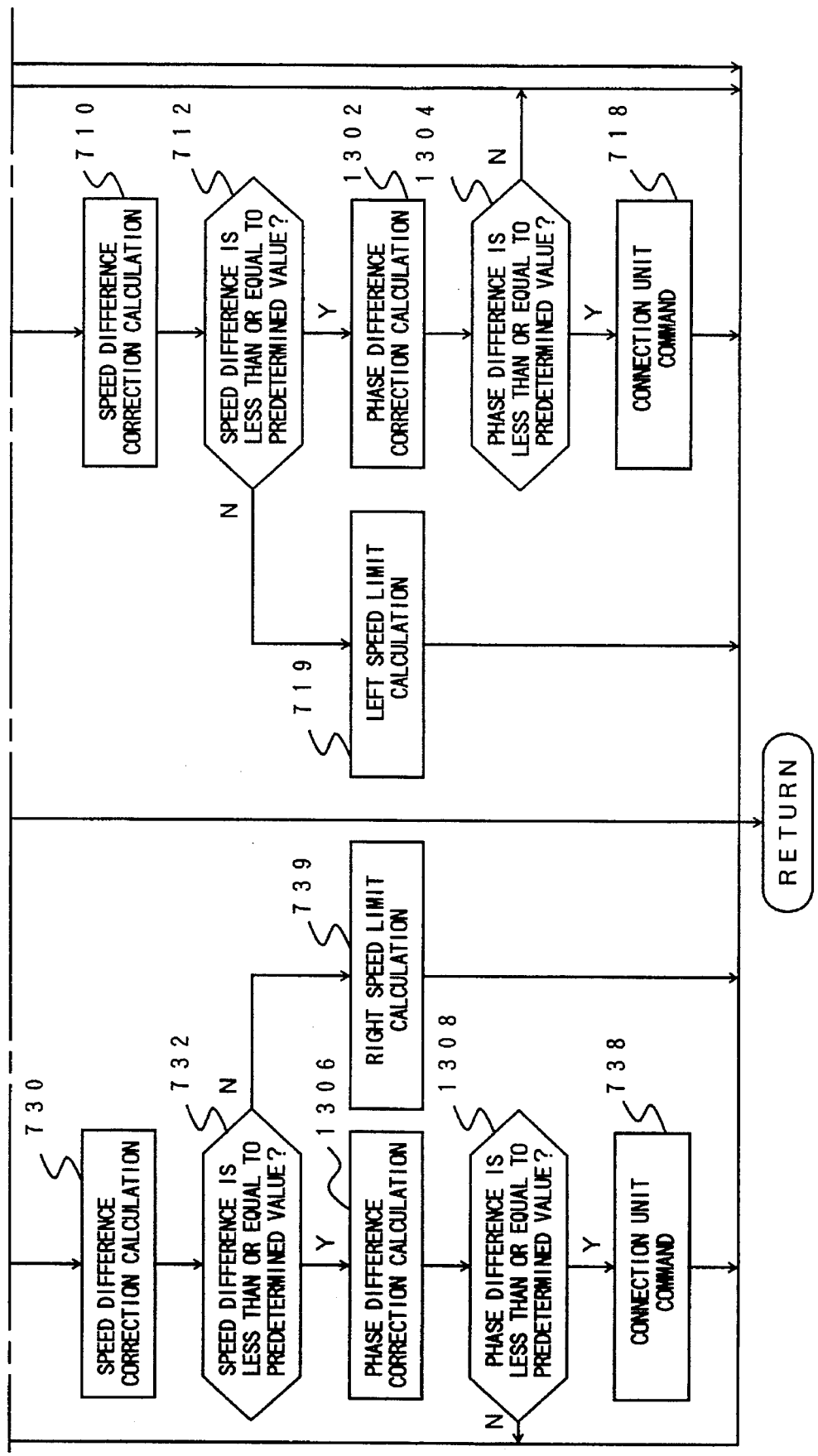

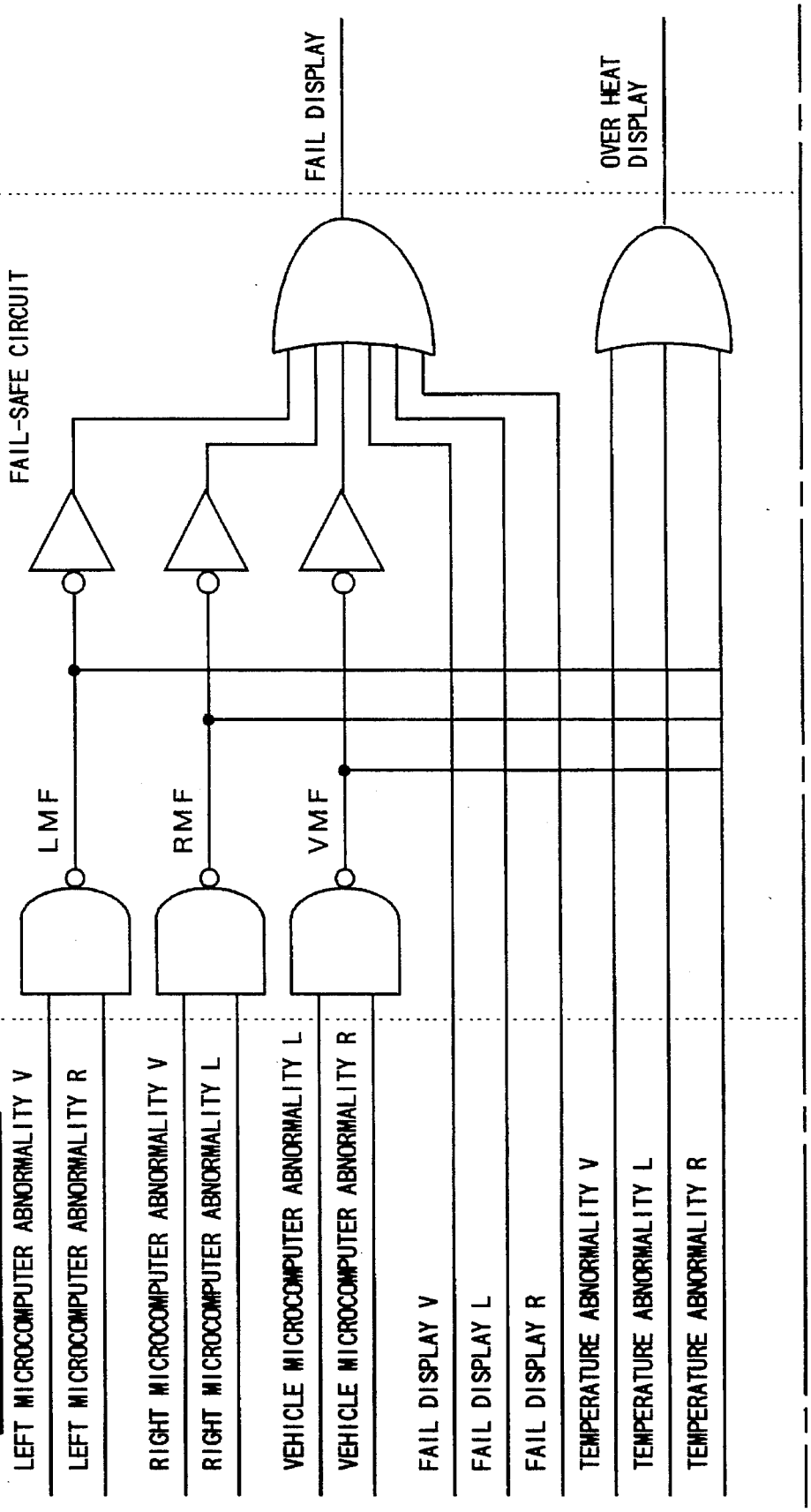

CONTROLLER FOR ELECTRIC VEHICLE

TECHNICAL FIELD

The present invention relates to a controller for an electric vehicle and more particularly to a controller for an electric vehicle suitable for driving a right wheel and a left wheel by individual motors.

BACKGROUND ART

In general, an electric vehicle is designed in such a way that motors are rotated using a battery as a power source to drive the wheels, thereby to make the vehicle travel. Moreover, there is described in JP-A-59-10102 and JP-A-62-138002 a type of electric vehicle in which a left wheel and a right wheel are driven by individual motors.

When the left wheel and the right wheel are driven by individual motors, for example, it is possible to control the motors independently of each other so as to make the speed of the left wheel and that of the right wheel different from each other. Such a control provides for improved steering so that the driveability of the electric vehicle can be improved.

With the technology disclosed in the above-referenced publications, however, there is the possibility in some cases that when an abnormality occurs in the rotation of one motor, the vehicle gets into a state in which it is difficult to control it in accordance with the driver's desires. Especially, this problem becomes critical in the case of high speed driving. In a most serious case, the vehicle spins so that the steering gets uncontrollable.

DISCLOSURE OF THE INVENTION

It is therefore a principal object of the present invention to provide an electric vehicle which is capable of travelling properly even when an abnormality occurs in the rotation of one of a motor for driving a left wheel and a motor for driving a right wheel.

It is another object of the present invention to provide a control system for a vehicle which is capable, when a microprocessor used in a controller of the vehicle gets into a run away state, of preventing a motor which is driven by the microprocessor from being accelerated or decelerated abnormally, thereby to allow the vehicle to be stopped safely.

It is still another object of the present invention to provide an electric vehicle which is capable of travelling at a low speed and in safety when a plurality of microprocessors are normally operated.

The above principal object is attained by an electric vehicle having a motor for driving a first wheel; a second motor for driving a second wheel; first current supply means for supplying a current to the first motor; second current supply means for supplying a current to the second motor; and means for stopping the current supply from the first current supply means to the first motor and supplying a current from the second current supply means to the first motor when the first current supply means is in an abnormal state (the first construction).

Further, the above object is also attained by an electric vehicle having a first motor for driving a first wheel, a second motor for driving a second wheel, first current supply means for supplying a current to the first motor, second current supply means for supplying a current to the second motor, means for calculating a limit current value with which the vehicle gets into a spinning state from a travelling state, and means for performing a control so that the first or second motor will not exceed the limit current value (the second construction).

Furthermore, the above object is also attained by an electric vehicle having a first motor for driving a first wheel, a second motor for driving a second wheel, first current supply means for supplying a current to the first motor, second current supply means for supplying a current to the second motor, abnormality detection means for detecting an abnormality of a rotation state of the first or second motor, and means for limiting the current supplied to the first or second motor so that the velocity of the vehicle will not exceed a predetermined value, on the basis of an output of the abnormality detection means (the third construction).

The above object is attained by a controller for an electric vehicle for driving two or more tires independently of one another by a plurality of motors, wherein the controller is constructed by three or more microprocessors to monitor a run away state of the microprocessors mutually.

Moreover, in order to attain the above-stated object, an electric vehicle is designed in such a way as to certify that a plurality of microprocessors are operated in a normal manner when the vehicle is being stopped, thereby to drive, after judging that the vehicle can be driven, motors by only the normal microprocessors.

In the above first construction, when the first current supply means gets into an abnormal state, the supply of the current from the first current supply means to the first motor is stopped, and the current is supplied from the second current supply means to the first motor.

According to the above second construction, the limit current value with which the vehicle gets into the spinning state is calculated on the basis of the travelling state, thereby to effect a control so that the first or second motor will not exceed the limit current value.

According to the third construction, when the rotation state of the first or second motor becomes abnormal, the current supplied to the first or second motor is limited so that the velocity of the vehicle will not exceed a predetermined value.

BRIEF DESCRIPTION OF THE DRAWINGS

FIGS. 7, 7A and 7B is a flow chart of a subroutine program showing the details of a processing for abnormality;

FIGS. 13, 13A and 13B is a flow chart of a subroutine program showing the details of an abnormality processing of the second embodiment;

FIG. 16, 16A and 16B is a flow chart of a subroutine program showing the details of an abnormality processing of the fourth embodiment;

FIGS. 27, 27A and 27B is a block diagram showing the arrangement of one embodiment of the present invention employing three microprocessors;

FIGS. 28, 28A and 28B is a block diagram showing a control method of a controller of FIG. 27;

FIGS. 29, 29A and 29B is a circuit diagram showing the arrangement of arrangement of an inverter controller;

FIGS. 30, 30A and 30B is a block diagram showing the concrete arrangement of a relationship between the input and the output of signals of a controller; and FIGS. 31, 31A and 31B is a circuit diagram showing the arrangement of a fail safe circuit.

BEST MODE FOR CARRYING OUT THE INVENTION

Figure 1:
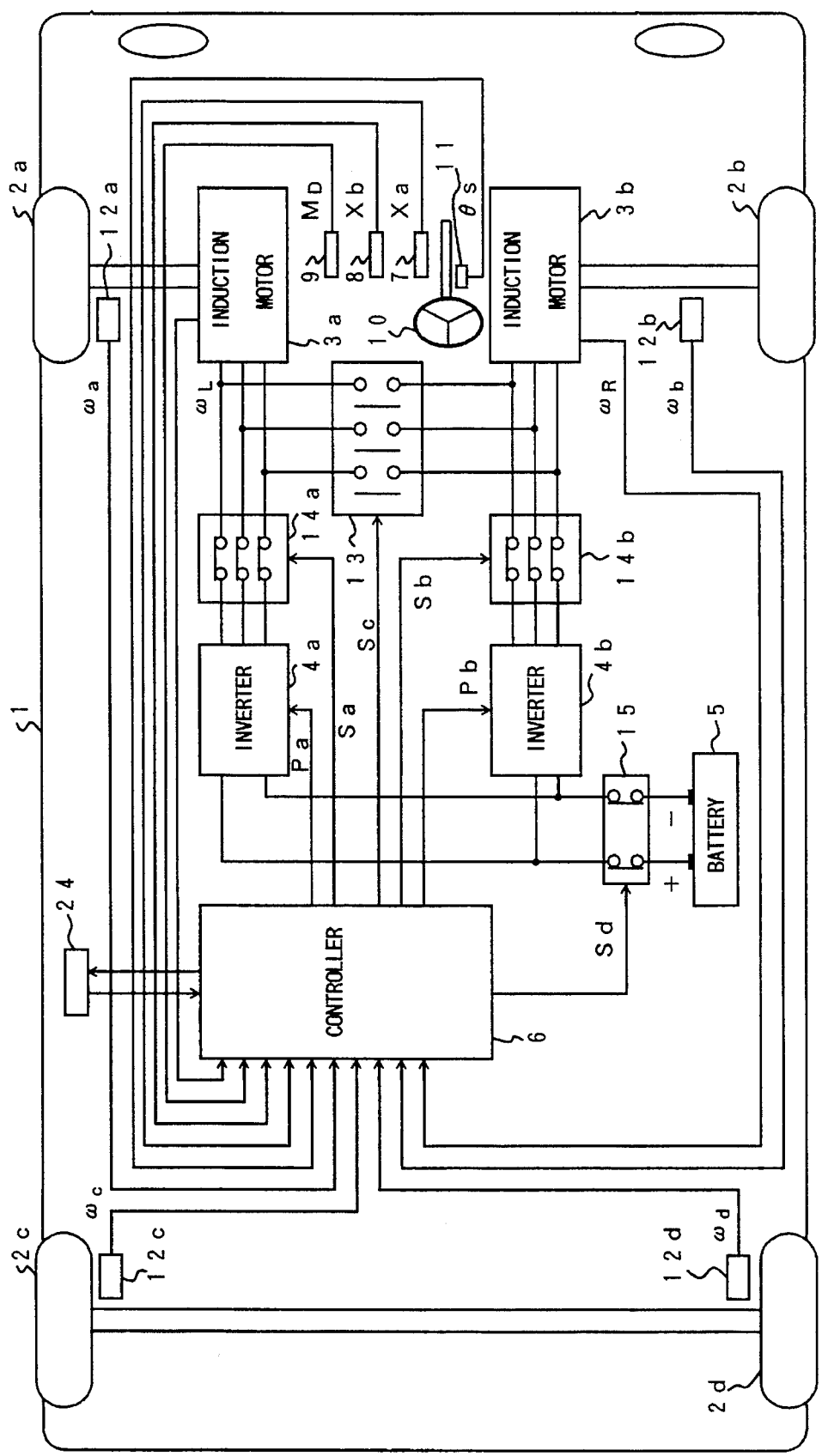
FIG. 1 is a block diagram showing the arrangement of a system.

The first embodiment of the present invention will hereinafter be described. FIG. 1 is a block diagram showing the system arrangement of a front drive electric vehicle in which a left driving wheel and a right driving wheel are driven independently of each other by respective induction motors 3a and 3b. The current from a battery 5 is supplied to a left-hand side inverter 4a and a right-hand side inverter 4b through two connection terminals of a power connection unit 15. The power connection unit 15 is provided in order to turn the connection between the battery 5 and the left and right-hand side inverters 4a, 4b ON or OFF.

Each of the inverters 4a and 4b periodically causes the current from the battery to flow or interrupts it to output three ac currents which are different in phase. The outputs of the inverters 4a and 4b are respectively supplied to the induction motor 3a for a left wheel and the induction motor 36 for a right wheel through a left-hand side output connection unit 14a and a right-hand side output connection unit 14b. Left-hand side switching means 14a and right-hand side switching means 14b are provided to interrupt the connection between the inverter 4a and the induction motor 3a, and that between the inverter 4b and the induction motor 3b, respectively.

The torque of the induction motor 3a for a left wheel and that of the induction motor for a right wheel are respectively transmitted to a front left wheel 2a and front right wheel 2b so that the front left wheel 2a and the front right wheel 2b are rotated by respective driving forces.

The three-phase outputs of the left-hand inverter 4a are capable of being respectively connected to the three-phase outputs of the right-hand side inverter 4b by an output connection unit 13.

The amount Xa of actuation of an accelerating pedal by a driver is detected by an accelerating pedal sensor 7 so that the detection signal is inputted to a controller 6. The amount Xb of actuation of a brake pedal is detected by a brake sensor 8 so that the detection signal is inputted to the controller 6. Moreover, a position signal of a mode lever 9 indicating the operation mode $M_D$ of forward movement, backward movement and parking which will be selected by the driver, a detection signal of a steering angle sensor 11 which detects a steering angle $\Theta s$ of a steering wheel 10, and detection signals of encoders 12a, 12b, 12c and 12d which detect rotating speed $\omega_a$, $\omega_b$, $\omega_c$, and $\omega_d$ of the front left wheel 2a, the front right wheel 2b, a rear left wheel 2a, and a rear right wheel 2b, respectively, are inputted into the controller 6.

On the basis of those detection signals, the controller 6 outputs PWM pulses Pa and Pb to the inverters 4a and 4b, respectively, and on the basis of those output signals, it controls the conducting state of the inverters 4a and 4b. By such a control of the inverters 4a and 4b, the induction motors 3a and 3b are driven so as to satisfy the will of the driver.

While the details will be described later, a brief description will now be given as to the control employed when one of the inverters 4a and 4b becomes abnormal.

On the basis of the rotating speed of the induction motors 3a and 3b and the currents flowing therethrough, the controller 6 judges whether or not one of the inverters 4a and 4b is abnormal. When it is judged that one of the inverters 4a and 4b is abnormal, first, the controller 6 outputs a PWM pulse stop signal Spa (a stop signal for the left-hand side inverter) or Spb (a stop signal for the right-hand side inverter) to the inverter of interest, thereby to stop the output of the PWM pulse of the inverter which is judged to be abnormal.

Next, the controller 6 waits until the induction motors 3a and 3b can be connected, and immediately after those motors 3a and 3b have been able to be connected, it outputs an interrupt signal Sa (to interrupt the left-hand side inverter 4a and the left-hand side induction motor 3a) or Sb (to interrupt the right-hand side inverter 4b and the right-hand side induction motor 3a) to the output connection unit 14a or 14b for the inverter which has been judged to be abnormal, thereby to electrically interrupt the inverter which has been judged to be abnormal and the induction motor thereof. At the same time, the controller 6 outputs a connection signal Sc to the output connection unit 13, thereby to supply the ac current outputted by the normal inverter to both the induction motors 3a and 3b.

Moreover, when one of the inverters 4a and 4b becomes abnormal by shorting the output of the battery 5, the controller 6 outputs an interrupt signal Sd to the power connection unit 15 in order to prevent an over-current. As a result, the current from the battery 5 to the abnormal inverter is interrupted.

Figure 2:
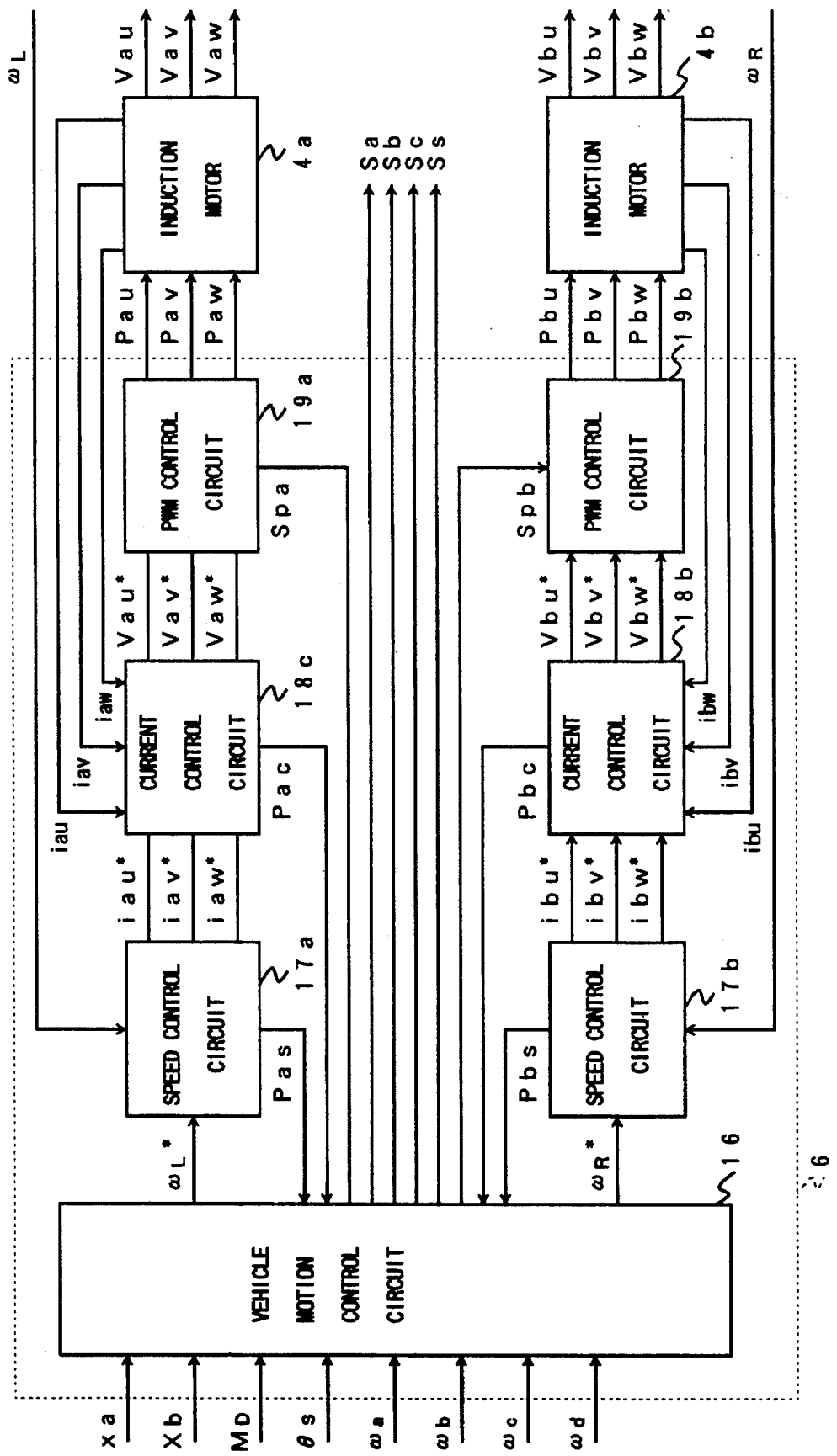
FIG. 2 is a block diagram showing the arrangement of the details of a controller.

FIG. 2 is a block diagram showing the detailed arrangement of the controller 6. The controller 6 is made up of a vehicle motion calculation circuit 16, speed control circuits 17a and 17b, current control circuits 18a and 18b, and PWM control circuits 19a and 19b. The vehicle motion control circuit 16 calculates the amount Xa of actuation of the accelerating pedal, the amount Xb of actuation of the brake pedal, the steering angle $\Theta_s$, a left speed command $\omega_L^*$ and a right speed command $\omega_R^*$ based on the rotating speeds of the respective wheels, thereby to output the calculation results to the speed control circuits 17a and 17b, respectively.

Then, since the method of driving the right-hand side motor is the same as that of driving the left-hand side motor, the description thereof hereinbelow will be directed to the control of the left-hand side induction motor 3a. The speed control unit 17a detects the left speed $\omega_L$ of the induction motor 3a to feed it back and performs the speed control calculation in such a way that the torque corresponding to the left speed command $\omega_L^*$ is generated from the induction motor 4a. Thus, the unit 17a outputs left current commands $i_{au}^*$, $i_{av}^*$ and $i_{aw}^*$ of individual phases of the induction motor 3a. Incidentally, since each of the induction motors is a three-phase induction motor, three-phase current commands are outputted. Moreover, the detected left speed $\omega_L$ of the induction motor 3a is compared with a predetermined value. Then, in the ease where the left speed $\omega_L$ exceeds the predetermined value, that speed is judged to be a speed abnormality. On the basis of that judgement, the left speed abnormality signal Pac is outputted so that the vehicle motion control circuit 16 is informed of the abnormality of the left-hand side induction motor 13a.

The current control circuit 18a performs the feedback control in such a way that $i_{au}$, $i_{av}$ and $i_{aw}$ of the current detection values of individual phases correspond to the left current commands $i_{au}^*$, $i_{av}^*$ and $i_{aw}^*$ to perform the current control calculation, thereby to output the voltage commands $V_{au}^*$, $V_{av}^*$ and $V_{aw}^*$.

Moreover, the current control circuit 18a compares the detected current values $i_{au}$, $i_{av}$ and $i_{aw}$ of individual phases with a predetermined value. Then, in the ease where those current values exceed the predetermined value, each of the currents is judged to be an over-current. As a result of this judgement, the left over-current signal Pac is outputted so that the vehicle motion control circuit 16 is informed of the abnormality of the left-hand side current control circuit 18a.

The PWM control circuit 19a converts the voltage commands $V_{au}^*$, $V_{av}^*$ and $V_{aw}^*$ into respective pulses to turn the inverter 4a ON or OFF. As a result, the output voltage of the inverter 4a is controlled and the induction motor 3a is driven. Moreover, when receiving the PWM pulse stop signal Spa from the vehicle control circuit 16, the PWM control circuit 19a serves to stop the PWM pulses Pau, Pav and Paw.

Incidentally, the vehicle motion control circuit 16 is constructed by a digital computer and operates on the basis of a predetermined program.

Figure 3:
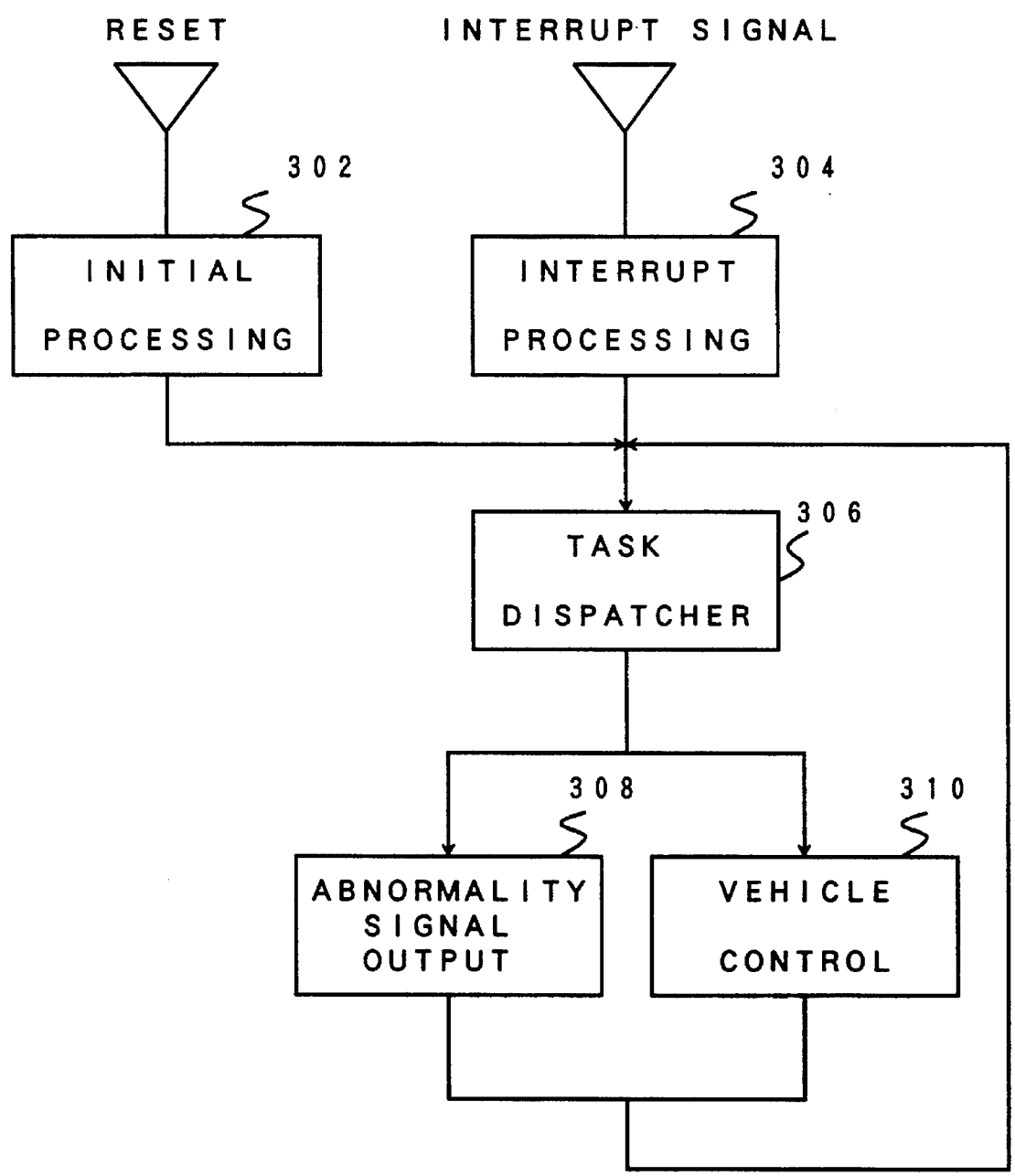
FIG. 3 is a flow chart illustrating a programming system showing the operation of a vehicle motion control circuit.

FIG. 3 is a flow chart illustrating a programming system showing the operation of the vehicle motion control circuit 16. First, when a key switch is turned ON and the vehicle motion control 16 is reset, an initial processing 302 is performed. When the initial processing has been completed, there is provided a state which allows an interrupt signal to be received.

In the vehicle motion control circuit 16, the interrupt signals are generated with a period of 1 msec and with a period of 500 msec, and correspondingly, an interrupt processing 304 is performed. Incidentally, although the details will be described later, the interrupt signal which is generated with a period of 1 msec is used to perform vehicle control, and the interrupt signal which is generated with a period of 500 msec is used to output an abnormality signal.

After the completion of the interrupt processing 304, a task dispatcher 306 is performed 80 that the interruption source is checked, and correspondingly, the abnormality signal output or the vehicle control is selected.

Figure 4:
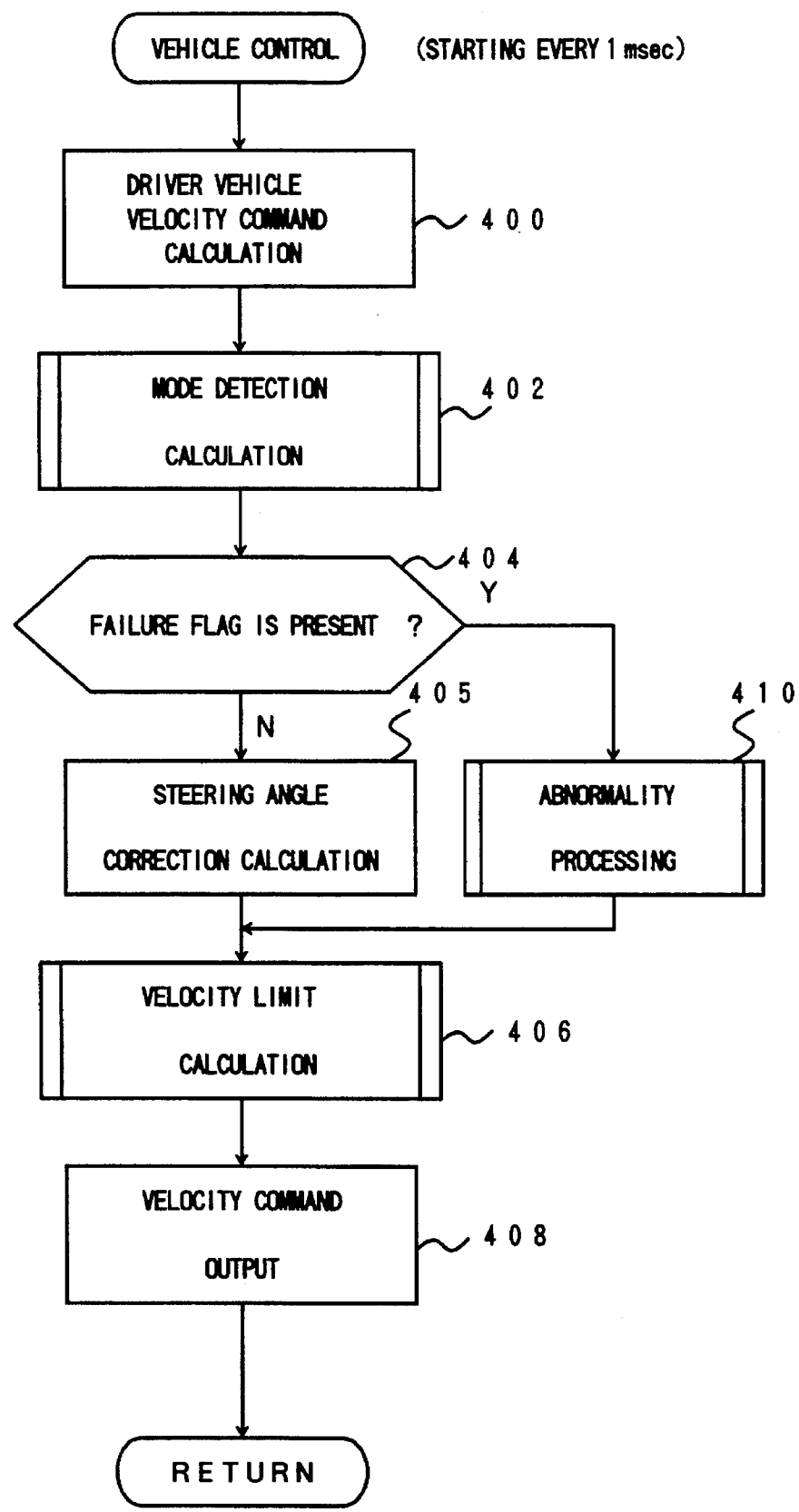
FIG. 4 is a flow chart showing the details of the operation of a vehicle control.

FIG. 4 is a flow chart showing the details of the operation of the vehicle control in Step 310 shown in FIG. 3. First, in Step 402, on the basis of the amount Xa of actuation of the accelerating pedal, the amount Xb of actuation of the brake pedal, and the like, a travel velocity (a driver vehicle velocity command) which represents the intention of the driver is calculated. In Step 402, a mode detection calculation (i.e., the operation of a subroutine program shown in FIG. 5 and FIG. 6) is performed and it is judged whether or not one of the inverters 4a and 4b and the like has become abnormal.

In Step 404, it is judged whether or not a failure flag is present. That is, in correspondence to the presence of an abnormality in one of the inverters 4a and 4b and the like, a subsequent processing is determined. If the failure flag is present, in Step 410, an abnormality processing (i.e., the operation of a subroutine program shown in FIG. 7) is performed and the processing is performed in such a way that when one of the inverters 4a and 4b and the like has become abnormal, vehicle travel can be performed, thereby to complete this flow.

If the failure flag is absent in Step 404, a steering angle correction calculation is performed in Step 405. That is, in Step 405, the wheel speed correction is calculated on the basis of the steering angle $\Theta_s$ of the steering wheel. More specifically, when the vehicle is travelling on a circular route, there is generated a difference in speed between the inner wheel and the outer wheel. Therefore, when the steering wheel is being turned to the right, the left speed command of the left-hand side motor 3a is obtained by adding a wheel speed correction to the vehicle velocity command, and the right speed command of the right-hand side motor 3b is obtained by subtracting the wheel speed correction from the vehicle velocity command $\omega^*$. Moreover, at this time, since the speed difference therebetween depends on the vehicle velocity, the vehicle velocity is calculated on the basis of the average of the speeds of the individual wheels, and a wheel speed difference correction which is calculated from the steering angle is changed in correspondence to the resulting value.

After Step 405, in Step 406, a velocity limit calculation (i.e., the operation of a subroutine program shown in FIG. 8) is performed. Then, when a vehicle velocity command which is greater than or equal to a predetermined velocity or a predetermined acceleration is present, this vehicle velocity command is limited.

As a result, both the vehicle velocity and the acceleration are limited. Therefore, even if the driver steps on the accelerator pedal 7, the velocity or acceleration is limited to a predetermined vehicle velocity or acceleration or more. Incidentally, the maximum velocity is normally set to the rated maximum velocity of the vehicle. In the backward movement, the maximum velocity is set to a value less than the rated maximum velocity, while in the case of an abnormality, it is set to the maximum velocity corresponding to the abnormal state.

Moreover, the maximum acceleration is normally set on the basis of the designed maximum output of the motor. Incidentally, in the case of an induction motor, the maximum acceleration may be set by taking the maximum slip into consideration. Moreover, in the case of an abnormality, the maximum acceleration is set to the maximum acceleration corresponding to the abnormal state. Further, the limitation of the variation of velocity is performed with respect to the deceleration direction as well as the acceleration direction.

After Step 406, in Step 408, the velocity command output processing is performed. That is, the right and left vehicle velocity commands which have been obtained from the calculations performed in Step 402 to Step 406 are respectively outputted to the speed control circuits 17b and 17a.

Incidentally, although it will be repeatedly described, in the case where the inverters 4a and 4b and the like are in the normal state, by performing the calculations through Step 402 to Step 406, the motion of the vehicle is controlled. When they are judged to be abnormal in Step 404, the abnormality processing is performed in Step 410.

Figure 5:
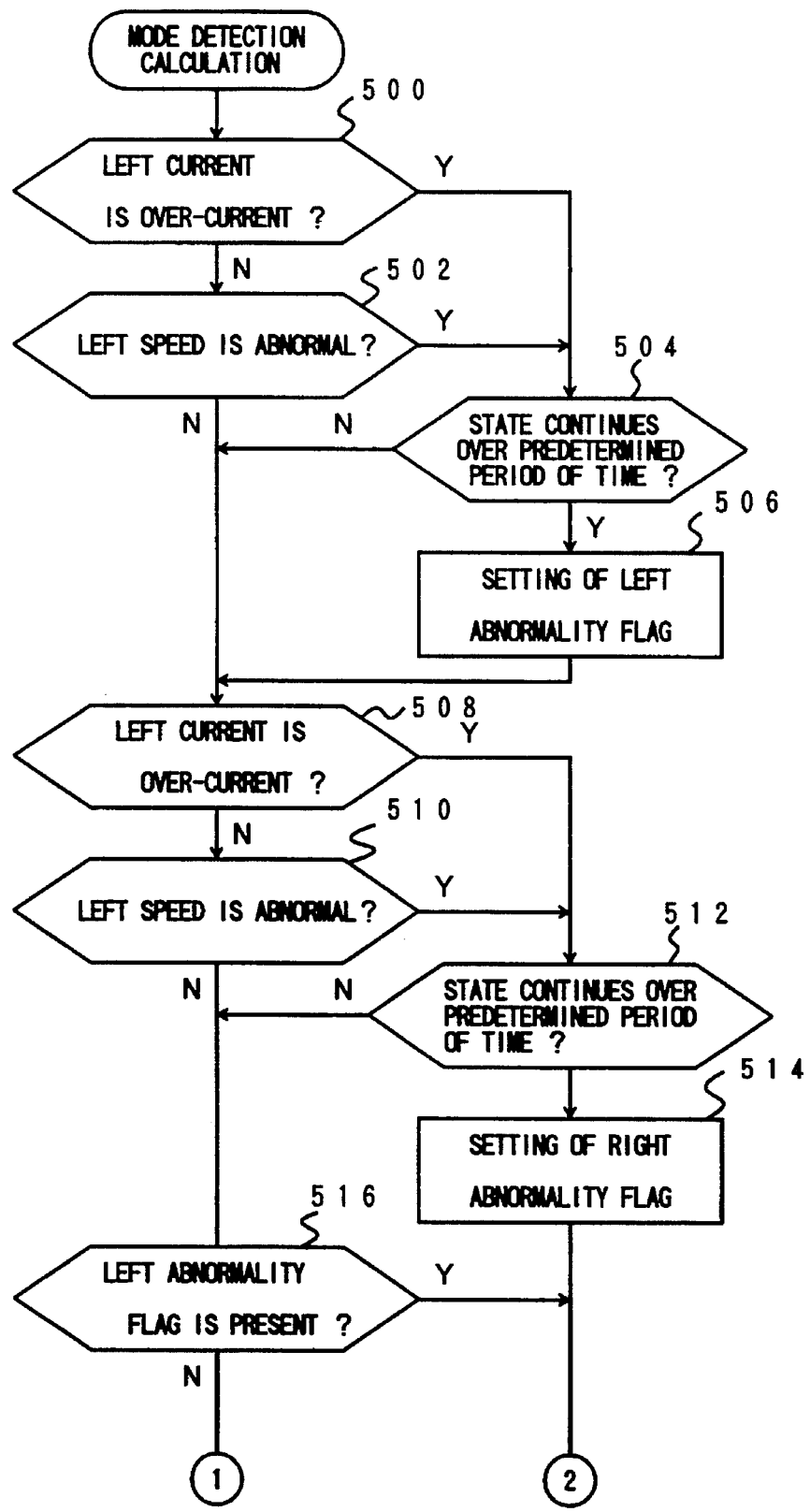
FIG. 5 is a flow chart of a subroutine program showing the details of mode detection calculation.
Figure 6:
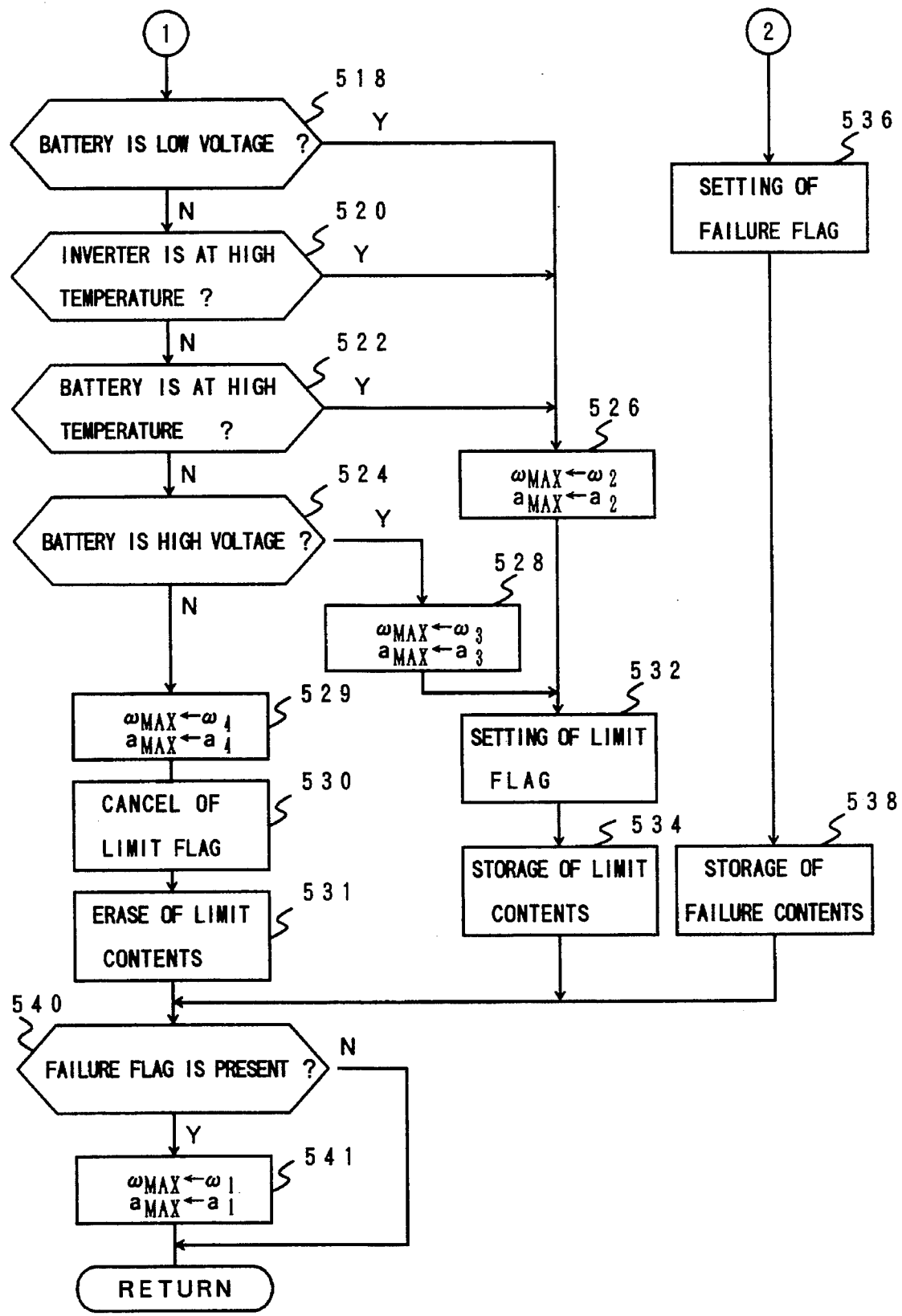
FIG. 6 is a flow chart of a subroutine program showing the details of mode detection calculation.

FIG. 5 and FIG. 6 represent a flow chart of a subroutine program showing the details of the mode detection calculation performed in Step 402 of the flow chart of FIG. 4. First, in Step 500, it is judged whether or not a current flowing through the left-hand side inverter 4a is an over-current. Incidentally, this judgement is, as described above, performed depending on the presence of the output of the left over-current signal Pac supplied from the current control circuit 8a. If the current flowing through the left-hand side inverter 4a is an over-current, the processing proceeds to Step 504.

If the current flowing through the left-hand side inverter 4a is not an over-current, the processing proceeds to Step 502. In Step 502, it is judged whether or not the speed of the left-hand side induction motor 3a is abnormal. Incidentally, this judgement is, as described above, performed depending on the presence of the output of the left speed abnormality signal Pas supplied from the speed control circuit 17a. If the speed of the left-hand side induction motor 3a is abnormal, the processing proceeds to Step 504.

In Step 504, it is judged whether or not a state, in which the current flowing through the left-hand side inverter 4a is an over-current or the speed of the left-hand side induction motor 3a is abnormal, continues over a predetermined period of time. If such a state continues over a predetermined period of time, since the inverter 4a or the induction motor 3a become abnormal, a left abnormality flag is set in Step 506. If it is judged in Step 504 that the state, in which the current flowing through the left-hand side inverter 4a is an over-current or the speed of the left-hand side induction motor 3a is abnormal, does not continue over a predetermined period of time, since such a state may be simply momentary, it is not yet judged that they are abnormal. Then, the processing proceeds to Step 508 directly.

In Step 508 to Step 514, in a similar manner, it is judged whether or not the right-hand side inverter 4b and the right-hand side induction motor 3a are abnormal. In Step 508, it is judged depending on the presence of a right over-current signal whether $\Phi_{bc}$ or not a current flowing through the right-hand side inverter 4b is an over-current. If that current is an over-current, the processing proceeds to Step 504. If it is found that the current flowing through the right-hand side inverter 4b is not an over-current in Step 508, the processing proceeds to Step 510. Then, it is judged depending on the presence of a right speed abnormality signal Pbs whether or not the speed of the right-hand side induction motor 3b is abnormal. If that speed is abnormal, the processing proceeds to Step 512. On the other hand, if that speed is not abnormal, the processing proceeds to Step 516.

In Step 512, it is judged whether or not a state, in which the current flowing through the right- hand side inverter 4b is an over-current or the speed of the right-hand side induction motor 3b is abnormal, continues over a predetermined period of time. If such a state continues over a predetermined period of time, the processing proceeds to Step 514. On the other hand, if the state, in which the current flowing through the right-hand side inverter 4b is an over-current or the speed of the right-hand side induction motor 3b is abnormal, does not continue for the predetermined period of time, the processing proceeds to Step 516.

Although in Step 516, the right-hand side inverter 4b or the right-hand side induction motor 3b is not judged to be abnormal, it is judged whether or not the left-hand side inverter 4a or the left-hand side induction motor has already been judged to be abnormal. That is, if a left abnormality flag is set, the processing proceeds to Step 536. On the other hand, if the left abnormality flag is not set, the processing proceeds to Step 518.

In Step 536, a failure flag is set. Further, in Step 530, the failure contents are stored in an EA-ROM or a back-up RAM and are held as they are so as not to be erased after the key switch has been turned OFF. After the completion of Step 538, the processing proceeds to Step 540.

Incidentally, although the details will be described later, the system is designed in such a way that once the failure flag is set, that flag will not be able to be canceled unless the routine of the initial processing is executed by turning the key switch ON to reset the power supply. Therefore, the vehicle is designed in such a way that if the failure flag is set, the vehicle will not be able to travel with the normal maximum velocity unless the power is turned OFF.

In Step 500 to Step 516, a serious problem due to failure of the inverters 4a, 4b and the induction motors 3a, 3b is detected so as to perform a processing corresponding to that problem. On the other hand, in Step 518 to Step 531, the problems of reliability which are less serious, such as a decrease in the voltage of the battery, a rise in the temperature of the inverter, a rise in the temperature of the battery and an increase in the voltage of the battery, are detected to perform the processings corresponding to those problems.

In Step 518, it is judged whether or not the voltage of the battery 5 is less than or equal to a predetermined voltage. If the voltage of the battery 5 is less than or equal to a predetermined voltage, the processing proceeds to step 526. If the voltage of the battery 5 is not less than or equal to a predetermined voltage, the processing proceeds to Step 520. In Step 520, it is judged whether or not the temperature of the inverters 4a and 4b is more than or equal to a predetermined temperature. If the temperature of the inverters 4a and 4b is more than or equal to a predetermined temperature, the processing proceeds to Step 526. If the temperature of the inverters 4a and 4b is not more than or equal to a predetermined temperature, the processing proceeds to Step 522. In Step 522, it is judged whether or not the temperature of the battery 5 is more than or equal to a predetermined temperature. If the temperature of the battery 5 is more than or equal to a predetermined temperature, the processing proceeds to Step 526. If the temperature of the battery 5 is not more than or equal to a predetermined temperature, the processing proceeds to Step 524.

In Step 526, since the failure has been judged to be a failure of less seriousness, the abnormality maximum speed $\omega_{MAX}$ and the abnormality maximum acceleration $a_{MAX}$ are set to $\omega_2$ and $a_2$, respectively. Incidentally, with respect to the failures, such as decrease of voltage of the battery and rise of temperature of the inverters and the battery fluid, there is the possibility that a safety circuit of the controller 6 is activated for avoidance of the failure and the like so that when the travelling velocity is increased, the vehicle will be stopped. Therefore, the abnormality maximum speed $\omega_{MAX}$ and the abnormality maximum acceleration $a_{MAX}$ are respectively set to values ($\omega_4$, $a_4$) which are much lower than the maximum speed $\omega_4$ and the maximum acceleration $a_4$, respectively, which are determined by the rated outputs of the induction motors 3a and 3b. After the completion of Step 526, the processing proceeds to Step 532.

In Step 524, it is judged whether or not the voltage of the battery 5 is more than or equal to a predetermined voltage. Incidentally, the comparison voltage in Step 524 is set to a voltage which is much higher than the comparison voltage in Step 508. If the voltage of the battery 5 is more than or equal to a predetermined voltage, the processing proceeds to Step 528. In Step 528, the abnormality maximum speed $\omega_{MAX}$ and the abnormality maximum acceleration $a_{MAX}$ are set to $\omega_3$ and $a_3$, respectively. Incidentally, since such a failure is of less seriousness, even when the voltage of the battery becomes high, the vehicle is not hindered so much for normal travelling. Then, the abnormality maximum speed $\omega_{MAX}$ and the abnormality maximum acceleration $a_{MAX}$ are respectively set to values ($\omega_4$, $a_4$) which are slightly lower than the maximum speed $\omega_4$ and the maximum acceleration $a_4$, respectively, which are determined by the rated outputs of the induction motors 3a and 3b. After the completion of Step 528, the processing proceeds to Step 532.

After the completion of the processing in Step 526, in Step 532, a limit flag 532 is set. Further, in Step 534, the limit contents are stored in the EF-ROM or the back-up RAM, and then the processing proceeds to Step 540.

Incidentally, as described above, once the failure flag is set, that flag will not be able to be canceled unless the key switch is turned ON to reset the power supply. When the failure flag is set, the vehicle cannot travel with the normal maximum velocity unless the power is turned OFF. On the other hand, when a limit flag is being set, the maximum velocity is limited. However, if the limit conditions are released, the limit flag is canceled, and as a result, the vehicle can travel with the normal maximum velocity.

In Step 529, since it is determined through the previous processings that no failure is present, in Step 529, the abnormality maximum speed $\omega_{MAX}$ and the abnormality maximum acceleration ax are respectively set to the maximum speed $\omega_4$ and the maximum acceleration $a_4$ which are determined by the rated outputs of the induction motors 3a and 3b. Further, in Step 530, the control flag is canceled, and in Step 531, the limit contents stored in the memory are erased.

In Step 540, it is judged whether or not a failure flag is set. If the failure flag is set, the abnormality speed $\omega_{MAX}$ and the abnormality maximum acceleration $a_{MAX}$ are respectively set to $\omega_1$ and $a_1$ to complete this flow. Incidentally, when the failure flag is set, it is because the inverters 3a, 3b and the induction motors 4a, 4b have broken down. Therefore, since the failure of the inverters 3a, 3b and the induction motors 4a, 4b results in an abnormality in the generation of a driving force, the result will reduce the reliability of the vehicles. For this reason, $\omega_1$ and $a_1$ are set to the respective lowest values with which the electric vehicle can travel with difficulty. As a result, rapid acceleration and rapid deceleration are prevented. In addition, as described above, once the flag is set, the maximum speed is reduced to $\omega_1$ unless the power is turned OFF, so that the vehicle can travel in safety. If the failure flag is not set in Step 540, this flow is then completed.

Now, the description will be given of the abnormality maximum speed ω and the abnormality maximum acceleration a.

$\omega_1$, $\omega_2$ and $\omega_3$, and $a_1$, $a_2$ and $a_3$ are set in such a way as to establish the following relationships.

$$\omega_1 < \omega_2 < \omega_3, \ a_1 < a_2 < a_3$$

Therefore, in the case of the high voltage of the battery with which the vehicle is capable of travelling, ω3 is set to a value which is slightly lower than the normal maximum speed. Moreover, with respect to the low voltage of the battery and the high temperature of the inverters and the battery fluid, $\omega_2$ is set to a value lower than $\omega_3$. Further, in the case of the presence of an abnormality in the generation of the driving force, such as the failure of the inverters, since it is considered that the reliability is degraded, $\omega_1$ is set to a lower value at which the electric vehicle can barely travel. In addition, if the failure flag is set, the maximum speed is reduced to $\omega_1$ unless the power is turned OFF, so that the vehicle can travel in safety. Similarly, with respect to the acceleration as well, a velocity command can be given in such a way that when the degree of the abnormality is large, rapid acceleration and rapid deceleration are prevented. Moreover, in the case where the degree of the abnormality is shifted from a small one to a large one, the maximum speed is automatically reset to a lower value, and therefore, the vehicle can travel or be stopped in safety.

Figure 7B:
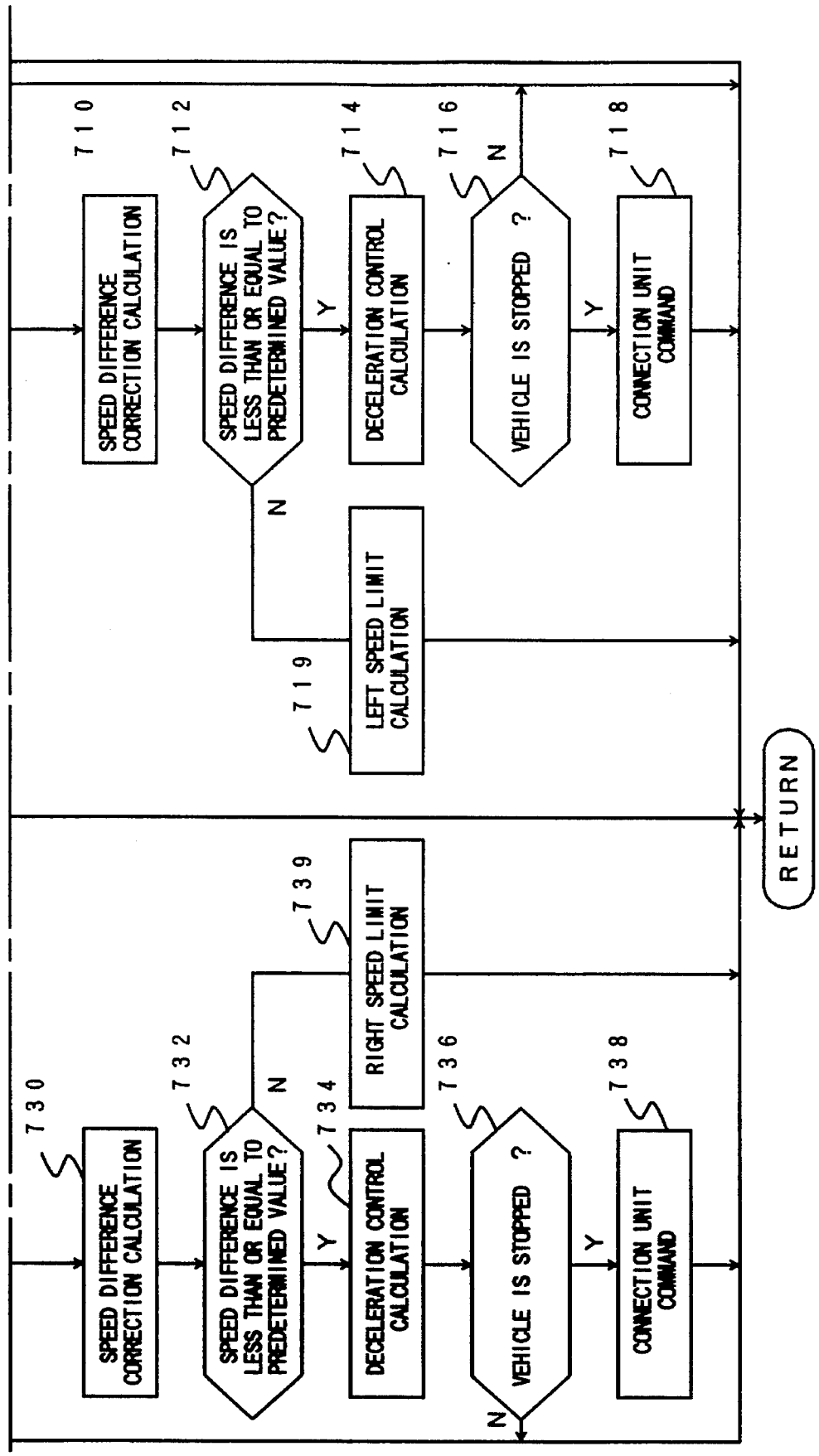

FIG. 7 is a flow chart of a subroutine program showing the details of the abnormality processing shown in Step 410 of the flow chart of FIG. 4. First, in Step 700, it is judged whether or not a left abnormality flag is set. That is, it is judged whether or not the left-hand side inverter 4a or the left-hand side induction motor 3a is faulty. If the left-hand side inverter 4a and the left-hand side induction motor 3a are not faulty, the processing proceeds to Step 704. Then, in Step 704, it is judged whether or not the right abnormality flag is set. That is, it is judged whether or not the right-hand side inverter 4b or the right-hand side induction motor 3b is faulty. If the right-hand side inverter 4b or the right-hand side induction motor 3b is judged to be faulty in Step 704, since the left-hand side inverter 3a and the left-hand side induction motor 4a are working properly, as described above, the left-hand side induction motor 4a is activated in such a way as to be able to drive both the front left driving wheel 2a and the front right driving wheel 2b through Step 706 to Step 718. Incidentally, if the right-hand side inverter 4b and the right-hand side induction motor 3b are judged to be normal in Step 704, since both the right and left driving systems are working properly, this flow is completed.

In Step 706, the PWM pulse stop signal Spb is outputted to the right-hand side inverter 4b and the output of the PWM pulse of the left-hand side inverter 4a is stopped. As a result, the drive of the left-hand side induction motor 3a by the left-hand side inverter 4a is stopped. Further, in Step 708, it is judged whether or not the connection signal Sc has already been outputted to the output connection unit 13, so that the output connection unit 13 is in a closed state. If the output connection unit 13 is already in the closed state and both the wheels are driven by the one induction motor, since there is no need for performing the processing for switching the output connection unit 13 into the closed state, this flow is completed.

If in Step 708 the output connection unit 13 is not in the closed state, the speed difference between the right and left induction motors is calculated in Step 710 on the basis of the output of the encoder 12b for detecting the rotating speed of the front right wheel 2b, and the calculated left speed command $\omega_L$. In Step 712, it is judged whether or not the speed difference between the right and left induction motors is sufficiently small. If the speed difference between the right and left induction motors is more than a predetermined value, the left speed command $\omega_L$ is calculated so as to reduce the speed difference between the right and left induction motors, thereby to complete this flow.

If in Step 712 the speed difference between the right and left induction motors is less than or equal to a predetermined value, in order to decelerate the vehicle, a control is performed so as to make the right-hand side induction motor 3b exert a regenerative braking. Incidentally, the control is performed in such a way that the regenerative braking does not induce a motion in the yawing direction of the vehicle, i.e., so as not to generate a spin. In Step 716, it is judged whether or not the vehicle is stopped. Then, if the vehicle is not stopped, this flow is completed. If in Step 716, the vehicle is judged to be stopped, in Step 718, the connection signal Sc is outputted to the output connection unit 13 so that both the left-hand side induction motor 3a and the right-hand side induction motor 3b can be driven by only the output of the left-hand side inverter 4a. Moreover, at the same time, the interrupt signal Sa is outputted to the output connection unit 14b to interrupt the electrical connection between the right-hand side inverter 4b and the right-hand side induction motor 3b.

In the case where it is judged in Step 700 that the left abnormality flag is set and in Step 702 that the right-hand side abnormality flag is set, both the drive by the left-hand side induction motor 3a and the drive by the right-hand side induction motor 3b are disabled. For this reason, in Step 720, the PWM pulse stop signal Spa is outputted to the left-hand side inverter 4a, thereby to stop the output of the PWM pulse of the left-hand side inverter 4a. Further, in Step 724, the PWM pulse stop signal Spa is outputted to the right-hand side inverter 4b, thereby to stop the output of the PWM pulse of the right-hand side inverter 4b.

In the case where it is judged in Step 700 that the left abnormality flag is not set, and in Step 702 that the right abnormality flag is not set, the processing proceeds to Step 726. In this case, there is performed a processing for driving both the right-hand side induction motor 3b and the left-hand side induction motor 3a by the right-hand side inverter 4b. This processing is performed through Step 726 to Step 739. However, since this processing is the same as the above-mentioned processing in Step 704 to Step 719, the description thereof will be omitted here for brevity.

Figure 8:
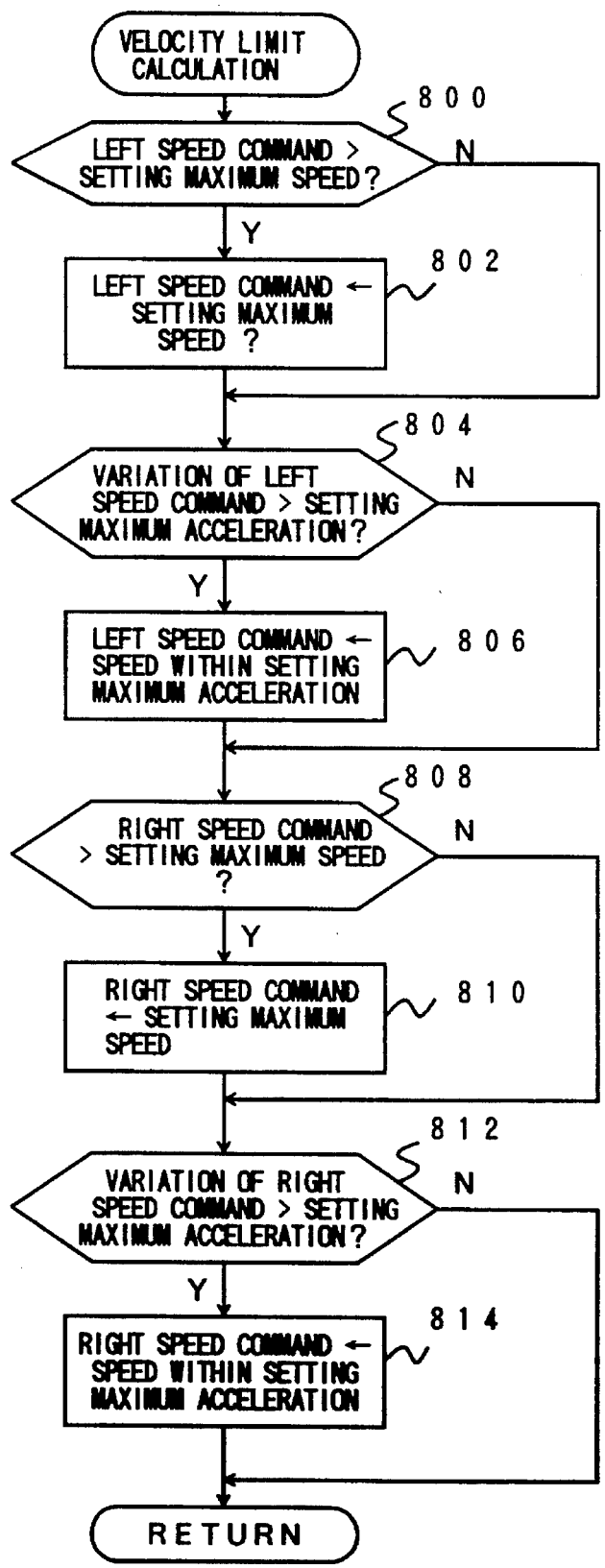
FIG. 8 is a flow chart of a subroutine program showing the details of velocity limit calculation.

FIG. 8 is a flow chart of a subroutine program showing the details of the velocity limit calculation shown in Step 406 of the flow chart of FIG. 4. First, in Step 800, it is judged whether or not the left speed command $\omega_L$ is greater than the abnormality maximum speed $\omega_{MAX}$. If so, in Step 802, the abnormality maximum speed $\omega_{MAX}$ is replaced with the left speed command $\omega_L$, and then the processing proceeds to Step 804. Moreover, if the left speed command $\omega_1$ is less than the abnormality maximum speed $\omega_{MAX}$ in Step 800, the processing proceeds to Step 804 directly.

In Step 804, it is judged whether or not the variation of the left speed command $\omega_L$ (or the left speed command $\omega_L$ set in Step 802) is greater than the abnormality maximum acceleration $a_{MAX}$. If so, the left speed command $\omega_L$ is corrected in such a way as to be in the range of the abnormality maximum acceleration $a_{MAX}$. Then, the processing proceeds to Step 808. If in Step 804, the variation of the left speed command $\omega_L$ (or the left speed command $\omega_L$ set in Step 802) is less than the maximum acceleration $a_{MAX}$, the processing proceeds to Step 808 directly.

In Step 808 to Step 814, the processing for the right speed command is performed. However, since this processing is the same as the processing carried out in Step 800 to Step 814, the description thereof will be omitted here for brevity.

Figure 9:
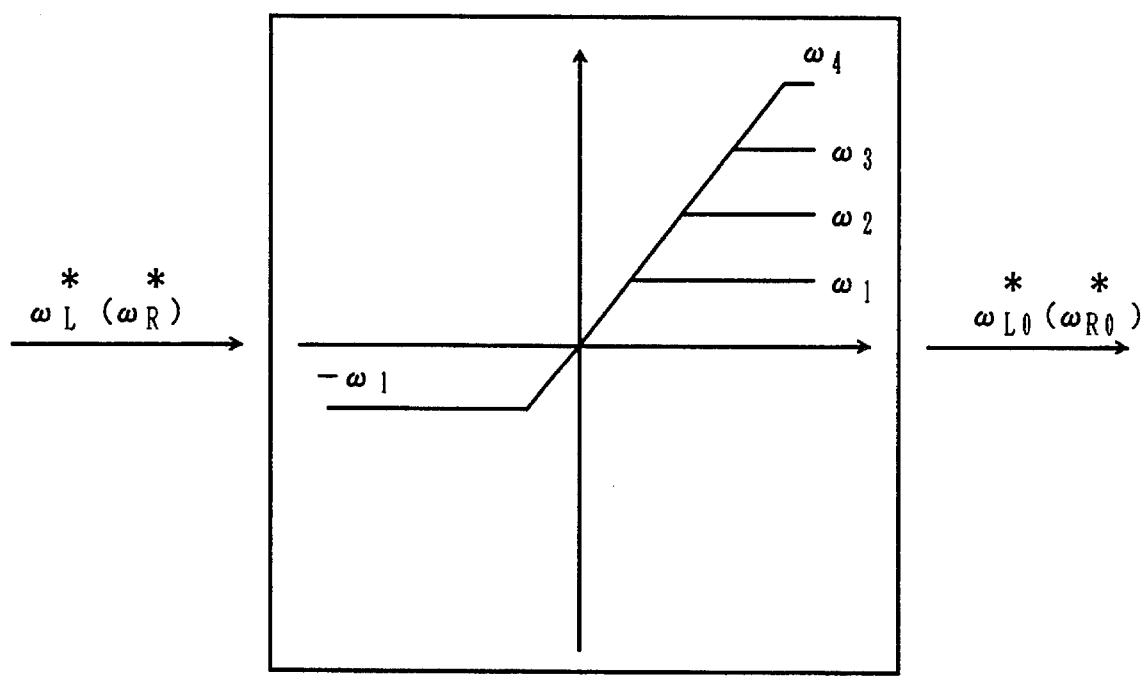
FIG. 9 is a schematic view showing the velocity limit calculation.

An outline of the velocity limit calculation will now be described with reference to FIG. 9. Now, it is assumed that the speed command prior to the speed limit calculation is $\omega_L^*$ ($\omega_R^*$), and the speed command following the speed limit calculation is $\omega_{LO}^*$. Then, $\omega_L^*$ ($\omega_R^*$) plotted on the abscissa is controlled corresponding to the maximum speed ($\omega_1$ to $\omega_4$) obtained by the mode detection calculation, thereby to determine $\omega_{LO}^*$ ($\omega_{RO}^*$) plotted on the ordinate.

Figure 10:
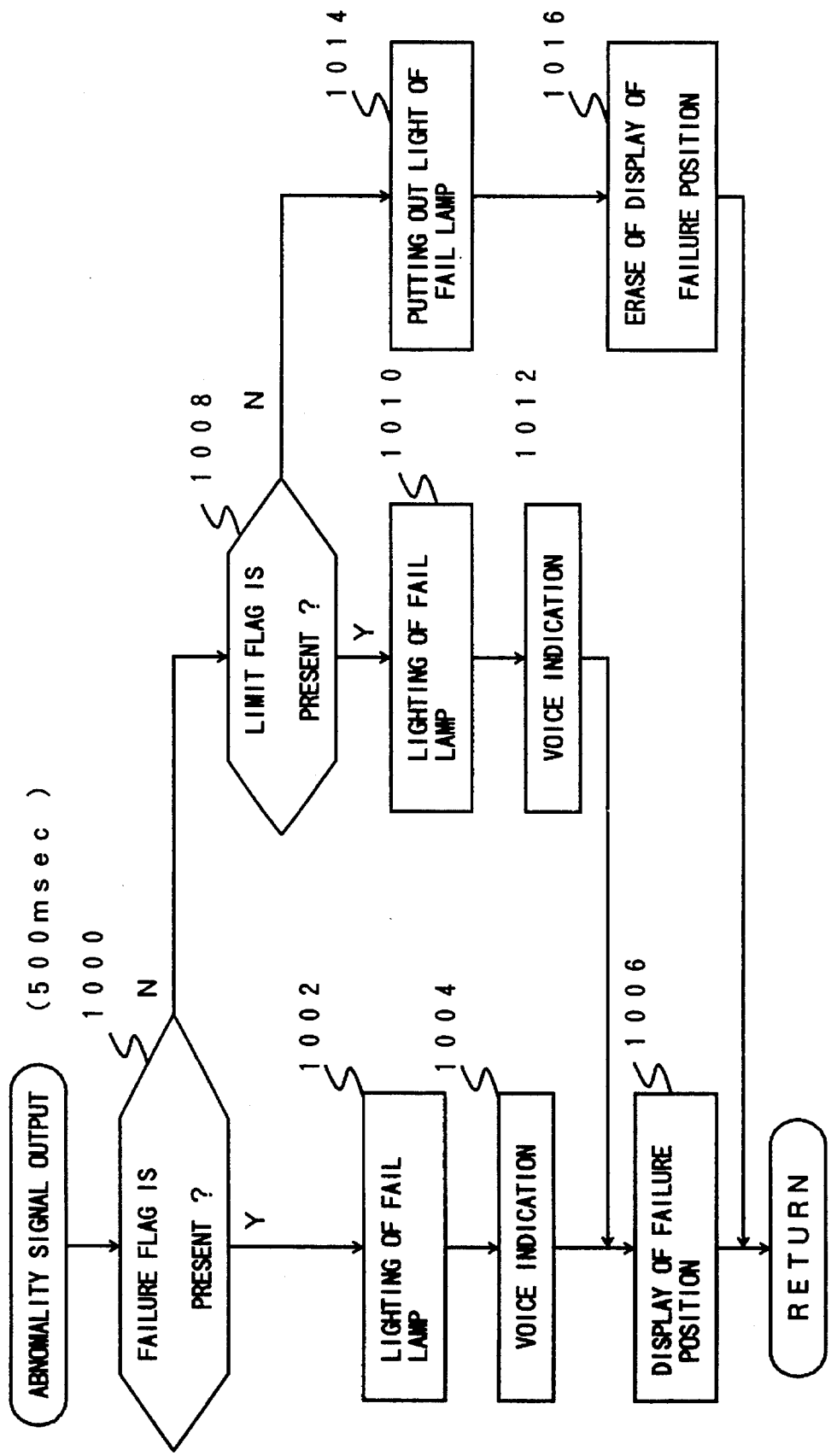
FIG. 10 is a flow chart of a subroutine program showing the details of an abnormality signal output.

FIG. 10 is a flow chart showing the details of the operation of the vehicle control in Step 308 shown in FIG. 3. Incidentally, the operation of this flow chart is started every 500 msec. In Step 1000, it is judged whether or not the failure flag is set. If the failure flag is set, a failure lamp is lighted in Step 1002, and in Step 1004, the action which is to be taken by the driver in the case of failure is announced by a voice message.

Further, in Step 1006, the failure position is displayed to complete this flow.

If the failure flag is not set in Step 1000, it is judged in Step 1008 whether or not the limit flag is set. If the limit flag is set, the failure lamp is lighted in Step 1010, and in Step 1012, the action which is to be taken by the driver is announced by a voice message. Further, in Step 1006, the failure position is displayed at the drivers seat, thereby to complete this flow. Moreover, if in Step 1008, the limit flag is not set, the failure lamp is put out in Step 1014, and in Step 1016, the screen of the failure position is erased, thereby to complete this flow.

Figure 11:
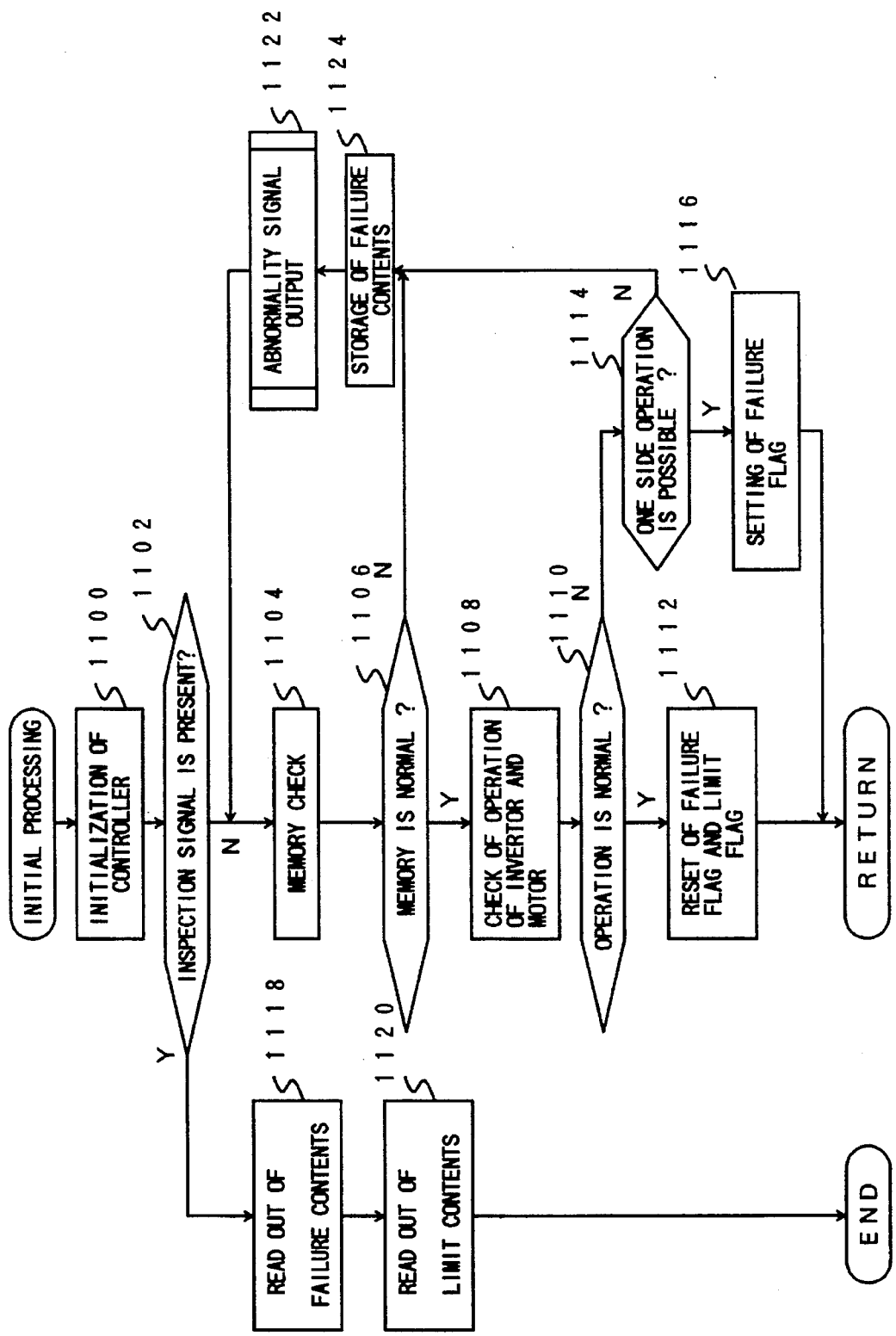
FIG. 11 is a flow chart of a subroutine program showing the details of an initial processing.

FIG. 11 is a flow chart showing the details of the initial processing in Step 302 shown in FIG. 3.

First, after various kinds of initialization have been performed in Step 301, it is judged in Step 302 whether or not an inspection signal from a maintenance designating circuit 24 is preset. Then, the maintenance designating circuit 24 is arranged in such a way as to be able to be operated by only the specific person who works in maintenance and repair or the like and is capable of carrying out the maintenance and repairing. The control switch for the circuit 24 is activated to make the inspection signal go to ON.

If the inspection signal is judged to be present in Step 1102, the above-mentioned failure contents are read out in Step 1118, and the limit contents are read out in Step 1120 to announce those contents from the maintenance designating circuit 24 to the driver. As a result, it is possible to specify the failure position and to repair or adjust it easily.

On the other hand, when it is judged in Step 1102 that the inspection signal is absent, i.e., when the inspection signal is OFF so that the electric vehicle travels in a normal manner, it is confirmed in Step 1104 by the sum check and the rewriting check that there is no abnormality in the read only memory (ROM) and the random access memory (RAM). Then, it is judged in Step 1106, depending on that result, whether or not the memorys are normal. If each memory is normal, or if operation of motor and inverter is not normal, the processing proceeds to Step 1124. In Step 1108, the operations of the inverters and the motors are checked, and in Step 1110, on the basis of the checking result, it is judged whether or not the operations are normal. In the case of normality, since it has been able to be confirmed that there is no abnormality in all of the units which were checked, in Step 1112, the failure flag and the limit flag are reset.

When it is determined in Step 1110 that the operation of the inverter or the motor is not normal, it is judged in Step 1114 that the vehicle can be driven only by one side motor. If so, after the failure flag is set in Step 1116, this flow is completed. Incidentally, at this time, the maximum velocity is limited so that the vehicle cannot travel at a high speed.

In the mean time, when it is determined in Step 1114 that the drive by only one side motor is also impossible, after the failure contents have been stored in Step 1124, in Step 1122 the processing proceeds to the above-mentioned subroutine for the abnormality signal output to announce the abnormality to the driver.

If the present embodiment is employed, even in the case where one inverter breaks down, the two motors can be driven by the other inverter through the operation of the output connection unit 13, and therefore, the vehicle can be moved safely. In this method, after the vehicle is stopped, the connection unit is operated, and therefore, when performing the connection, the connection can be readily performed by only confirming that the vehicle velocity is zero.

Next, a second embodiment of the present invention will be described with reference to FIG. 12 and FIG. 13. In the second embodiment, the current phases of the left-hand side induction motor 3a and the right-hand side induction motor 3b are detected. When one of the inverters 4a and 4b breaks down, the output connection unit 13 is connected so as to reduce the difference between the current phase of the left-hand side induction motor 3a and that of the right-hand side induction motor 3b.

Figure 12:
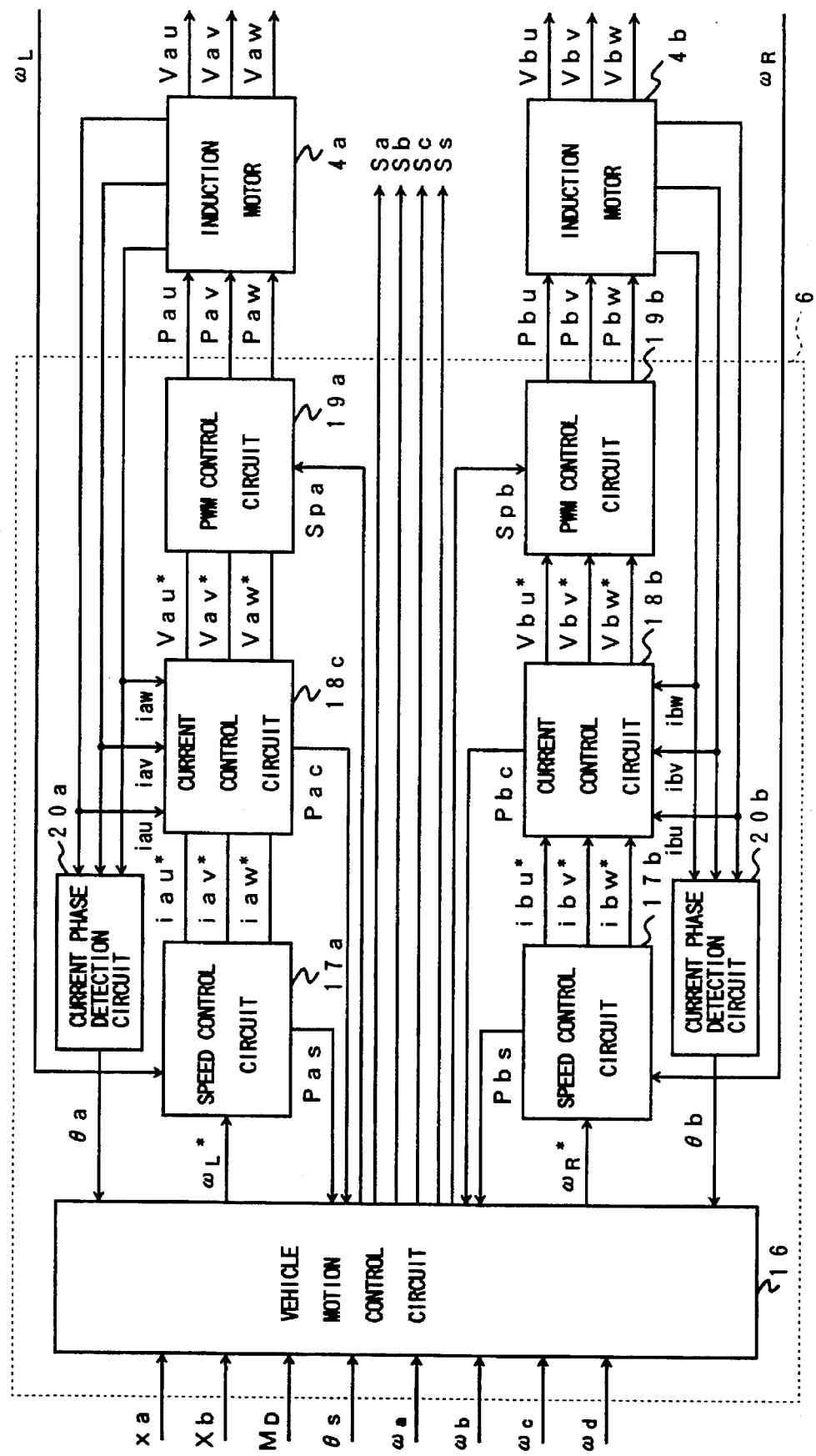
FIG. 12 is a block diagram showing the detailed arrangement of a controller of the second embodiment.

FIG. 12 is a block diagram showing the detailed construction of the controller of the second embodiment. Incidentally, since the system arrangement of the electric vehicle is the same as that of the first embodiment, the description thereof will be omitted here for brevity. In FIG. 12, the current detection values ($i_{aw}$, $i_{av}$, $i_{au}$) ($i_{bw}$, $i_{bv}$, $i_{bu}$) of the currents of individual phases flowing through the induction motors 4a and 4b are respectively inputted to the current control circuits 18a and 18b, and also are respectively inputted to current phase detection circuits 20a and 20b. The current phase detection circuits 20a and 20b respectively produce current phase signals Θa and Θb on the basis of the current detection values ($i_{aw}$, $i_{av}$, $i_{au}$) ($i_{bw}$, $i_{bv}$, $i_{bu}$). The outputs of the current phase detection circuits 20a and 20b are inputted to the vehicle motion control circuit 16. Incidentally, since the control circuit is the same in arrangement as that of the first embodiment except for the provision of the current phase detection circuits 20a and 20b, the description of the other parts will be omitted here.

FIG. 13 is a flow chart of a subroutine program for the abnormality processing of the second embodiment. Incidentally, since the programming system of the second embodiment is the same as that of the first embodiment, the description thereof will be omitted here for brevity. In FIG. 13, instead of Step 714 and Step 716 of FIG. 7, Step 1302 and Step 1304 are provided. Further, instead of Step 736 and Step 738 of FIG. 7, Step 1306 and Step 1308 are provided.

A brief description will be given of the abnormality processing of the second embodiment with respect to the changed portions. In FIG. 13, if only the right-hand side inverter breaks down, the PWM pulse stop signal Spb is outputted to the right-hand side inverter 3a and the output of the PWM pulse of the right-hand side inverter 3a is stopped (Step 700 to Step 706). Further, when the speed difference between the left-hand side induction motor 3a and the right-hand side induction motor 3b becomes within a predetermined value (Step 712), the processing proceeds to Step 1302. In Step 1302, the current phase difference is calculated on the basis of a left current phase signal Θa and a right current phase signal Θb which were produced by the left-hand side current phase difference detection circuits 20a and 20b. Thus, feedback control is performed so as to reduce that current phase difference. For example, if the relationship of the left current phase Θa<the right current phase ωb is established, the left speed command $\omega_L^*$ is given in such a way that the right-hand side induction motor 3b is decelerated to make both the phases coincide with each other.

In Step 1304, it is judged whether or not the phase difference between the left-hand side induction motor 3a and the right-hand side induction motor 3b is less than or equal to a predetermined value. If so, the processing flow is completed. If in Step 1304, the phase difference between the left-hand side induction motor 3a and the right-hand side induction motor 3b is less than or equal to a predetermined value, in Step 718, the interrupt signal Sb is outputted to the right output connection unit 14b to electrically disconnect the right-hand side inverter 4b and the right-hand side induction motor 3b from each other. Further, the connection signal Sc is outputted to the output connection unit 13 so that both the left-hand side induction motor 3a and the right-hand side induction motor 3b can be driven by the left-hand side inverter 4a.

According to the present embodiment, the two induction motors can be switched at a high speed by one inverter without the vehicle being stopped, and therefore, even when one inverter breaks down, the vehicle can travel in safety without the rectilinear traveling being disturbed.

A third embodiment will now be described with reference to FIG. 14.

In the first and second embodiments in which the respective drives are different from each other, the induction motors and the inverters are electrically connected; whereas in the third embodiment, the two induction motors are connected to a mechanical clutch.

Figure 14:
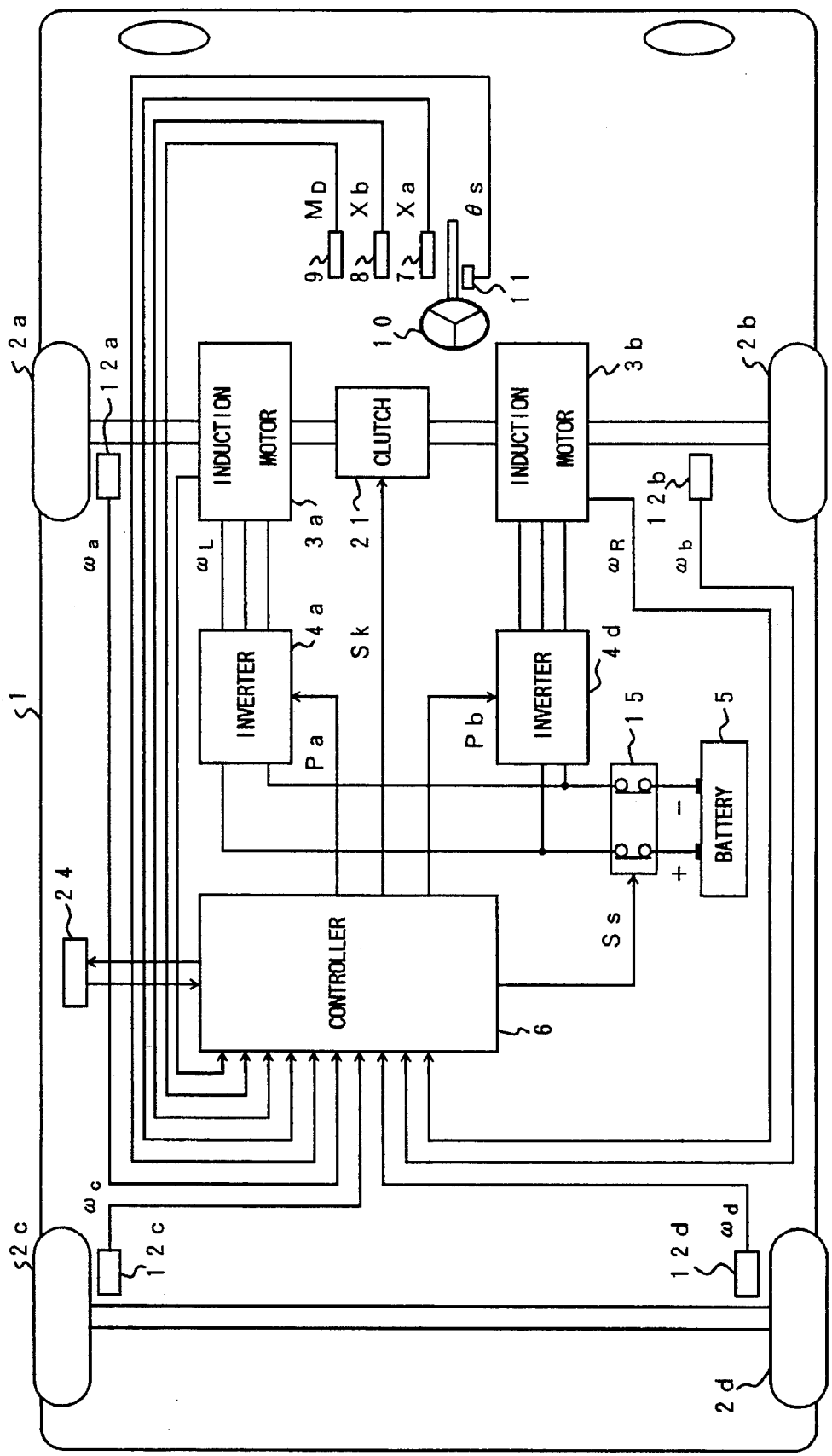
FIG. 14 is a block diagram showing the system arrangement of the third embodiment.

In FIG. 14, the outputs of the inverters 4a and 4b are directly inputted to the induction motors 4a and 4b, respectively, not through the output connection units 14a and 14b as shown in FIG. 2. A clutch between motors 21 is provided between the left-hand side induction motor 3a and the right-hand side induction motor 3b. When a clutch connection signal Sk from the controller 6 is inputted to the clutch 21 between the motors, the left-hand side induction motor 4a and the right-hand induction motor 4b are mechanically connected to each other. Incidentally, since the other parts are the same as those of the electric vehicle system of the first embodiment, the description thereof will be omitted here for brevity.

A description will now be given of the feature of the operation of the control circuit 6 of the third embodiment. When the controller 6 detects that one of the left-hand side inverter 4a and the left-hand side inverter 4b breaks down, the control pulse Pa or Pb of the inverter which breaks down is stopped. Subsequently, the speed difference correction control is performed in such a way as to make the speed of the normal induction motor coincide with that of the motor which has broken down. When the speed difference between the two motors becomes less than or equal to a predetermined value, a clutch correction signal Sc is outputted from the controller 6 to connect the clutch between motors 21. Incidentally, since the other parts are the same as those of the first and second embodiments, a description thereof will be omitted here.

According to the present embodiment, since both the front wheels can be mechanically driven, the vehicle can travel in safety without spinning.

Next, a fourth embodiment will be described with reference to FIG. 15 to FIG. 18. If the inverter 4a or 4b short-circuits, an over-current flows into the induction motor 3a or 3b, so that the induction motor 3a or 3b is damaged. Therefore, in the fourth embodiment, it is detected when an over-current flows through the induction motor 3a or 3b, thereby to interrupt the electrical connection between the induction motor through which the over-current flows and the inverter from which the over-current flows.

Incidentally, in the above-mentioned first embodiment, when the energy of the motor is consumed, the output connection unit 14a or 14b is interrupted. Moreover, in the second embodiment, when that energy can be regenerated in the other inverter, the output connection unit 14a or 14b is interrupted. But, even in the case where those conditions are not established, when an over-current flows through the induction motor 3a or 3b, the output connection unit 14a or 14b should be interrupted in haste. At this time, for the electrical energy of the induction motor, the electric circuit to which that electrical energy is to be transmitted is lost, and as a result, there is generated a sudden rise in the voltage. Thus, in the fourth embodiment, there is provided a circuit for consuming that energy through a resistor.

Figure 15:
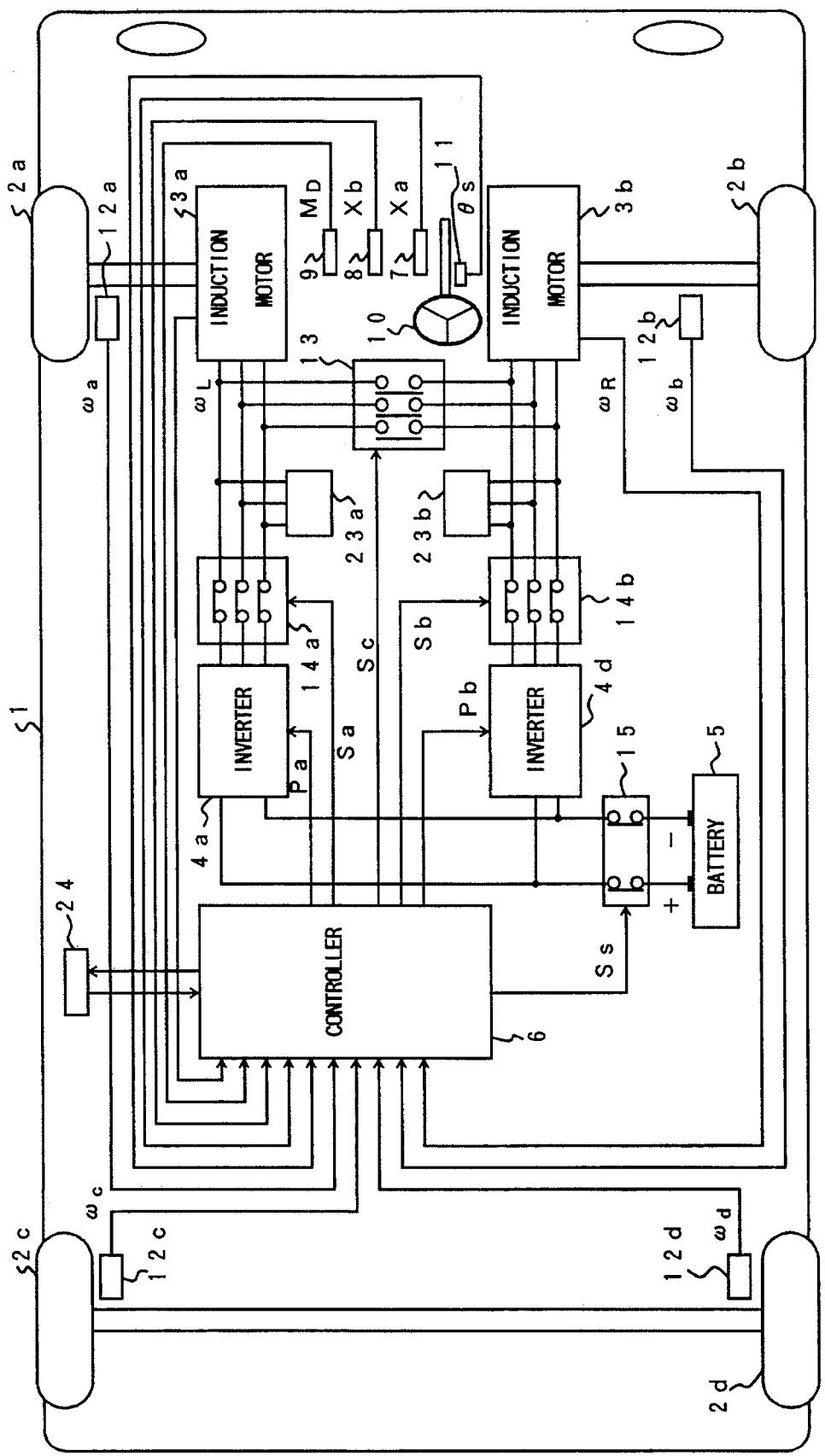
FIG. 15 is a block diagram showing the system arrangement of the fourth embodiment.

FIG. 15 is a block diagram showing the system arrangement of the electric vehicle of the fourth embodiment. In FIG. 15, the outputs of the inverters 4a and 4b are respectively-connected to the induction motors 3a and 3b through the output connection units 14a and 14b of which outputs are respectively connected to voltage sudden rise control circuits 23a and 23b. Incidentally, since the other parts are the same as those of the first embodiment, the description thereof will be omitted here.

Figure 16A:
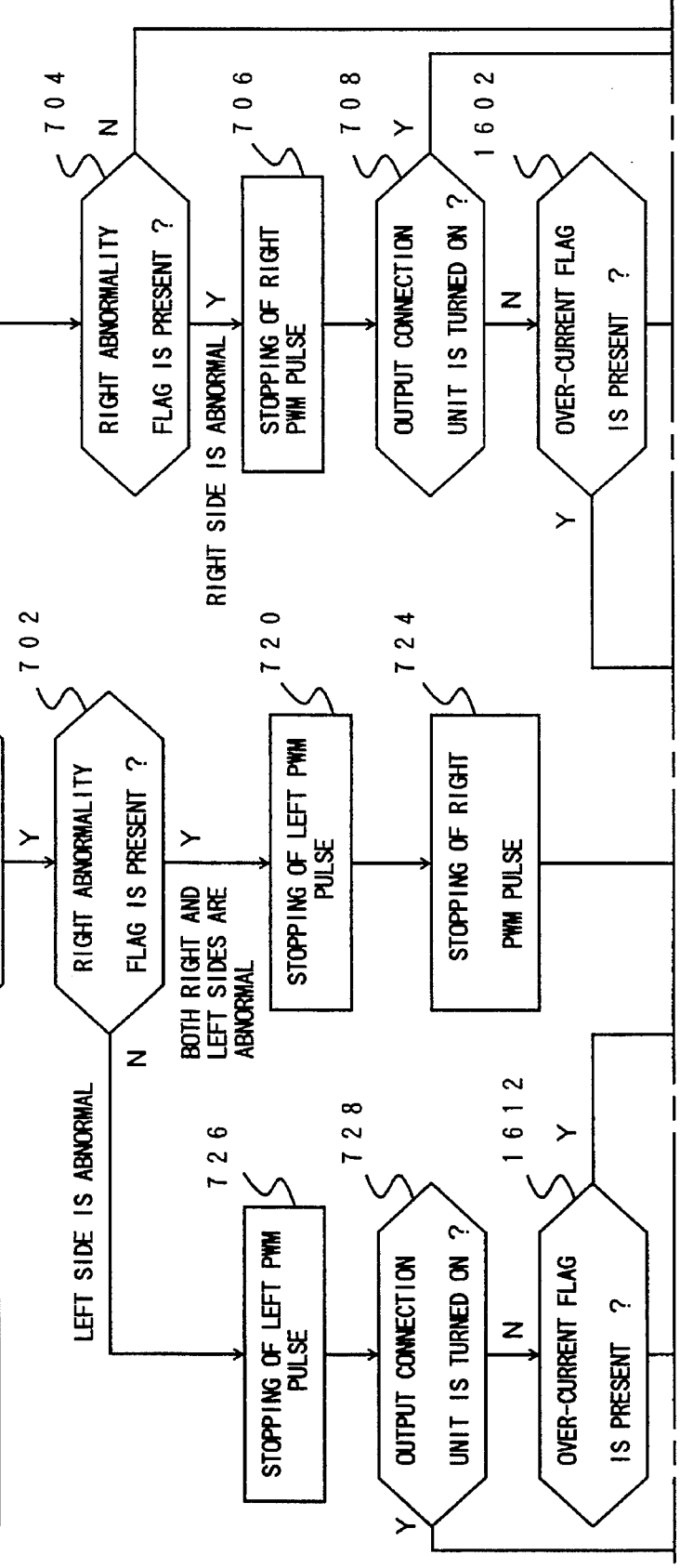
Figure 16B:
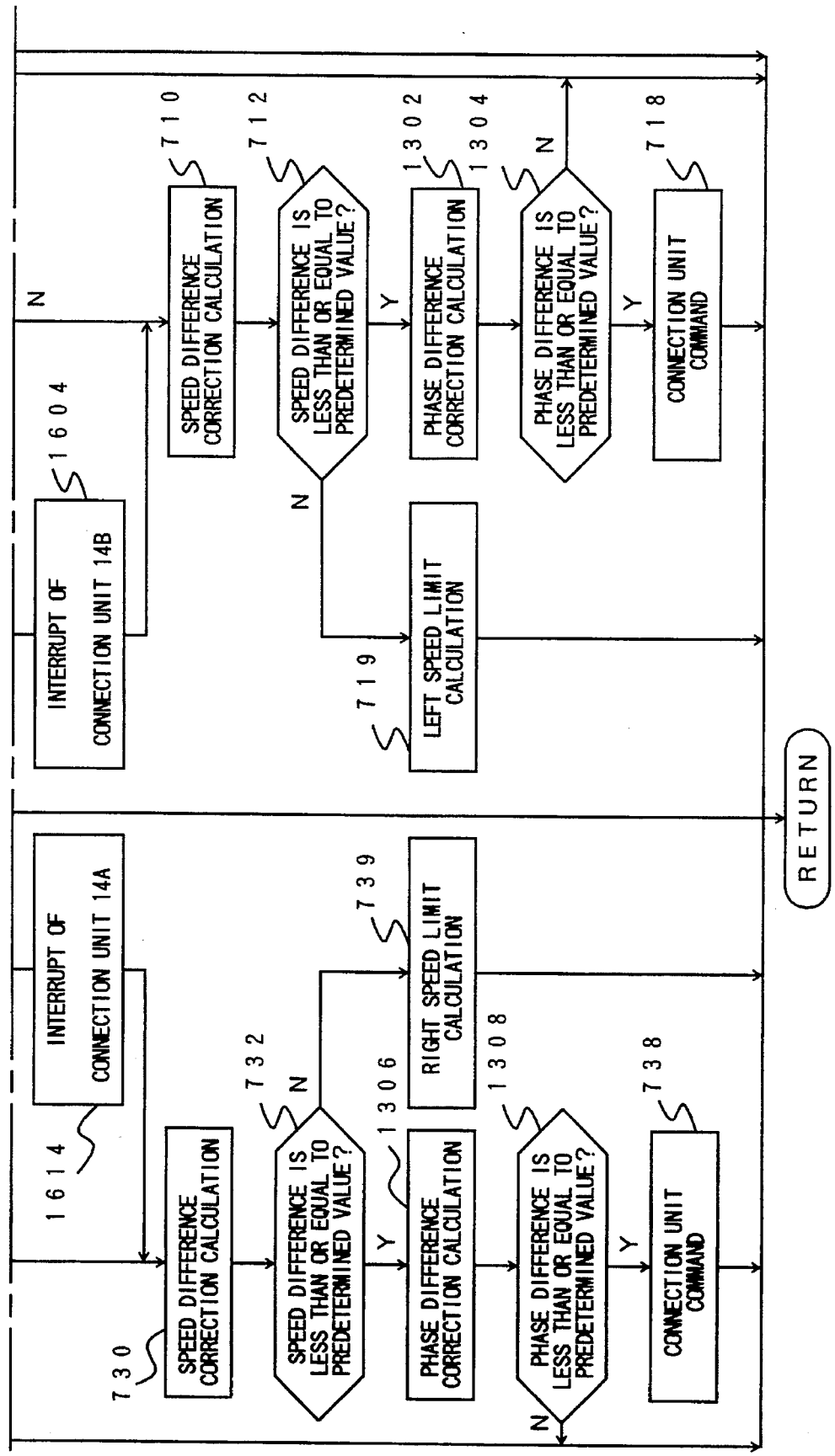

FIG. 16 is a flow chart of a subroutine program for the abnormality processing of the fourth embodiment. Incidentally, since the programming system of the fourth embodiment is the same as that of the first embodiment, the description thereof will be omitted here. In FIG. 16, if it is judged in Step 708 that the output connection units are in the connection state, then, it is judged in Step 1602 whether or not an over-current flag is set. Although the details will be described later, the over-current flag is a flag which is set when an over-current is flowing through the induction motor 3a or 3b.

If the over-current flag is set in Step 1602, in Step 1604, the connection unit 14b outputs the interrupt signal Sb to electrically separate the right-hand side inverter 4a and the right-hand side induction motor 3a from each other. After the completion of the processing of Step 1602, the processing proceeds to Step 710. In the mean time, if it is judged in Step 1602 that no over-current flows through the right-hand side induction motor 3b, the processing proceeds to Step 712 directly. Incidentally, the processing of Step 1612 is approximately the same as that of Step 1602, and therefore, the description thereof will be omitted here.

Figure 17:
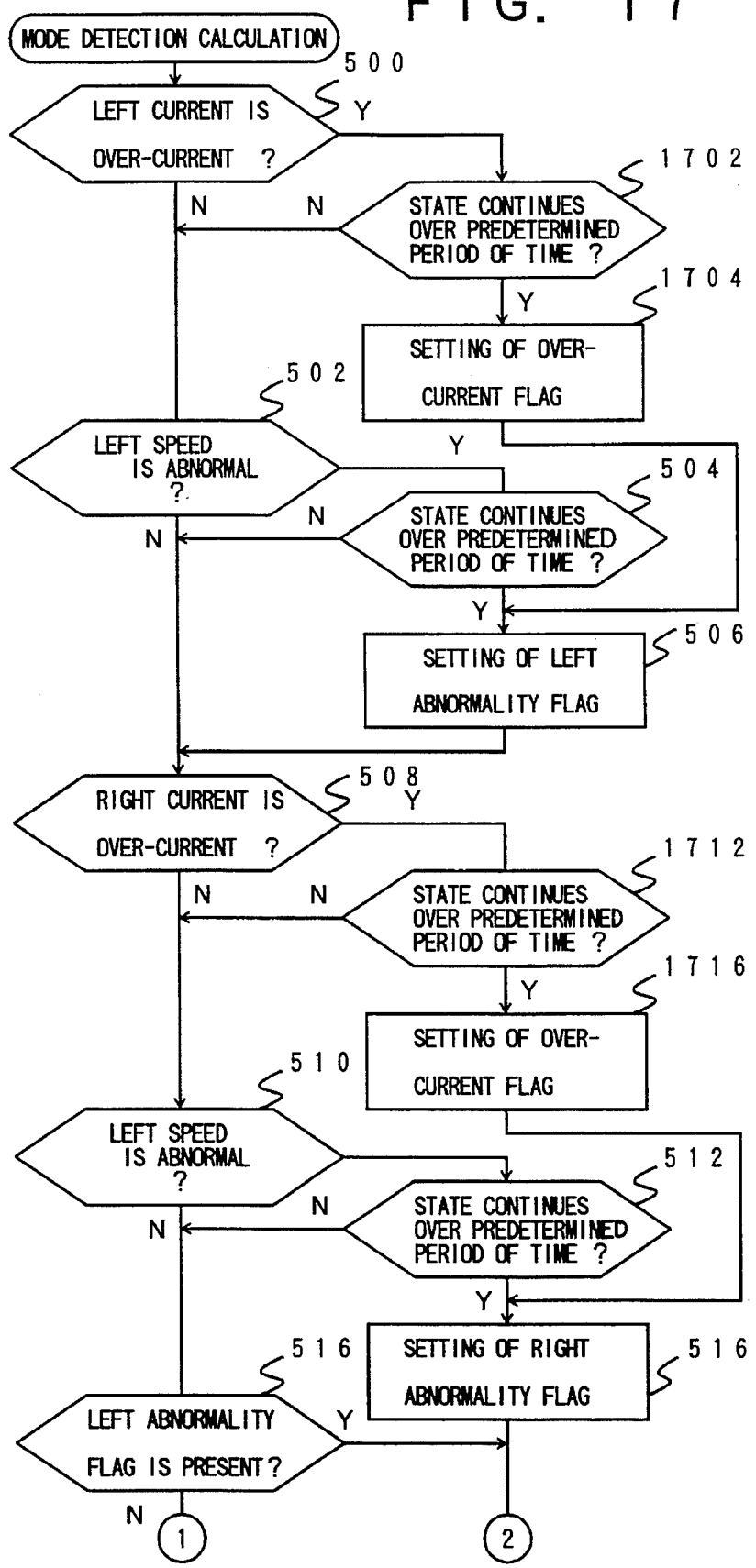
FIG. 17 is a flow chart of a subroutine program showing the details of mode detection calculation of the fourth embodiment.

FIG. 17 is a flow chart showing a subroutine program for the mode detection calculation of the fourth embodiment. Incidentally, only the technical part of the fourth embodiment will be described, and the description of the other parts will be omitted here. If in Step 500, an over-current flows through the left-hand side induction motor 4a, it is judged in Step 1702 whether or not the over-current flow continues for a predetermined period of time. If the over-current flow continues for a predetermined period of time, the over-current flag is set in Step 1704 and then processing proceeds to Step 506. On the other hand, if in Step 1702, the over-current flow does not continue for a predetermined period of time, the processing proceeds to Step 502. Incidentally, the processing of Step 1714 is approximately the same as that of Step 1712, and therefore, the description thereof will be omitted here.

Figure 18:
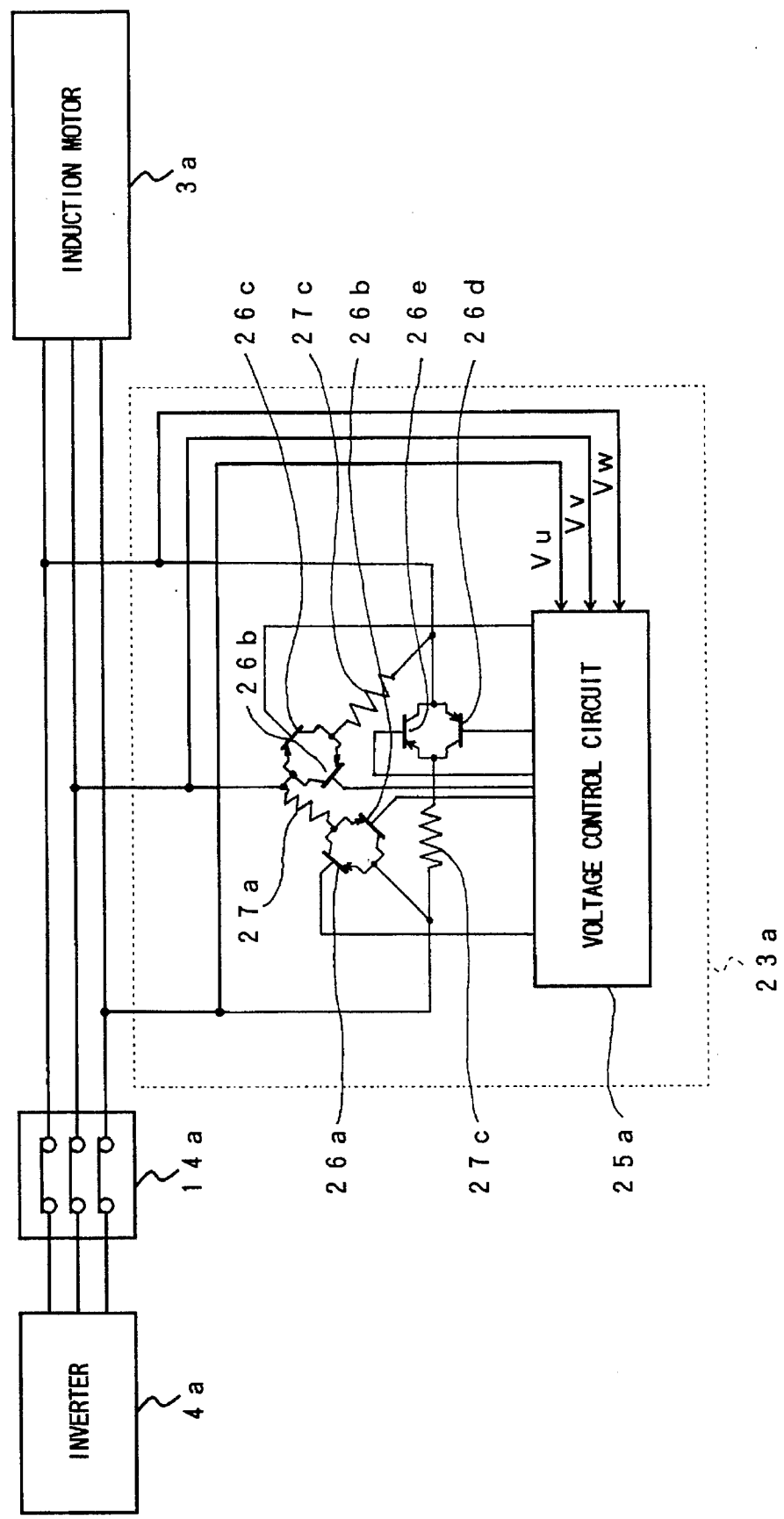
FIG. 18 is a block diagram, partially circuit diagram, showing the arrangement of an overshoot preventing circuit of the fourth embodiment.

FIG. 18 is a schematic diagram, showing the detailed arrangement of the sudden rise prevention circuit 23a. The sudden rise prevention circuit 23a is made up of resistors 27a to 27c for consuming energy, power transistors 26a to 26e each pair of which are connected in parallel with their polarities being reversed for opening and closing the lines of individual phases of the induction motors 3a, and a voltage sudden rise control circuit 25a for controlling the power transistors 26a to 26e from the voltage of the induction motor 3a, which is connected across the lines. When the voltage sudden rise control circuit 25a judges that the voltage of the induction motor 3a connected across the lines becomes greater than or equal to a predetermined value, the power transistors 26a to 26e connecting those lines are turned ON. Incidentally, since each pair of the power transistors 26a to 26e are connected in parallel to each other with their polarities being reversed, each power transistor through which the current flows is turned ON. As a result, the currents flow through the resistors 27a to 27c connected among the lines, so that the energy of the motor can be consumed in the form of heat. Therefore, it is possible to prevent a sudden rise in voltage.

Figure 19:
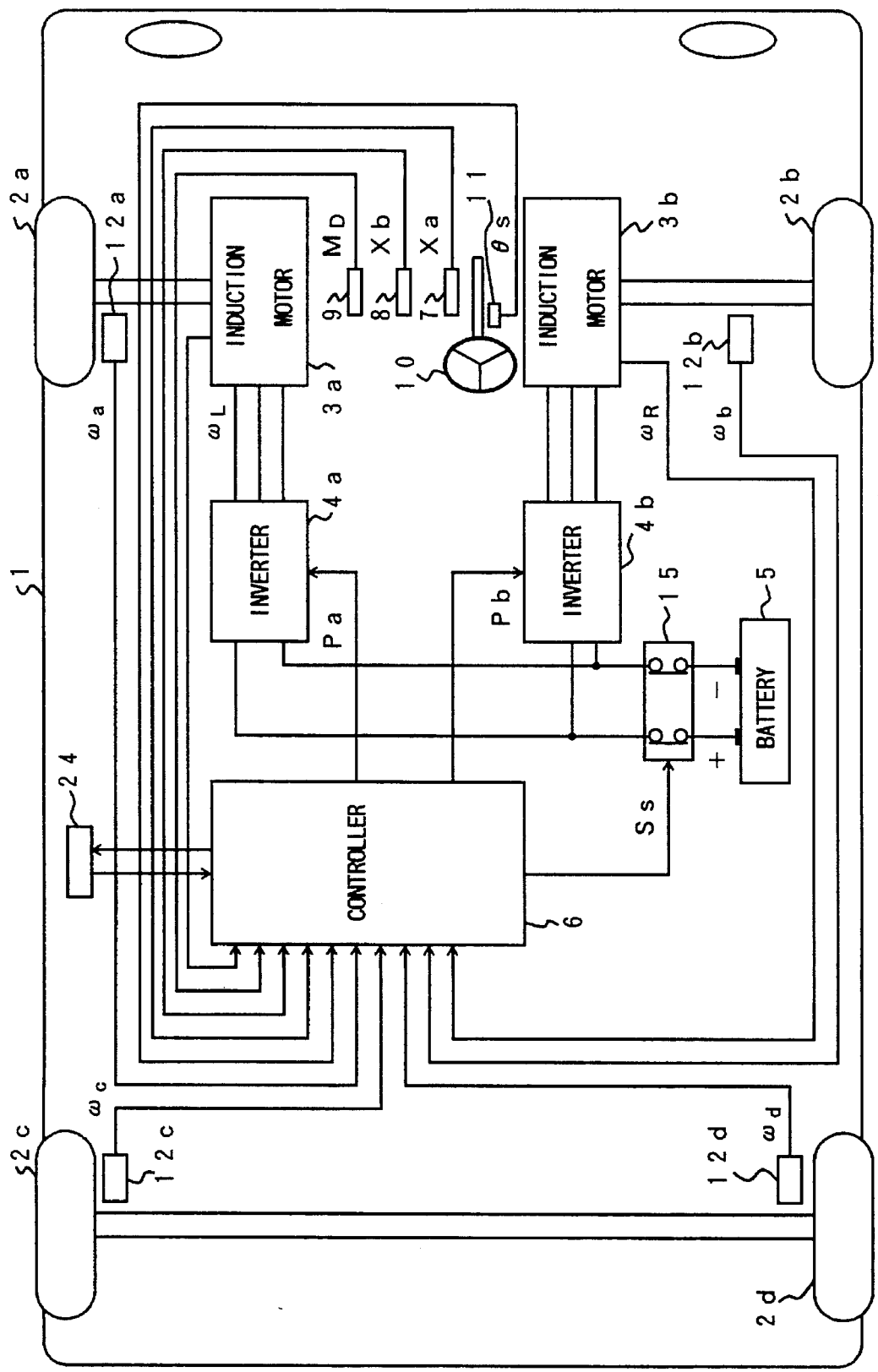
FIG. 19 is a block diagram showing the system arrangement of the fifth embodiment.
Figure 20:
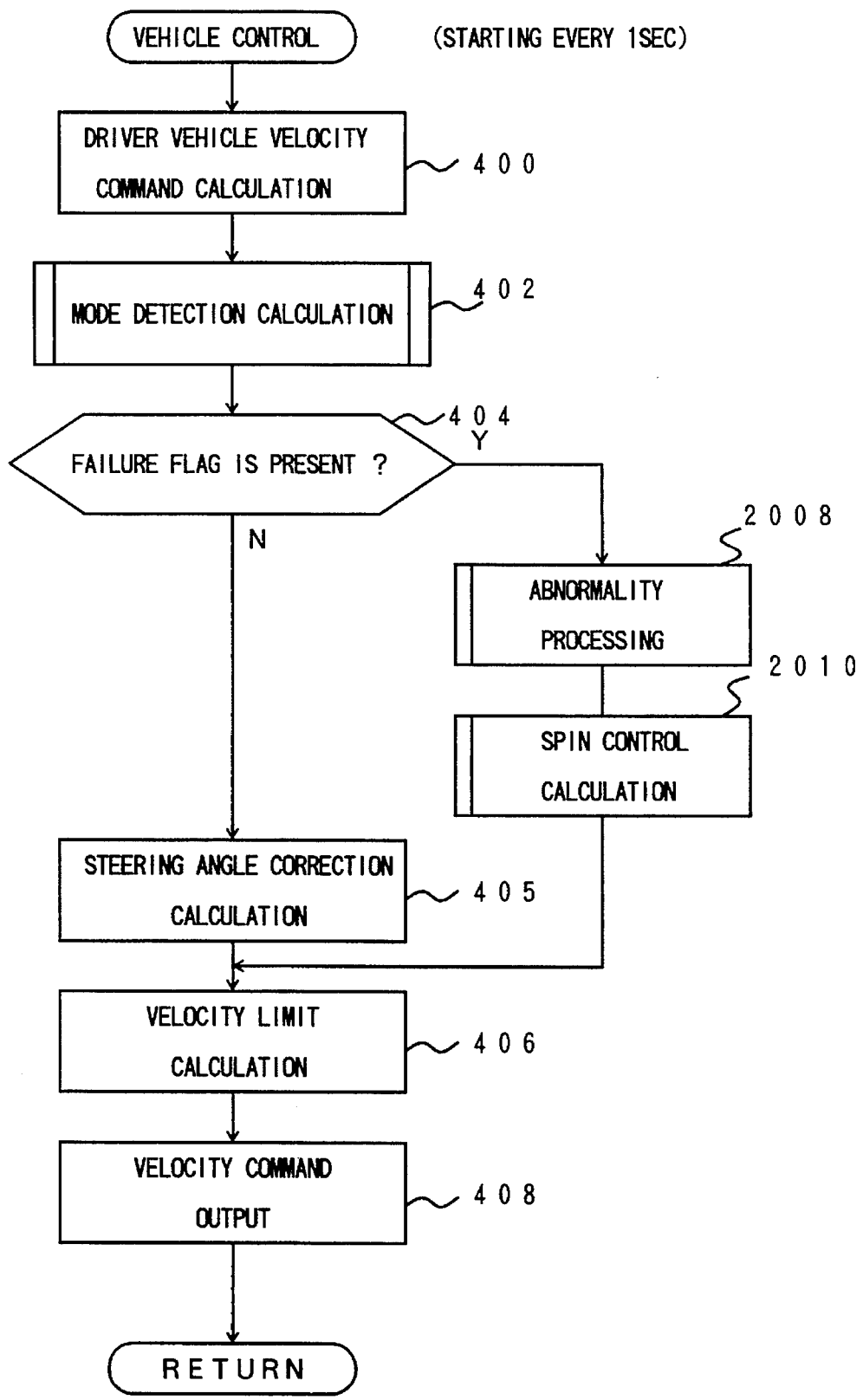
FIG. 20 is a flow chart showing the details of the operation of a vehicle control of the fifth embodiment.

A fifth embodiment will be described with reference to FIG. 19 to FIG. 25. FIG. 19 is a block diagram showing the system arrangement of the electric vehicle of the fifth embodiment. In FIG. 19, as compared with the system arrangement of the electric vehicle shown in FIG. 1, this system arrangement is characterized by the omission of the connection units 13, 14a and 14b. Therefore, this system arrangement itself is the same as that of the prior art. FIG. 20 is a flow chart showing the details of the vehicle control of the fifth embodiment. As compared with the flow chart shown in FIG. 4, the subroutine of the abnormality processing shown in Step 2008 is different from the subroutine shown in Step 410 of FIG. 4, and the spin control calculation shown in Step 2010 is inserted after Step 2008. Incidentally, the spin control calculation will be described in detail later.

Figure 21:
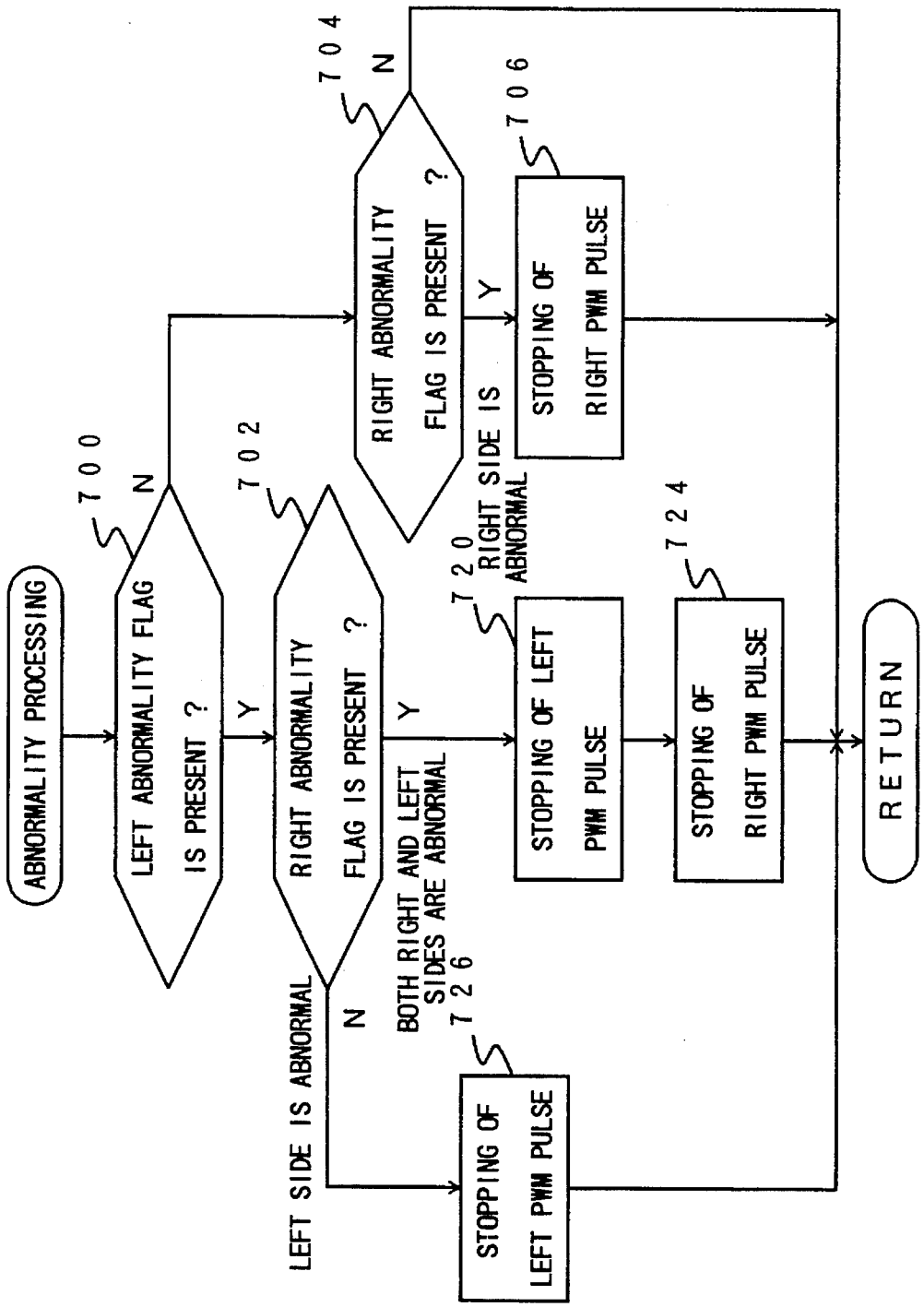
FIG. 21 is a flow chart of a subroutine program showing the details of an abnormality processing of the fifth embodiment.

FIG. 21 is a flow chart of a subroutine program showing the details of the abnormality processing shown in Step 2008 of the flow chart of FIG. 19 of the fifth embodiment. As compared with Step 410 of FIG. 4 (the subroutine program shown in FIG. 7), the only difference is that immediately after Step 726, Step 724 and Step 706, the flow is completed.

Figure 22:
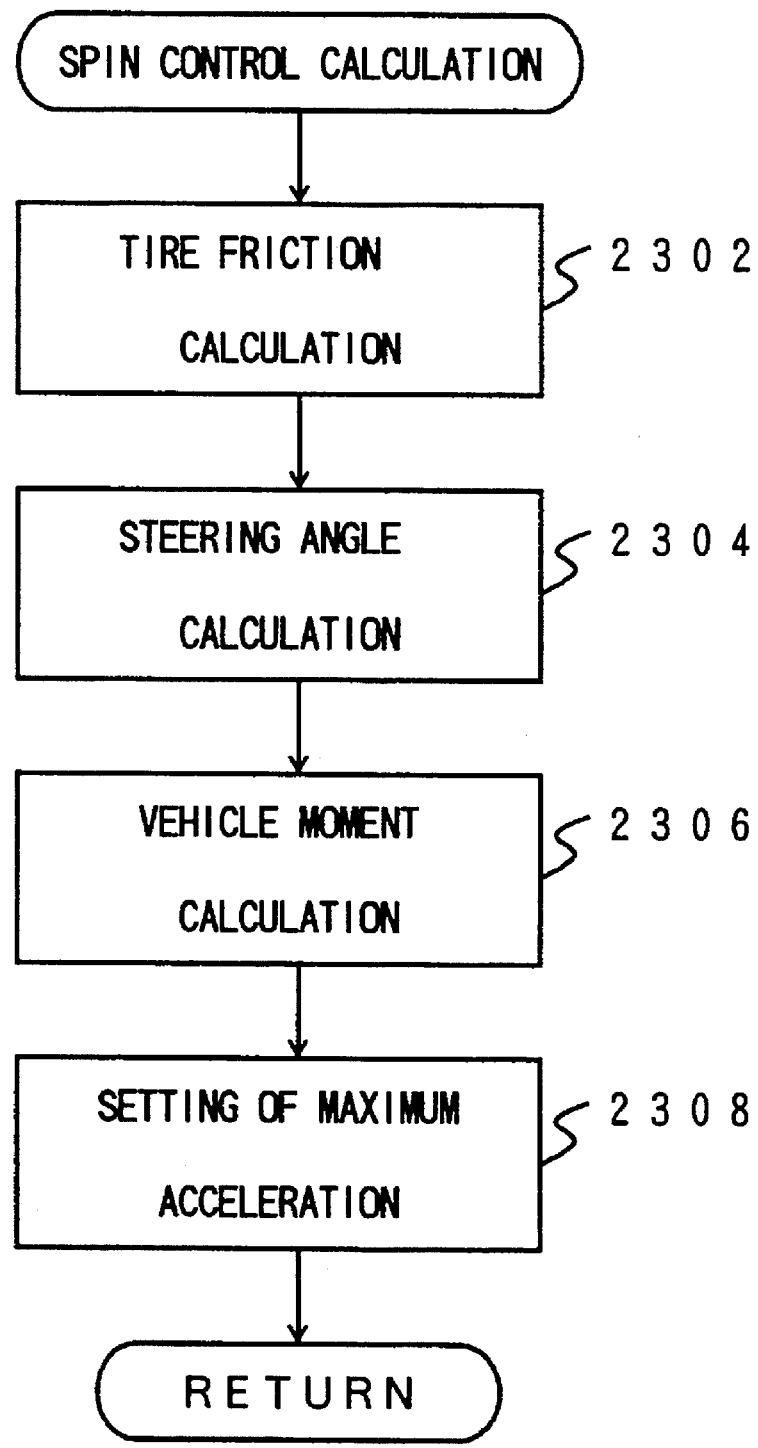
FIG. 22 is a flow chart of a subroutine program showing the details of spin control calculation of the fifth embodiment.

FIG. 22 is a flow chart of a subroutine program showing the details of the spin control calculation showing the technology of the fifth embodiment, and showing the details of Step 2010 shown in the flow chart of FIG. 20.

In the present embodiment, the possibility of spin is calculated from the forces applied to the vehicle, thereby to limit the generation of the torque. First, in Step 2302, the present vehicle velocity v is calculated on the basis of the wheel speed ωc and ωd of the rear wheels 2c and 2d, and the maximum frictional force of the tire is estimated from the vehicle velocity v.

Next, in Step 2304, the steering angle θs of the steering wheel 10 is calculated. The maximum driving force by which the vehicle 1 can be accelerated is calculated on the basis of the steering angle Θs, and then the maximum acceleration is calculated. This will be described in detail. First, in Step 2306, the vehicle moment is calculated. Subsequently, in Step 2308, the maximum driving force is calculated on the basis of the resulting vehicle moment, and then, the maximum acceleration is calculated on the basis of the maximum driving force. Now, a brief description will be given of the vehicle moment.

Figure 23:
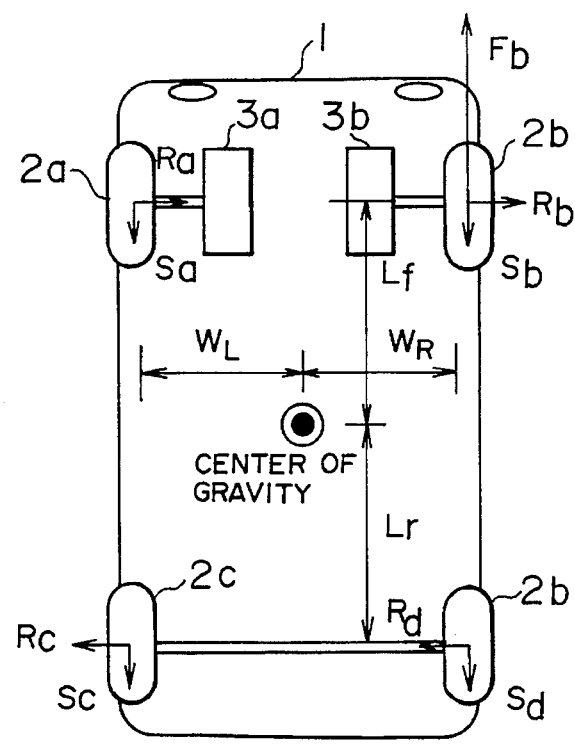
FIG. 23 is a view useful in explaining the spin control.

FIG. 23 shows the forces which are applied to the vehicle when the steering angle $\Theta_s=0$, i.e., when the vehicle is intended to move forward. Incidentally, it is assumed that an abnormality is present in the driving system of the induction motor 3a for driving the front left wheel 2a so that the control pulse Pa is stopped and the induction motor is not driven. Then, in the case where only the front right wheel 2b is intended to be driven by the driving force Fb, the directions of the side slip frictional forces Ra, Rb, Rc and Rd. and those of the rolling frictional forces Sa, Sb, Sc and Sd, which are applied to the respective tires, are as shown in FIG. 22. Therefore, the angular moment M about the center of gravity of the vehicle 1 is expressed by the following expression.

$$M = Fb\ W_R + (Sa+SC)W_L - (Sb+Sd)W_R - (Ra+Rb)Lf - (Rc+Rd)Lr \quad (1)$$

Figure 24:
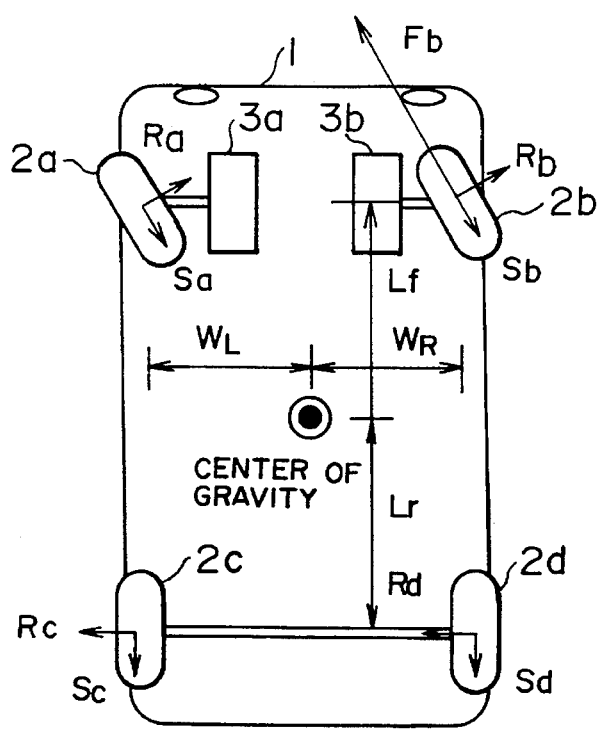
FIG. 24 is a view useful in explaining the spin control.

The condition in which the vehicle does not spin is when this angular moment M keeps the balance to become zero. Therefore, the maximum driving force $F_{MAX}$ which can be used for the drive can be calculated on the basis of the maximum value of the side slip frictional forces and that of the rolling frictional forces at the vehicle velocity of interest. Incidentally, since the rolling frictional forces are applied to the directions in which those forces counteract one another with respect to the angular moment, they may be omitted in the calculation. FIG. 24 is a view showing a state in which the driver handles the steering wheel 10 to turn the steering wheel to the left. At this time, assuming that the steering angle is Θs, the angular moment about the center of gravity is given by the following equation.

$$\begin{aligned} M = &\ Fb\ W_R \cos\theta s + Fb\ Lf \sin\theta s + \\ &\ (Sa \cos\theta s + Sc - Ra \sin\theta s)W + \\ &\ (Sa \cos\theta s + Sd - Rb \sin\theta s)W - \\ &\ (Sb \cos\theta s + Rb \cos\theta s - Sa \sin\theta S - \\ &\ Sb \sin\theta s)Lf - (Rc + Rb)Lr \end{aligned} \quad (2)$$

It will be readily understood that even if the forces applied to the respective tires are the same as those of FIG. 23, the angular moment depends on the steering angle Θs. Now, since in general, the following relationship is established with respect to the vehicle 1, the maximum driving force $F_{MAX}$ obtained through the calculation becomes small as the steering angle Θs is increased.

$$W_L, W_R < Lf, Lr \quad (3)$$

Moreover, since the frictional force of each tire is decreased as the vehicle velocity is increased, the maximum driving force $F_{MAX}$ is also decreased. In Step 2306, the maximum driving force $F_{MAX}$ is obtained in the above manner. In Step 2304, the maximum acceleration which can be generated by the normal motor is calculated on the basis of the resulting maximum driving force $F_{MAX}$. In the case of the motor control system which performs torque control directly, that value may be given as the command. But, in the case where the velocity command is used for the control, as shown in FIG. 2, the same effect can be obtained by limiting the change of the velocity command. This is, as described above, performed in Step 406. Therefore, in the present embodiment, since only a driving force in the range in which there will be no spin can be given, the vehicle can travel in safety without spinning even when one side motor cannot be driven. Incidentally, this method can be applied for use in the normal state as well as in the abnormal state. In other words, in Step 405 of FIG. 4, the speed difference between the right and left-hand side motors is corrected using the steering angle to provide a difference between the driving forces, thereby to perform vehicle motion control. Then, by limiting the range of the difference between the driving forces, which can be corrected, within the maximum driving force $F_{MAX}$ which was obtained through the spin control calculation, the more stable motion control can be performed even in the normal traveling.

Figure 25:
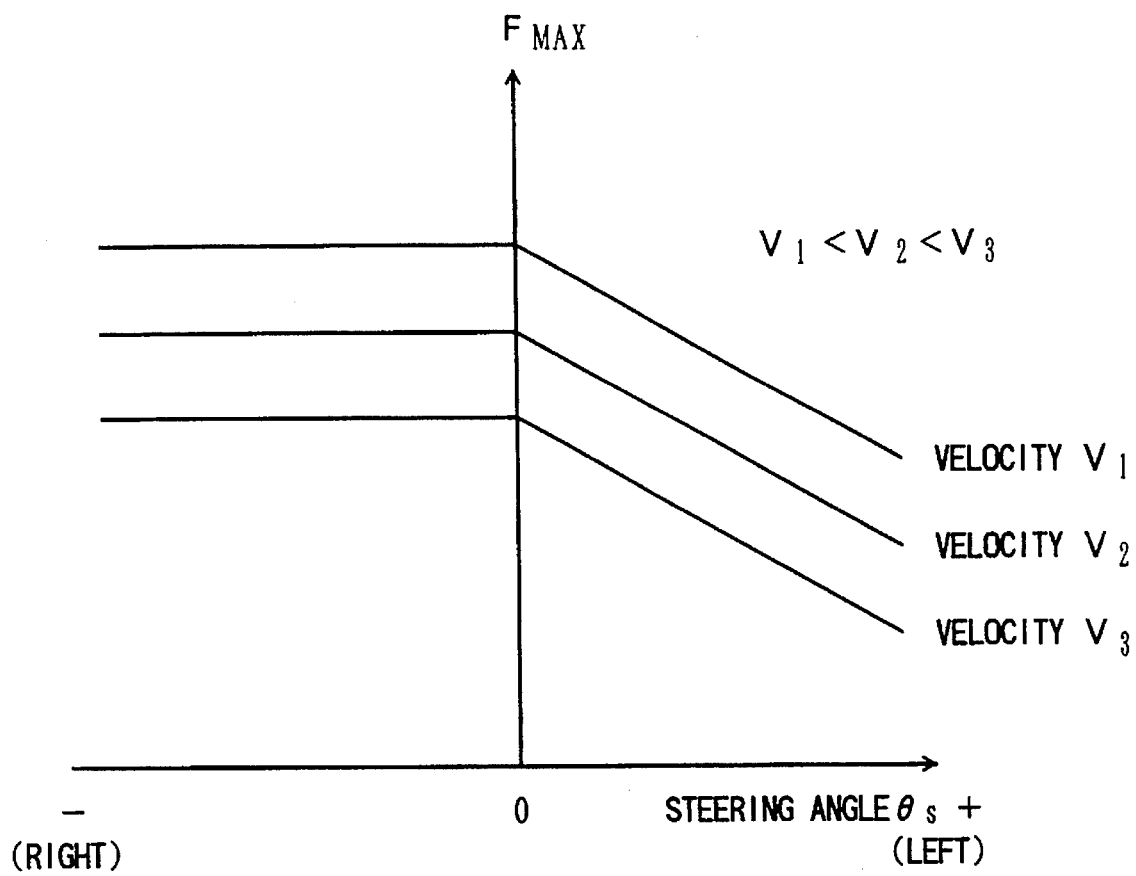
FIG. 25 is a graphical representation showing the characteristics of the maximum driving force of the sixth embodiment.
Figure 26:
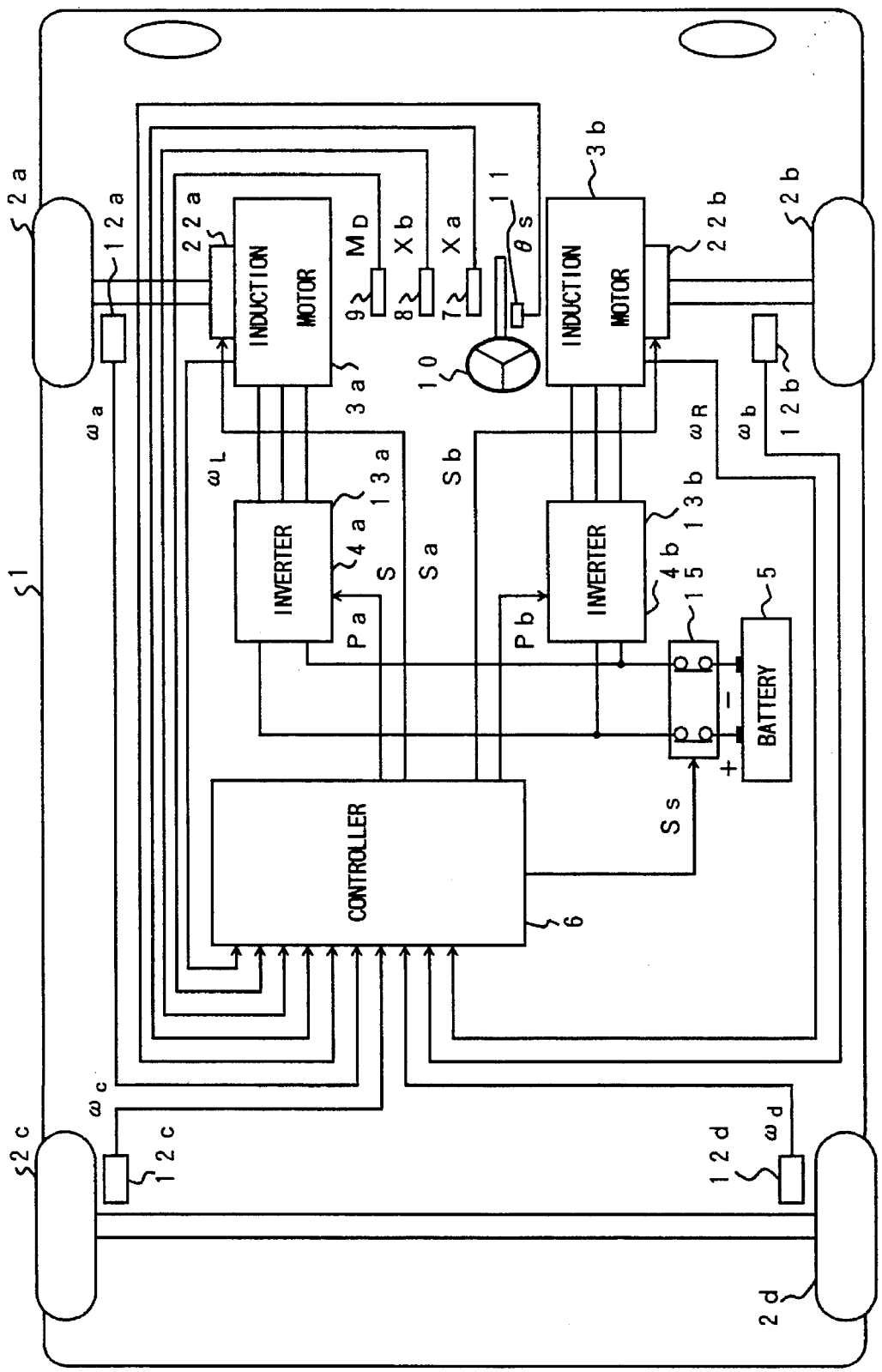
FIG. 26 is a block diagram showing the system the seventh embodiment.

FIG. 26 is a block diagram showing the system arrangement of the electric vehicle of a sixth embodiment. The sixth embodiment is designed so as to perform the spin control calculation shown in FIG. 23 more simply. More specifically, the vehicle moment is not obtained from the forces applied to the vehicle 1 at every point of time of interest to calculate the maximum driving force $F_{MAX}$, but the maximum driving force $F_{MAX}$ for the steering angle and the velocity is previously calculated and then the maximum driving force $F_{MAX}$ is, as shown in FIG. 25, stored in a storage means so as to correspond to the steering angle Θs, to be obtained from a table pickup from the steering angle and the velocity. As has already been described, the table is produced in such a way that the maximum driving force $F_{MAX}$ is decreased as both the steering angle and the vehicle velocity are increased. Especially, during high speed traveling, the frictional force between the tire and the road surface becomes small. Therefore, the table may be previously produced by taking this fact into consideration. Moreover, when the friction can be estimated from the road surface condition, the calculation thereof can also be performed online. In this case, since the time required for the calculation can be shortened, the control can be performed at a higher speed and the reliability in the case of an abnormality can be improved.

Further, FIG. 26 shows a sixth embodiment. The sixth embodiment of FIG. 26 is designed in such a way that a clutch is inserted between the motor and the front wheel. As compared with FIG. 11, the feature of the present embodiment is that clutches 22a and 22b are respectively provided between the left-hand side front wheel 2a and the left-hand side induction motor 3a and between the right-hand side front wheel 2b and the right-hand side induction motor 3b. With the driving method, the same calculation as that of each of the embodiments of FIG. 1 to FIG. 16 is performed. The difference in the embodiment of FIG. 26 from each of the above embodiments is that when judging an abnormality, not only the control pulse Pa or Pb of the inverter is stopped, but also the clutch 22a or 22b which is judged to be abnormal is released by means of the switching signal Sa or Sb from the controller 6. As a result, there is provided the advantage that in the case of failure due to locking of the motor, in addition to the electrical failure of the inverter and the like, the vehicle can travel in safety.

Next, the feature of the controller 6 will be described with reference to FIG. 27 to FIG. 31.

The controller 6 is made up of a vehicle microprocessor 60, a left motor microprocessor 602, a right motor microprocessor 603, a fail safe circuit 604, an input circuit 605, and an output circuit 606. To the vehicle microprocessor 601 are inputted from the input circuit 605 signals indicating such values as the acceleration amount, the brake amount, and steering angle, which are supplied by the driver, and signals relating to the motion of the vehicle, i.e., the wheel speeds, the motor speeds, the yawing rate, the longitudinal acceleration, the acceleration in the side direction, and the like. Those signals are used to calculate the suitable commands $\omega_L^*$, and $\omega_R^*$ of the left and right-hand side induction motors 3a and 3b. Moreover, the left motor microprocessor 602 and the right motor microprocessor 603 perform the respective speed control calculations of the induction motors 3a and 3b on the basis of the speed command $\omega_L^*$ or $\omega_R^*$, which were obtained from the vehicle microprocessor 601, thereby to calculate the current commands for the inverters. The results are outputted to an inverter control circuit 900 through the output circuit 606. Moreover, the vehicle microprocessor 601, the left motor microprocessor 602 and the right motor microprocessor 603 output respective signals mutually to monitor a possible run away condition of the other microprocessors, thereby to output respective signals which indicate a confirmation of the normal operation of the other microprocessors. Thus, the fail safe circuit 604 is arranged in such a way as to output a starting/stop signal and a contactor signal using the control signals of the two or more normal microprocessors out of the three microprocessors.

Figure 28A:
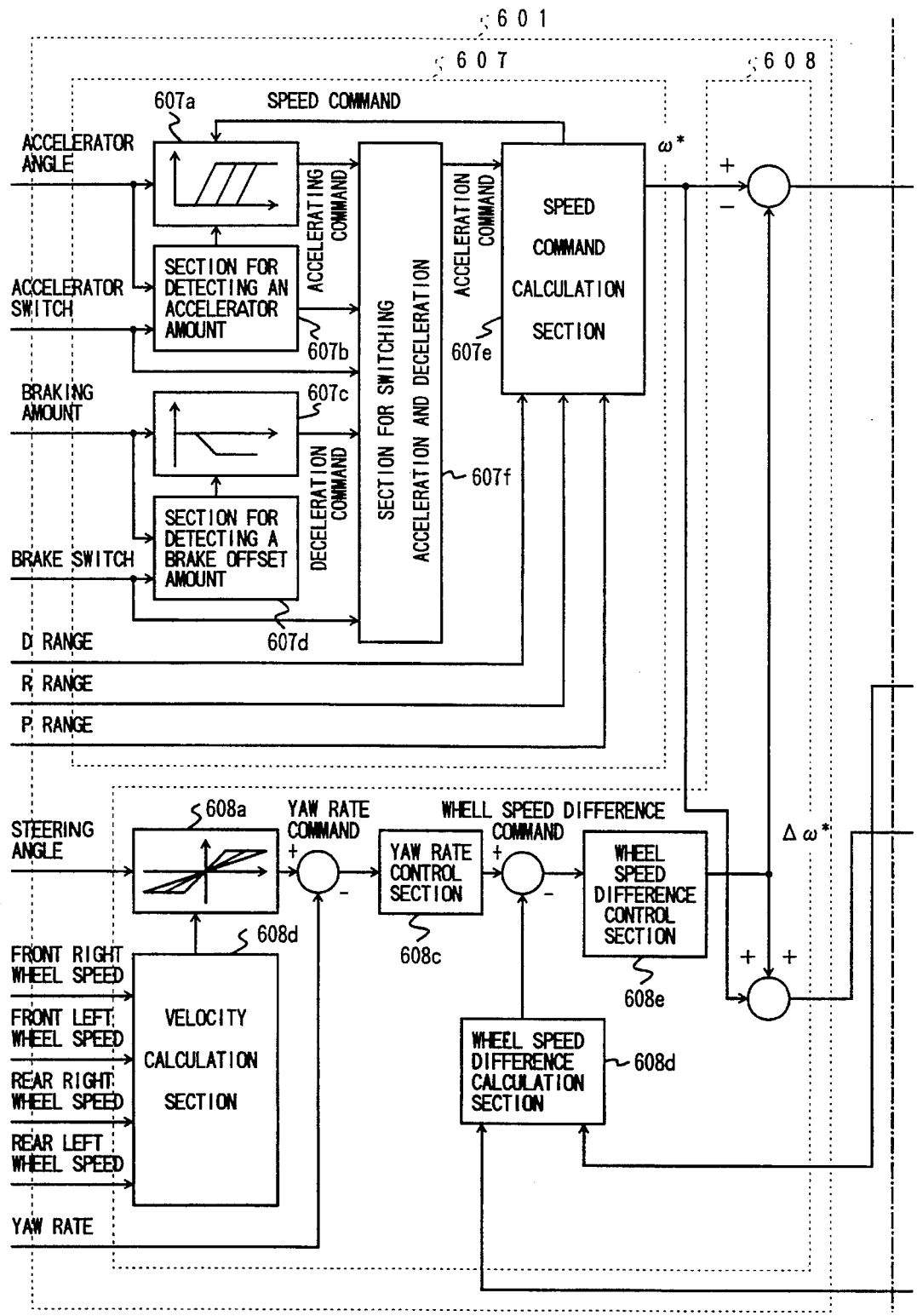
Figure 28B:
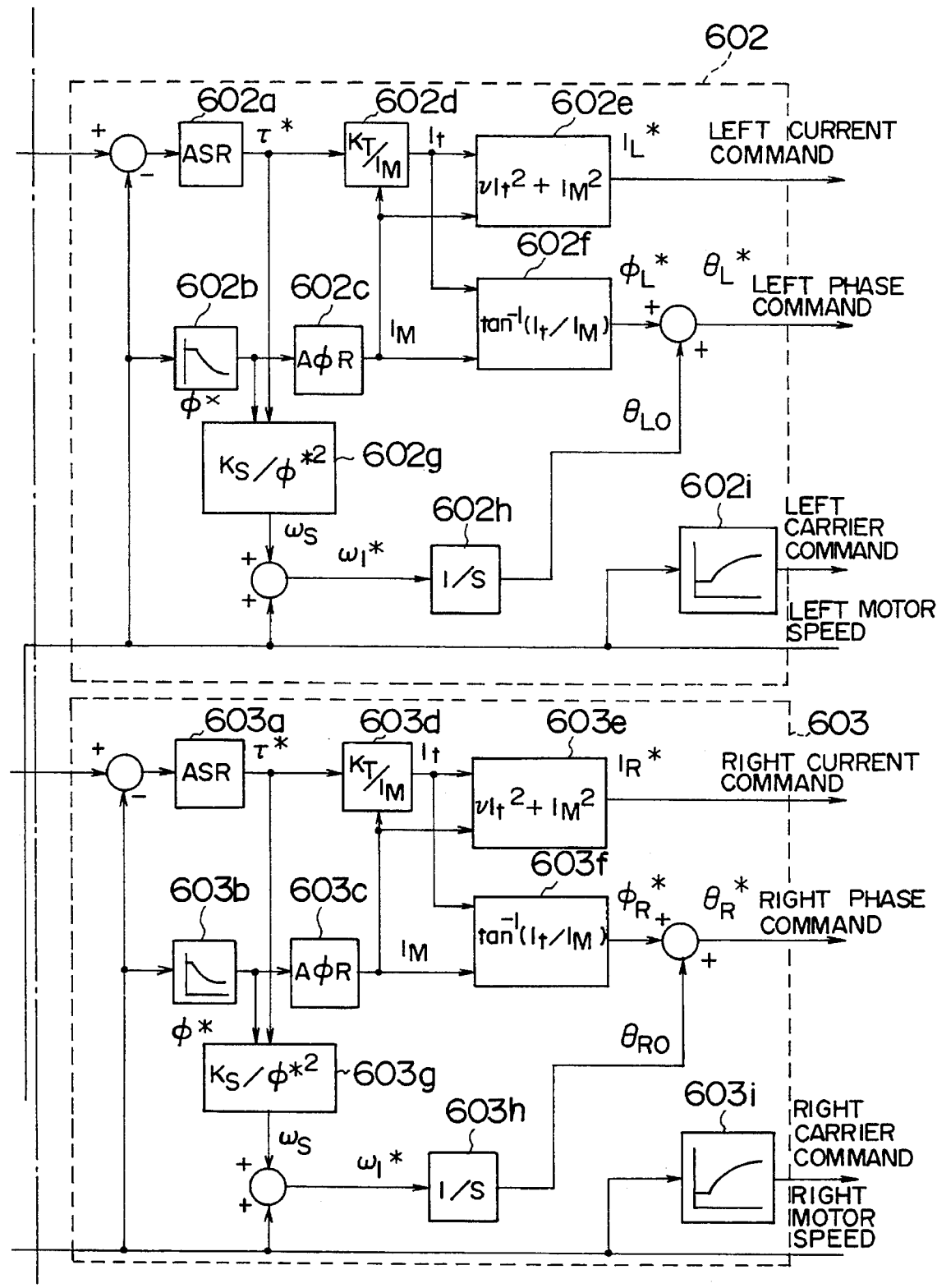

Next, FIG. 28 is a block diagram useful in explaining the control calculation which is performed in the vehicle microprocessor 601, the left motor microprocessor 602 and the right motor microprocessor 603. The control of the vehicle microprocessor 601 is performed in a speed calculation section 607 for calculating the speed command $\omega^*$ to control the longitudinal acceleration and deceleration on the basis of the operation of the accelerator and the brake, and a speed difference calculation section 608 for calculating the speed difference command $\Delta\omega^*$ to perform vehicle control in the yawing direction using the steering angle of the steering wheel as a command. First, in the speed calculation section 607, the acceleration command calculation is performed on the basis of the amount of actuation of the accelerator pedal in an acceleration command calculation section 607a. Then, the outputted acceleration command is increased as the amount of actuation of the accelerator pedal is increased, and when the speed command is increased, the acceleration command is reduced. Moreover, in a section 607b for detecting an acceleration offset amount, the offset amount is calculated on the basis of the accelerator pedal switching signal used for certifying that the accelerator pedal was actuated, and the amount of actuation of the accelerator pedal. More specifically, the amount of actuation of the accelerator pedal when the accelerator pedal switching signal is inputted is stored to detect the offset amount, and the acceleration command is outputted to the acceleration calculation section 607a so as not to be outputted in the case of the amount of actuation of the accelerator pedal less than or equal to the detected offset amount. Similarly, in a deceleration command calculation section 607c, the magnitude of the deceleration command is calculated in correspondence to the brake amount. A section 607d for detecting a braking offset amount also calculates the offset amount on the basis of the brake switching signal and the brake amount in order to take the backlash of stepping on the brake into consideration, thereby to output the calculated offset amount to the deceleration command calculation section 607c. A section 607f for switching acceleration and deceleration judges which of the accelerating command and the decelerating command is used as the acceleration command. In other words, when the brake switching signal is present, the decelerating command is used as the acceleration command irrespective of the magnitude of the accelerating command. Moreover, only when the brake switching signal is OFF and the accelerator pedal switching signal is present will the accelerating command be used as the acceleration command. As a result, by treating the decelerating command preferentially, it is possible to improve the safety. Further, in a speed command calculation section 607e, the value of the current speed command $\omega^*$ is increased or decreased in accordance with the acceleration command. Incidentally, the maximum value of the speed command depends on the forward movement, the backward movement and the parking of the vehicle. Then, in the case of a D range signal representing forward movement of the vehicle, the maximum value of the speed command is set to the rated maximum speed. In the case of a R range representing backward movement of the vehicle, it is set to a negative value of which absolute value is less than the rated maximum speed. Finally, in the case of a P range representing the parking of the vehicle, it is set to zero. Those setting values correspond to the gear positions of the automatic transmission of the normal internal combustion engine vehicle. In the above manner, the speed command is calculated.

Next, the description will be given of a speed difference calculation section 608. The wheel speed difference is required for the vehicle to travel along a curve and is controlled in the following manner. First, the steering angle of the steering wheel and the average vehicle velocity calculated in a velocity calculation section 608b are inputted to a yawing rate calculation section 608a to calculate the yawing rate command using those signals. That is, when the steering angle is large, if the velocity is large, the yawing rate must also be large, and therefore, the calculation is performed so as to increase the yawing rate command. Incidentally, to the velocity calculation section 608b are inputted the front left wheel speed, the front right wheel speed, the rear left wheel speed, and the rear right wheel speed, thereby to calculate the average velocity. Next, the yawing rate command and the measured yawing rate of the vehicle are compared with each other so that a proportional-plus-integral calculation is performed in a yawing rate control calculation section 608c on the basis of the difference between the yawing rate command and the yawing rate. As a result of this calculation, the wheel speed difference command is outputted. To a wheel speed difference calculation section 608d are inputted the left motor speed $\omega_L$ and the right motor speed $\omega_R$, thereby to calculate the speed difference therebetween. The calculated difference between the wheel speed difference command and the wheel speed is inputted to a wheel speed difference control section 608e to calculate the speed difference command $\Delta\omega^*$ through a proportional-plus-integral calculation. The left speed command $\omega_L^*$ is obtained by subtracting the speed difference command $\Delta\omega^*$ from the speed command $\omega^*$. Moreover, the right speed command $\omega_R^*$ is calculated by adding the speed difference command $\Delta\omega^*$ to the speed command $\omega^*$. Those calculation results are respectively inputted to the left motor microprocessor 602 and the right motor microprocessor 603.

Figure 27A:
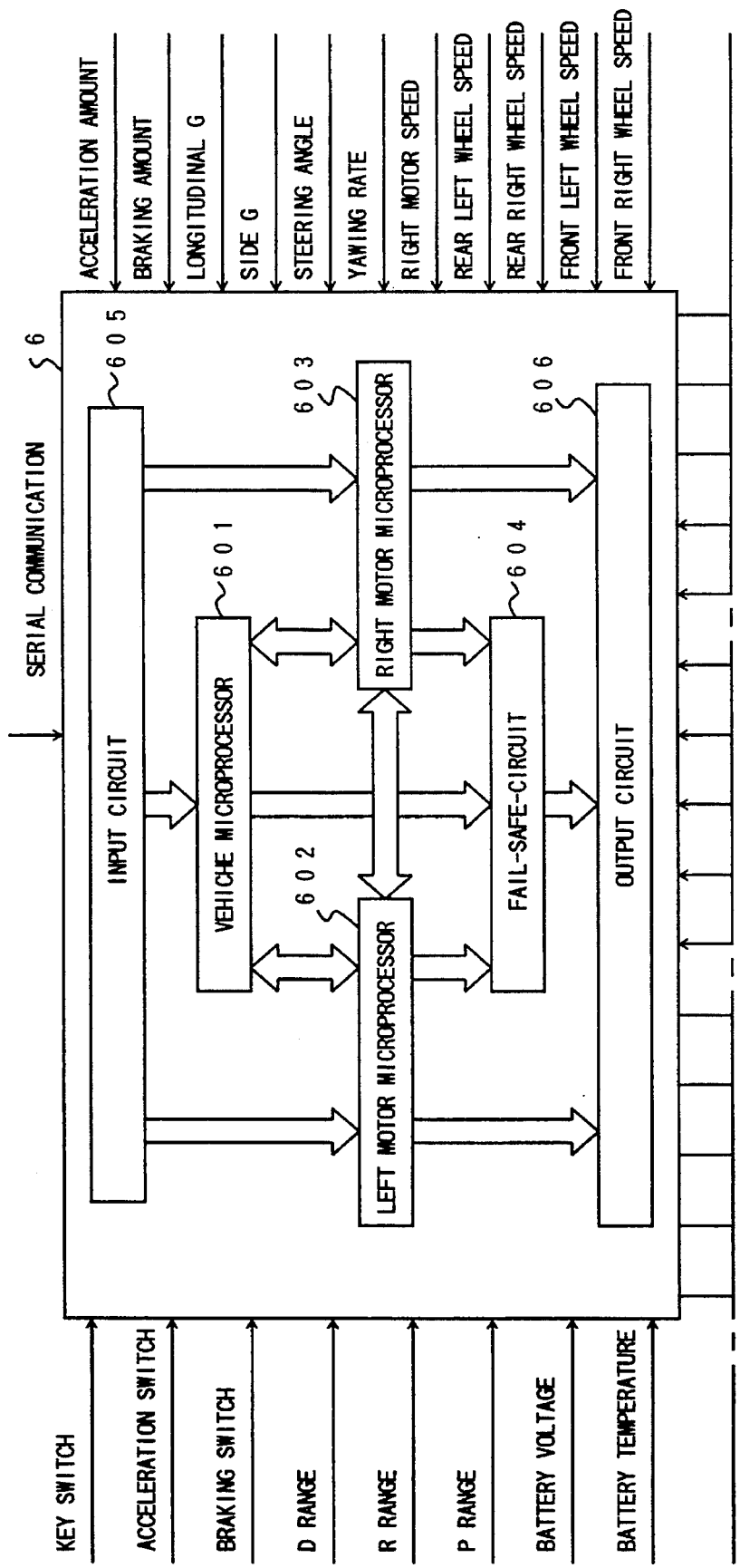
Figure 27B:
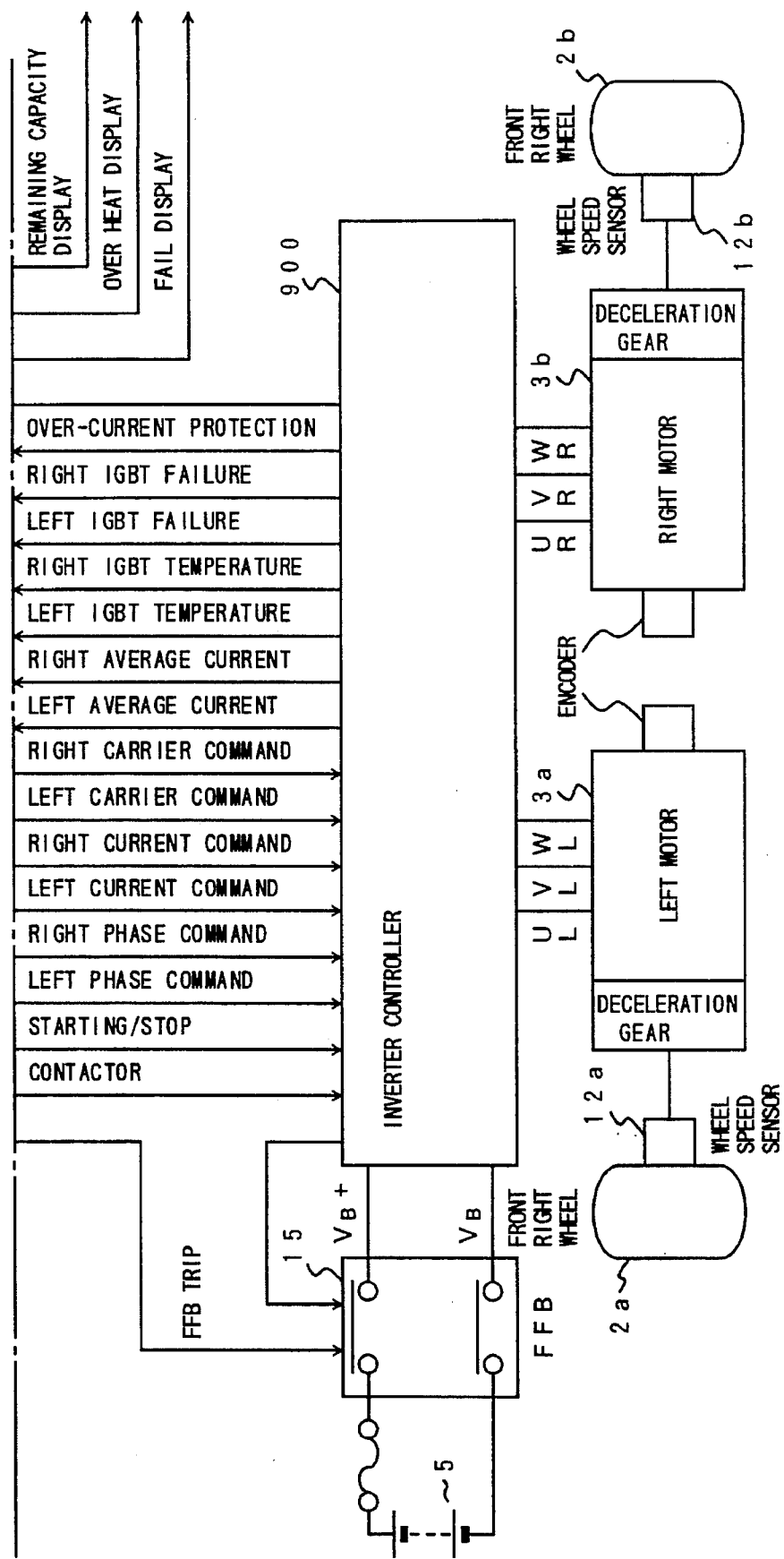

The control calculation which is performed in the left motor microprocessor 602 and the right motor microprocessor 603 is the vector control method of the induction motor as shown in FIG. 27. A description will now be given to of calculation performed in the left motor microprocessor 602. In a speed control section 602a, the speed control calculation is performed on the basis of the difference between the left speed command $\omega_L^*$ and the left motor speed $\omega_L$ to calculate the torque command $\tau^*$. Moreover, in an excitation weakening calculation section 602b, the magnetic flux command $\omega_L$ is calculated in order to control the magnitude of the magnetic flux of the left induction motor 3a using the left motor speed $\phi^*$. The exciting current command $I_M$ is calculated on the basis of the magnetic flux command $\phi^*$. Then, a first-order lag calculation is performed in an exciting current calculation section 602c by taking the circuit time constant of the induction motor into consideration, thereby to calculate the exciting current command $I_M$. Since the torque τ of the induction motor is in proportion to the value which is obtained by multiplying the exciting current by the torque current perpendicularly intersecting the former, the torque current command It is obtained in a torque current calculation section 602d by dividing the torque command τ by the exciting current command $I_M$. Since the vector sum of the torque current command It and the exciting current command $I_M$ perpendicularly intersecting each other becomes the primary current command, the left current command $I_L^*$ and the torque angle command $\psi_L^*$ can be respectively calculated by a current command calculation section 602e and a torque angle calculation section 602f using the calculation method shown in FIG. 2. Moreover, in a sliding speed calculation section 602g, the sliding speed command ωs of the induction motor is calculated on the basis of the torque command τ* and the magnetic flux command $\phi^*$. Since the sliding speed command ωs is in proportion to the torque command τ* and is in inverse proportion to the magnetic flux command $\phi^*$ squared, that calculation is performed in the sliding speed calculation section 602g. The rotating speed command $\omega_1^*$ of the exciting current is obtained by adding the sliding speed ωs to the left motor speed $\omega_L$, and the phase of the exciting current command $I_M$, i.e., the exciting current phase command $\Theta_{LO}^*$ is obtained in an integrator by integrating the rotating speed command $\omega_1^*$. The left phase command $\Theta_L^*$ can be calculated by adding the exciting current phase command $\Theta_{LO}^*$ and the torque angle command $\psi_L^*$ to each other. The left current command $I_L^*$ and the left phase command $\Theta_L^*$ which are obtained by the above method form the primary current command vector when viewed from the static coordinate system. Moreover, in a carrier command calculation section 602i, the amplitude of the carrier is changed by the left motor speed $\omega_L$. This purpose is to increase the gain of the current control system by the amplitude of the carrier when the left motor speed $\omega_L$ is increased. With respect to the right motor microprocessor 603 as well, the same calculation is performed. The above is the control method which is performed in the controller 6.

Figure 29A:
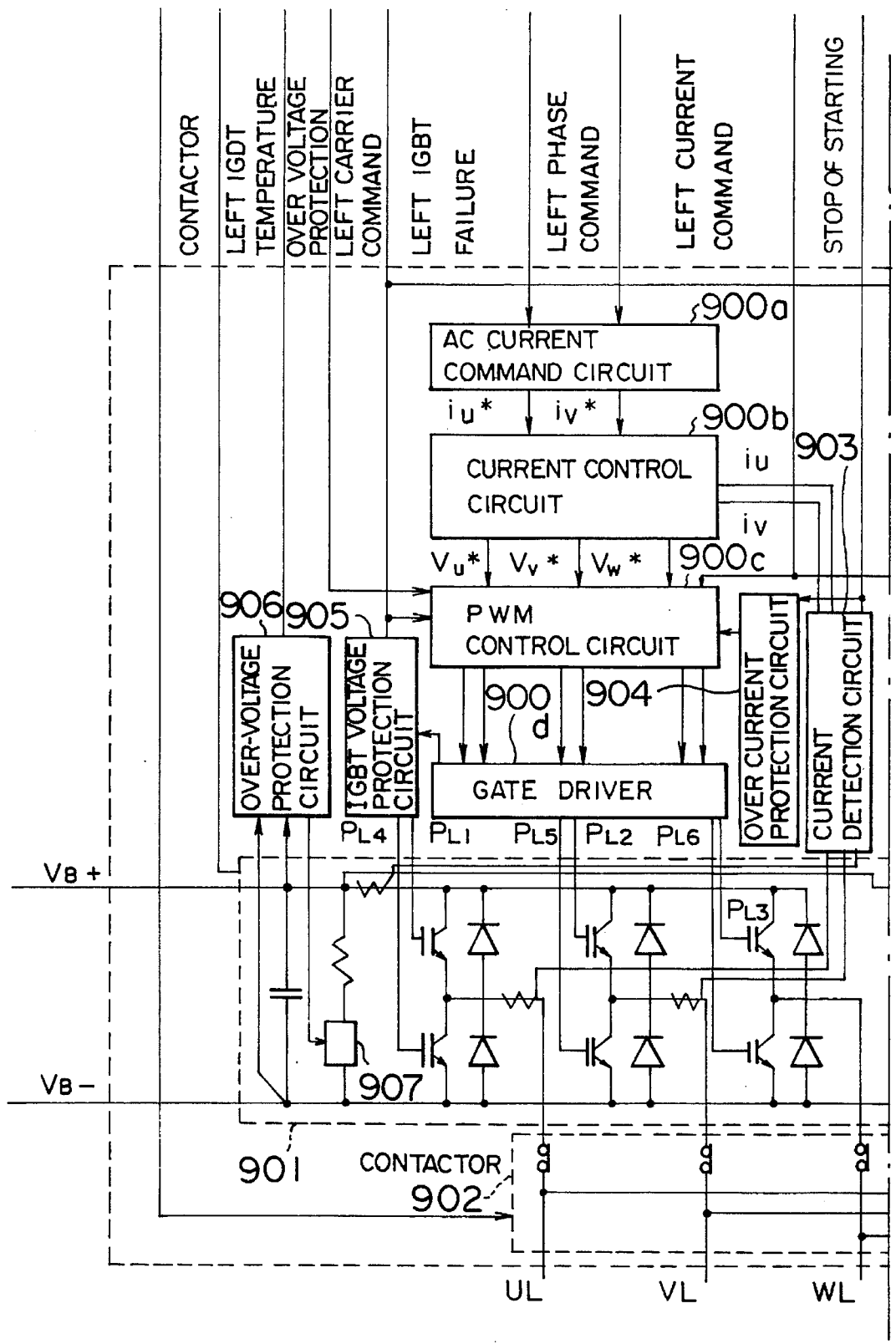
Figure 29B:
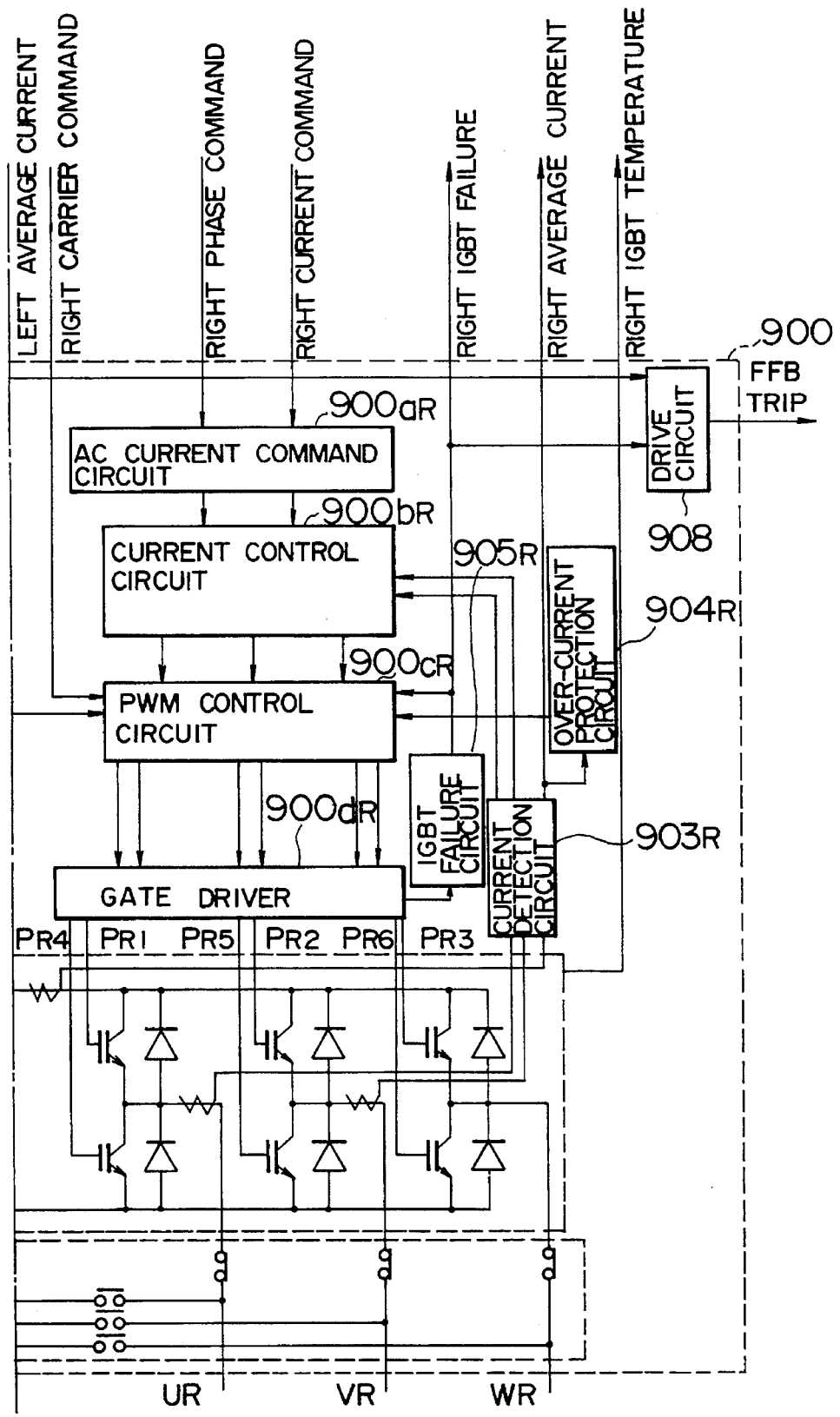
Figure 30A:
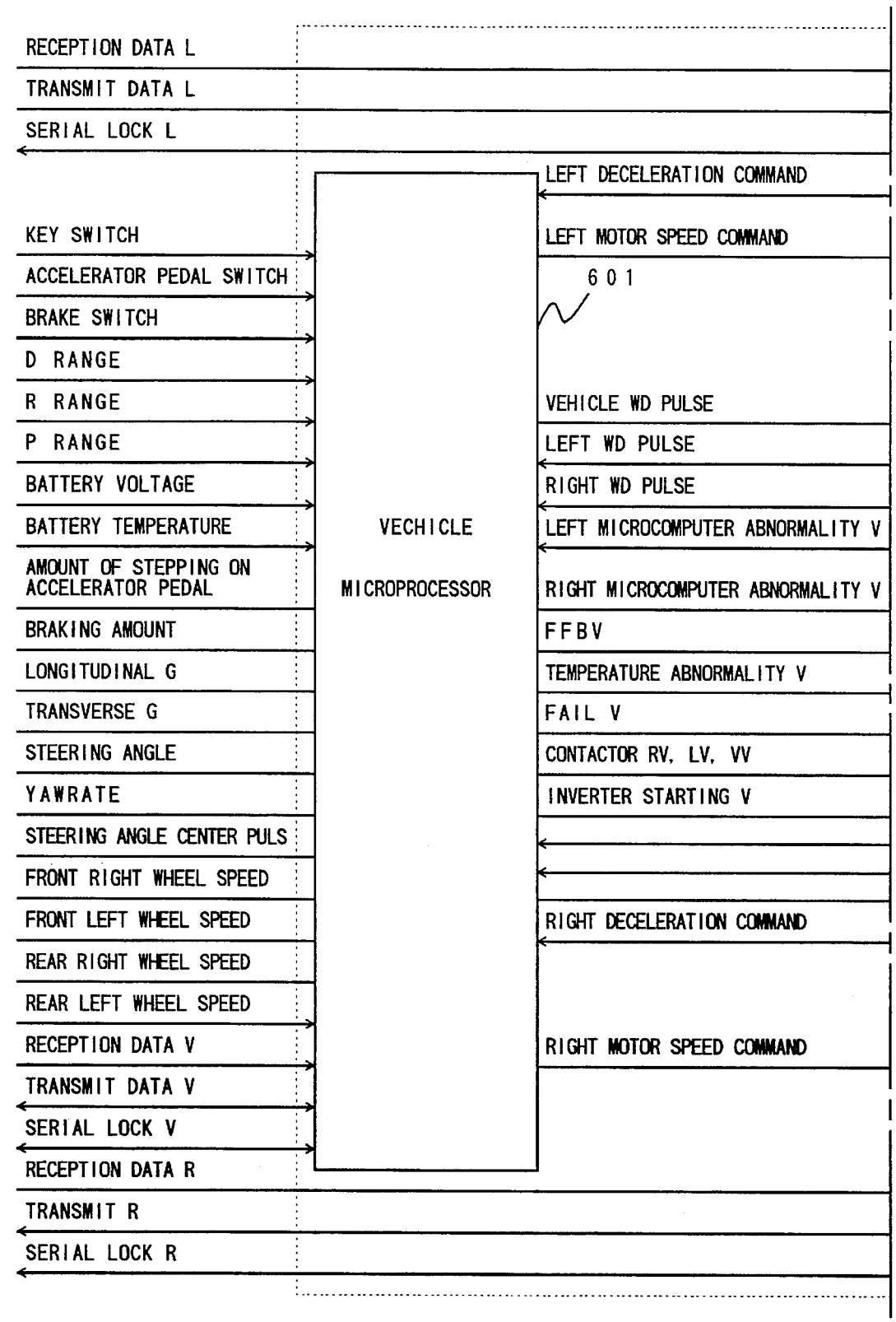
Figure 30B:
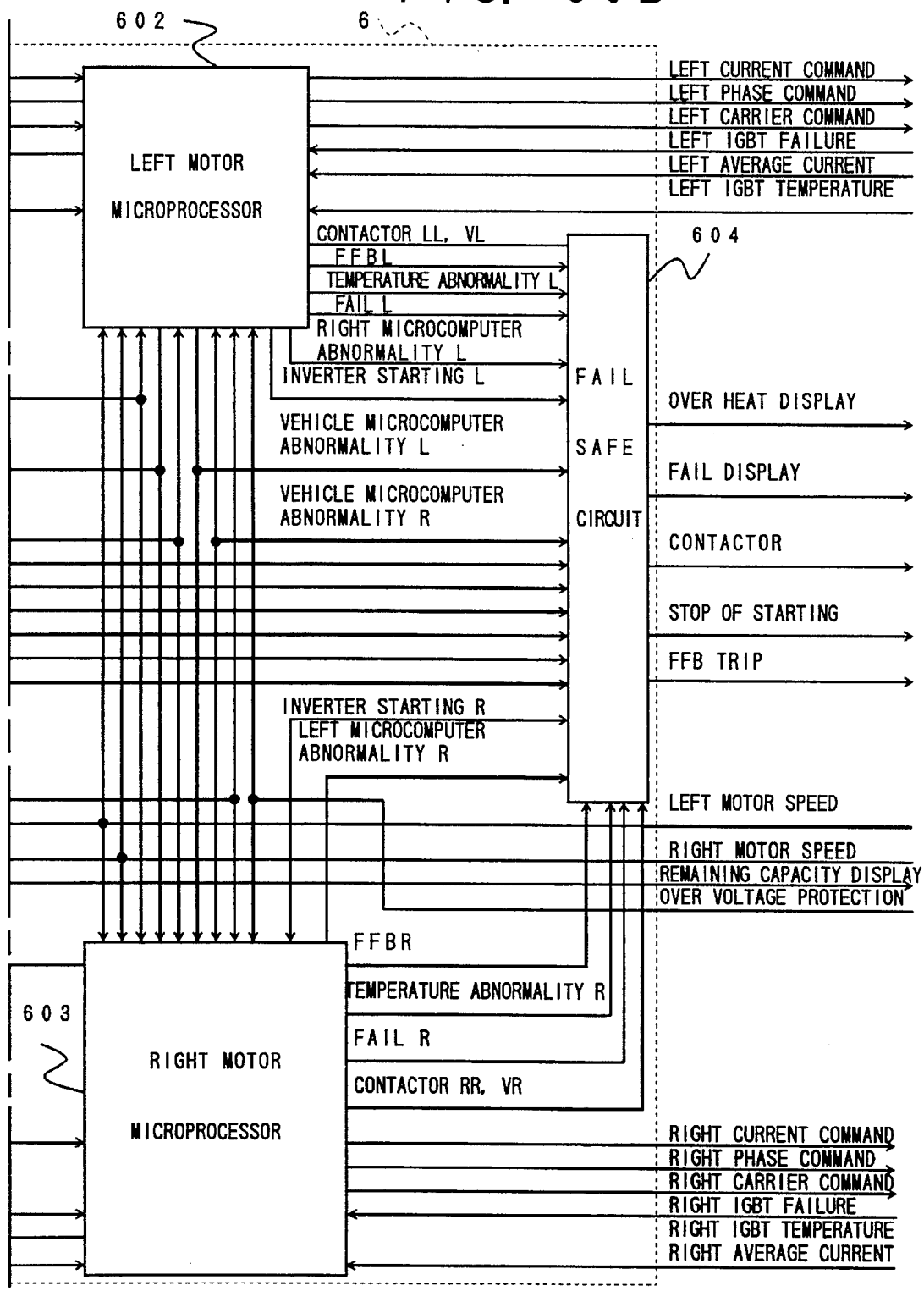

FIG. 29 is a schematic diagram showing the details of the internal side of an inverter controller 900. The left current command $I_L^*$ and the left phase command $\Theta_L^*$ which were calculated in the left motor microprocessor 602 are inputted to an ac current command circuit 900a. In the ac current command circuit 900a, the U phase current command $i_u^*$ and the V phase current command $i_v^*$ are calculated on the basis of the left current command $I_L^*$ and the left phase command $I_L^*$. Subsequently, in a current control circuit 900b, the feedback control calculation is performed using the U phase current command $i_u^*$ and the V phase current $i_v^*$ to calculate the U phase voltage command $v_u^*$. Similarly, the V phase voltage command $V_v^*$ is obtained on the basis of the V phase current command $i_v^*$ and the V phase current $i_v$. Moreover, since the following equations are established, similarly, the W phase voltage command is obtained on the basis of the W phase current command $i_w^*$ and the W phase current $i_w$.

$$i_u^* + i_v^* + i_w^* = 0$$

$$i_u + i_v + i_w = 0$$

In a PWM control circuit 900c, those voltage commands and the left carrier command are compared with each other to generate the PWM signals of individual phases. Those PWM signals are used to control an inverter 901 through a gate driver 900d. The inverter 901 drives the left-hand side induction motor 3a through a contactor 902. Incidentally, a current detection circuit 903 detects the currents $i_u$ and $i_v$ flowing through the U phase and the V phase of the inverter and also detects the left average current. The left average current is inputted to an over-current protection circuit 904. Then, when that current is judged to be an over-current, the PWM control circuit 900c is stopped by that current. Moreover, an IGBT failure circuit 905 detects the failure on the basis of the signal of the gate driver 900d and the voltage across the terminals of the IGBT. Now, when the IGBT is judged to be faulty, the left IGBT failure signal is inputted to the PWM control circuit 900c to stop the PWM signal. Since the drive of the right-hand side induction motor 3b is performed in the same manner, the description thereof will be omitted here. Further, when an over-current protection circuit 906 detects the input voltage of the inverter 901 to judge that voltage to be an over-voltage, a protection switch 907 is turned ON to prevent the breakdown of the IGBT due to the over-voltage. Further, when the left IGBT failure signal and the right IGBT failure signal are inputted to an FFB drive circuit 908, the FFB trip signal is generated.

Now, a description will be given of the abnormality detection method, by the mutual monitor, which is a feature of the present embodiment. Since the exchange of the signals to the external side is already described with reference to FIG. 27, the internal signals will now be described. The vehicle microprocessor 601, the left motor microprocessor 602 and the right motor microprocessor 603 generate a vehicle watch dog pulse, the left watch dog pulse and the right watch dog pulse, respectively, using the software. Each of the watch dog pulses is inputted to the other two microprocessors. That is, the left watch dog pulse and the right watch dog pulse are inputted to the vehicle microprocessor 601 which checks whether or not those signals are changed every predetermined period of time. If those signals are changed, it is judged that the left motor microprocessor 602 and the right motor microprocessor 603 are operating normally. Conversely, in the case where even when the predetermined period of time elapses the watch dog pulse is not changed, it is judged that the left motor microprocessor 602 or the right motor microprocessor 603 which has generated that signal is abnormal. At this time, the left microprocessor abnormality V signal or the right microprocessor abnormality V signal is generated from the vehicle microprocessor 601 to be inputted to the fail safe circuit 604. Similarly, with respect to each of the left motor microprocessor 602 and the right motor microprocessor 603 as well, the abnormality of the other microprocessors is judged using the watch go pulses, thereby to output the right microprocessor abnormality signal L, the vehicle microprocessor abnormality signal L, the left microprocessor abnormality signal R, or the vehicle microprocessor abnormality signal R to the fail safe circuit 604. Incidentally, the vehicle microprocessor abnormality signal L and the vehicle microprocessor abnormality signal R are also outputted to the other motor microprocessors. The reason for this is that since, when the vehicle microprocessor 601 breaks down, the operation will not be determined with respect to the acceleration and the braking, the motor speeds need to be gradually stopped, while being synchronized with each other, by only the right and left motor microprocessors 602 and 603, thereby to surely announce that both the right and left motor microprocessors 602 and 603 judge that the vehicle microprocessor 601 is abnormal. Moreover, as for the signals supplied from the vehicle microprocessors 601 to the fail safe circuit 604, there are the FFBV signal, the temperature abnormality V signal, the fail V signal, the contractor RV, LV and the VV signals. The FFBV signal is a signal which is generated when the vehicle microprocessor 601 judges that the breaker 15 must be turned OFF, the temperature abnormality V signal is a signal which indicates that the temperature of the battery is abnormal. The fail V signal is outputted when it is judged that some abnormality is caused. Moreover, the contractor RV, LV and VV signals are signals which control the right and left-hand side contactors, and the central contactor, respectively.

As for the signals supplied from the left and right motor microprocessors 602 and 603 to the fail safe circuit 604, there are the FFBL signal, the temperature abnormality L signal, the fail L signal, the contactor LL and VL signals, the FFBR signal, the temperature abnormality R signal, the failure R signal, the contactor RR and VR signals, the description of which signals is basically the same as that of the above signals. The inverter starting signal is, in addition to the motor speed command, inputted from the vehicle microprocessor 601 to the left and right motor microprocessors 602 and 603. The inverter starting signal is generated when the vehicle microprocessor 601 becomes controllable. The left and right motor microprocessors 602 and 603 start performing the respective control calculation by receiving that signal, thereby to output the inverter starting L signal and the inverter starting R signal, respectively, to the fail safe circuit 10. Moreover, when some abnormality is caused in the induction motors or the inverters, the left and right motor microprocessors 602 and 603 decelerate the speed for safety purposes and also output the left deceleration command or the right deceleration command to the vehicle microprocessor 8. When receiving those signals, the vehicle microprocessor 601 serves to decelerate the motor speed command for the other motor microprocessor to limit the speeds of the right and left motors within a predetermined value.

Figure 31B:
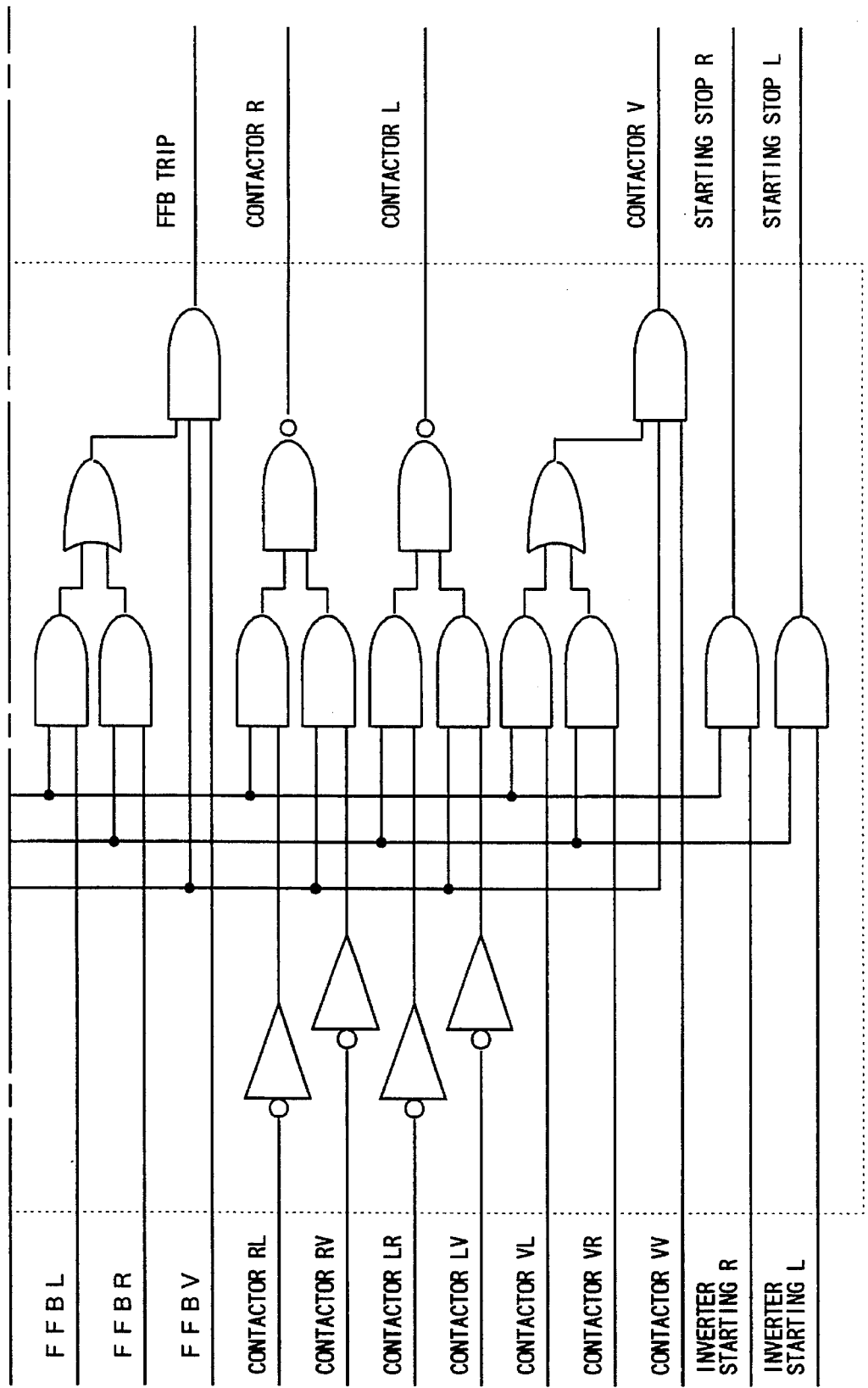

Next, the fail safe circuit 604 will be described with reference to FIG. 31. The description will now be given of the judgement method of the microprocessor abnormality, which is a feature of this circuit. First, the left motor microprocessor 602 is regarded as being abnormal only when both the left microcomputer abnormality V signal from the vehicle microprocessor 601 and the left microcomputer abnormality R signal from the right motor microprocessor 603 are ON. That is, the left motor microprocessor is regarded as being abnormal when it is judged to be abnormal by both of the other two microprocessors. Similarly, with respect to each of the right motor microprocessor 603 and the vehicle microprocessor 601 as well, the abnormality thereof is judged by the other two microprocessors. Thus, for example, even when the vehicle microprocessor 601 becomes abnormal so as to output the wrong left microprocessor abnormality V signal, if the right motor microprocessor 603 maintains the left microprocessor abnormality R signal in the OFF state, the fail safe circuit 604 is operated in such a way as to regard the left motor microprocessor 602 as operating normally. In this case, of course, both the left and right motor microprocessors 602 and 603 judge that the vehicle microprocessor 601 is abnormal. In the fail safe circuit 604, the FFb trip signal for breaking the breaker 15, the contactor L, R and V signals for switching the inverter circuits, and the starting/stop L and R signals for stopping the starting of the inverter are controlled by only the signals of the microprocessors which were judged to be abnormal. The FFB trip signal breaks the breaker 15 only when the vehicle microprocessor 601 is normal, the FFBV signal is ON, and the FFBL signal or the FFBR signal of one of the normal left and right microprocessors 602 and 603 is ON. With respect to the contactor V as well, the operation thereof is performed in the same manner. The contactor L is operated so as to be OFF when the vehicle microprocessor 601 and the left microprocessor 602 are normal, and the contactor LV and the contactor LR are OFF. With respect to the contactor R as well, the operation thereof is performed in the same manner. The starting/stop L signal becomes ON when the left microprocessor 602 is normal and the inverter starting L signal is ON. The operation is also the same with the starting/stop R signal. Moreover, the fail display signal always activates the fail display when one of the signals is abnormal. Further, the overheat display becomes ON when the temperature of one of the sections is abnormal.

Thus, if the present embodiment is employed, since the three microprocessors monitor the operation state mutually, the presence of an abnormality can be detected with ease, and as a result, the protection processing can be performed in safety by the normal microprocessors. Therefore, even when one microcomputer operates to run away, the vehicle can travel or be stopped in safety.

The above description relates to various embodiments of the present invention, and the description has been given for a specific case where three microprocessors make up the controller. However, the present invention is applicable to other cases. With respect to the kind of motor, the present invention is applicable to other motors as well as the induction motor.

As set forth hereinabove, according to the present invention, even when abnormality is caused in the rotation of one of the motor for driving the left wheel and the motor for driving the right wheel, the vehicle can travel safely.

The three or more microprocessors employed in the controller output watch dog pulses mutually, and it is judged on the basis of the operation of those pulses whether or not those microprocessors are normal, to output a judgement result, whereby various kinds of controls are performed using only the signals of the normal microprocessors. Therefore, there is provided an effect in that even when one microprocessor breaks down, it is possible to continue operation of the vehicle with safety.

We claim:

1. A controller for an electric vehicle having a right-hand side motor for driving a right-hand wheel, a right-hand side current supply means for supplying driving current to said right-hand side motor, a left-hand side motor for driving a left-hand side wheel, a left-hand side current supply means for supplying driving current to said left-hand side motor, and control means for controlling said right-hand side current supply means and said left-hand side current supply means, wherein said control means comprises:

means for detecting an abnormality in the operation of said right-hand side current supply means and left-hand side current supply means;

means for controlling a current supply means, which has been detected to be abnormal, so that driving current is not supplied to said motor driven by the abnormal current supply means, when one of said current supply means is detected as being abnormal;

switching means for connecting the outputs of said right-hand side current supply means and left-hand side current supply means; and means for activating said switching means to connect the output of a normal operating current supply means to the motor driven by an abnormally operating current supply means in response to detection of abnormal operation of one of said current supply means by said detecting means.

2. A controller for an electric vehicle according to claim 1, wherein said control means further comprises means for controlling the motor driven by a normally operating current supply means so as to keep a speed difference between the right-hand side and left-hand side wheels within a predetermined value when another current supply means has been detected as being abnormal, and wherein said switching means is activated when said speed difference becomes within said predetermined value.

3. A controller for an electric vehicle according to claim 1, wherein said control means further comprises means for reducing the speed difference between said right-hand side wheel and left-hand side wheel by controlling a current supply means which has not been detected as being abnormal, when one of said current supply means has been detected as being abnormal.

4. A controller for an electric vehicle having a right-hand side motor for driving a right-hand wheel of the vehicle, a right-hand side current supply means for supplying driving current to said right-hand side motor, a left-hand side motor for driving a left-hand side wheel of the vehicle, a left-hand side current supply means for supplying driving current to said left-hand side motor, and control means for controlling said right-hand side current supply means and said left-hand side current supply means, wherein said control means comprises:

means for detecting an abnormality in the operation of said right-hand side current supply means and left-hand side current supply means;

means for controlling a current supply means, which has been detected to be abnormal, so that driving current is not supplied to the motor driven by the abnormal current supply means, when one of said current supply means is detected as being abnormal;

means for determining maximum acceleration of the motor or maximum driving force of the wheel, which maximum acceleration and maximum driving force causes a rotational moment which results in a turning of the vehicle around a vertical axis passing through a center of gravity of the vehicle; and means for controlling a current supply means which is not detected as being abnormal so as to keep the acceleration of the motor or the driving force of the wheel at a value lower than said maximum acceleration or said maximum driving force, when one of said current supply means is detected as being abnormal.

5. A controller for an electric vehicle according to claim 4, wherein said control means further comprises:

means for detecting a present steering angle of the vehicle; and means for determining said maximum driving force according to a detected present steering angle.

6. A controller for an electric vehicle according to claim 4, wherein said control means further comprises means for reducing the speed difference between said right-hand side wheel and left-hand side wheel by controlling a current supply means which has not been detected as being abnormal, when one of said current supply means has been detected as being abnormal.

7. A controller for an electric vehicle according to claim 6, wherein said control means further comprises:

breaker means capable of disconnecting said motors from a current supply means which has been detected to be abnormal; and voltage absorbing means for absorbing a voltage generated in a motor which has been disconnected from an abnormal current supply means by said breaker means.

8. A controller for an electric vehicle according to claim 6, wherein said control means further comprises:

clutch means having a right side clutch coupling said right-hand side motor and said right wheel together and a left side clutch coupling said left-hand side motor and said left wheel together; and means for activating the right side clutch or left side clutch connected to a motor energized by a current supply means which has been detected to be abnormal so as to disengage that motor from the wheel it is driving.

9. A controller for an electric vehicle according to claim 6, wherein said control means further comprises a plurality of microprocessors which control said right-hand side current supply means and left-hand side current supply means, respectively, each of said microprocessors including means for monitoring normal operation of another one of said microprocessors and means for stopping the vehicle running when said monitoring means detects abnormal operation of another microprocessor.

10. A controller for an electric vehicle according to claim 4, wherein said control means further comprises switching means for connecting the outputs of said right-hand side current supply means and left-hand side current supply means, and means for activating said switching means to connect the output of a normal operating current supply means to the motor driven by an abnormality operating current supply means in response to detection of abnormal operation of one of said current supply means by said detecting means.

11. A controller for an electric vehicle according to claim 10, wherein said control means further comprises means for controlling the motor driven by normally operating current supply means so as to keep a speed difference between the right-hand side and left-hand side wheels within a predetermined value when another current supply means has been detected as being abnormal, and wherein said switching means is activated when said speed difference becomes within said predetermined value.

12. A controller for an electric vehicle according to claim 10, wherein after said switching means is activated, said motor is controlled to reduce the vehicle speed until the vehicle stops.

13. A controller for an electric vehicle according to claim 10, wherein said control means further comprises means for limiting the maximum speed of the vehicle to a speed lower than a rated maximum speed of the vehicle operating under normal conditions.

14. A controller for an electric vehicle having plural motors for driving respective tires of said vehicle independently of one another, plural power conversion means for supplying electric power to said motors, detection means for detecting a state of said vehicle, and control means for calculating a speed control so as to follow speed commands for said motors calculated on the basis of a signal from said detection signal to output voltage commands to said power conversion means, respectively, said controller comprising:

connection means capable of opening and closing switching means for connecting individual output lines of said power conversion means to one another in response to output signals from said control means, wherein when said control means judges that some power conversion means out of said power conversion means perform respective operations different from the output voltage commands therefor, the output lines of the power conversion means of interest are connected to one another using said connection means in such a way that each of the connected motors which have been driven by the power conversion means of interest is driven by said power conversion means other than the power conversion of interest, wherein, when said control means judges that one of said power conversion means are out of order, after control is performed in such a way that a difference between a speed of each of said motors driven by said power conversion means, other than the one power conversion means, and a speed of each of the connected motors becomes within a predetermined value, said motors are controlled by said available power conversion means using said switching means.

15. A controller for an electric vehicle having plural motors for driving respective tires of said vehicle independently of one another, plural power conversion means for supplying electric power to said motors, detection means for detecting a state of said vehicle, and control means for calculating a speed control so as to follow speed commands for said motors calculated on the basis of a signal from said detection signal to output voltage commands to said power conversion means, respectively, said controller comprising:

connection means capable of opening and closing switching means for connecting individual output lines of said power conversion means to one another in response to output signals from said control means, wherein when said control means judges that some power conversion means out of said power conversion means perform respective operations different from the output voltage commands therefor, the output lines of the power conversion means of interest are connected to one another using said connection means in such a way that each of the connected motors which have been driven by the power conversion means of interest is driven by said power conversion means other than the power conversion of interest, wherein after the output lines of the power conversion means are connected to one another using said connection means, the maximum velocity at which said vehicle can travel is set to a value less than a rated maximum velocity.

* * * * *